United States Patent
Kondo et al.

(10) Patent No.: US 10,446,838 B2
(45) Date of Patent: Oct. 15, 2019

(54) NEGATIVE ELECTRODE FOR NONAQUEOUS SECONDARY BATTERY AND NONAQUEOUS SECONDARY BATTERY, NEGATIVE ELECTRODE ACTIVE MATERIAL AND METHOD FOR PRODUCING SAME, COMPLEX INCLUDING NANO SILICON, CARBON LAYER, AND CATIONIC POLYMER LAYER, AND METHOD FOR PRODUCING COMPLEX FORMED OF NANO SILICON AND CARBON LAYER

(71) Applicant: KABUSHIKI KAISHA TOYOTA JIDOSHOKKI, Kariya-shi, Aichi (JP)

(72) Inventors: Takeshi Kondo, Kariya (JP); Yusuke Sugiyama, Kariya (JP); Takashi Mohri, Kariya (JP); Hiroki Oshima, Kariya (JP); Tomohiro Niimi, Kariya (JP); Mutsumi Takahashi, Kariya (JP); Nobuhiro Goda, Kariya (JP); Takahiro Sugioka, Kariya (JP); Yuta Kawamoto, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 371 days.

(21) Appl. No.: 15/115,320

(22) PCT Filed: Aug. 27, 2014

(86) PCT No.: PCT/JP2014/004403
§ 371 (c)(1),
(2) Date: Jul. 29, 2016

(87) PCT Pub. No.: WO2015/114692
PCT Pub. Date: Aug. 6, 2015

(65) Prior Publication Data
US 2017/0012282 A1    Jan. 12, 2017

(30) Foreign Application Priority Data

Jan. 31, 2014 (JP) ................................ 2014-016481
Feb. 28, 2014 (JP) ................................ 2014-037833

(51) Int. Cl.
*H01M 4/36*       (2006.01)
*H01M 4/133*     (2010.01)
(Continued)

(52) U.S. Cl.
CPC ........... *H01M 4/366* (2013.01); *H01M 4/133* (2013.01); *H01M 4/134* (2013.01); *H01M 4/364* (2013.01);
(Continued)

(58) Field of Classification Search
CPC combination set(s) only.
See application file for complete search history.

(56) References Cited

U.S. PATENT DOCUMENTS 8,455,138 B2   6/2013   Kim et al.
9,548,489 B2   1/2017   Abdelsalam et al.
(Continued)

FOREIGN PATENT DOCUMENTS

CN    102157731 A    8/2011
CN    103348513 A    10/2013
(Continued)

OTHER PUBLICATIONS

Yoko Kumai et al, Si—C composite anode of layered polysilane (Si6H6) and sucrose for lithium ion rechargeable batteries, 2011, Journal of Materials Chemistry, 21, 11941-11946 (Year: 2011).*
(Continued)

*Primary Examiner* — Stewart A Fraser
*Assistant Examiner* — Rachel L Zhang
(74) *Attorney, Agent, or Firm* — Sughrue Mion, PLLC

(57) ABSTRACT

Cycle characteristics of a nonaqueous secondary battery are to be improved.

An active material including: a first active material that contains a nano silicon produced by heating a layered polysilane represented by a composition formula $(SiH)_n$ and having a structure in which multiple six-membered rings formed from silicon atoms are connected; and a second active material that contains a graphite, is used in a negative electrode. With this, expansion and contraction due to stress during charging and discharging can be mitigated, and thereby cycle characteristics improve.

22 Claims, 16 Drawing Sheets

(51) Int. Cl.

| | | |
|---|---|---|
| *H01M 4/66* | (2006.01) | |
| *H01M 4/134* | (2010.01) | |
| *H01M 4/38* | (2006.01) | |
| *H01M 10/0525* | (2010.01) | |
| *H01M 4/587* | (2010.01) | |
| *H01M 10/052* | (2010.01) | |
| *H01M 4/02* | (2006.01) | |

(52) U.S. Cl.
CPC .......... *H01M 4/386* (2013.01); *H01M 4/587* (2013.01); *H01M 4/661* (2013.01); *H01M 4/663* (2013.01); *H01M 10/0525* (2013.01); *H01M 10/052* (2013.01); *H01M 2004/027* (2013.01); *H01M 2220/20* (2013.01)

(56) References Cited

U.S. PATENT DOCUMENTS

| | | | |
|---|---|---|---|
| 9,819,007 | B2 | 11/2017 | Hirakawa et al. |
| 9,819,008 | B2 | 11/2017 | Hirakawa et al. |
| 9,819,009 | B2 | 11/2017 | Hirakawa et al. |
| 2001/0012503 | A1 | 8/2001 | Fukuoka et al. |
| 2002/0164479 | A1* | 11/2002 | Matsubara ............ H01M 4/362 |
| | | | 428/367 |
| 2004/0166046 | A1 | 8/2004 | Fukuoka et al. |
| 2007/0054190 | A1 | 3/2007 | Fukui et al. |
| 2007/0059600 | A1 | 3/2007 | Kim et al. |
| 2009/0093356 | A1 | 4/2009 | Yamamoto |
| 2011/0111294 | A1 | 5/2011 | Lopez et al. |
| 2011/0165468 | A1 | 7/2011 | Alias et al. |
| 2013/0065125 | A1 | 3/2013 | Sawaki et al. |
| 2014/0147751 | A1 | 5/2014 | Yang et al. |
| 2014/0220347 | A1 | 8/2014 | Dehtiar et al. |
| 2014/0308588 | A1 | 10/2014 | Hirakawa et al. |
| 2014/0315086 | A1 | 10/2014 | Put et al. |
| 2014/0356724 | A1* | 12/2014 | Iwami ................ H01M 4/587 |
| | | | 429/231.4 |
| 2015/0004488 | A1 | 1/2015 | Abdelsalam et al. |
| 2015/0295230 | A1* | 10/2015 | Nakanishi ............ H01M 4/13 |
| | | | 429/213 |
| 2016/0190570 | A1* | 6/2016 | Lee ................ H01M 4/386 |
| | | | 429/218.1 |
| 2017/0033355 | A1* | 2/2017 | Kondo ................ H01G 11/24 |
| 2017/0084905 | A1 | 3/2017 | Hirakawa et al. |
| 2017/0084906 | A1 | 3/2017 | Hirakawa et al. |
| 2017/0244101 | A1 | 8/2017 | Put et al. |
| 2017/0256793 | A1 | 9/2017 | Oshima et al. |

FOREIGN PATENT DOCUMENTS

| | | |
|---|---|---|
| CN | 106604890 A | 4/2017 |
| JP | 2002-151066 A | 5/2002 |
| JP | 3865033 B2 | 1/2007 |
| JP | 2007-73334 A | 3/2007 |
| JP | 2007-80827 A | 3/2007 |
| JP | 2009-102219 A | 5/2009 |
| JP | 2011-090806 A | 5/2011 |
| JP | 2012-501951 A | 1/2012 |
| JP | 2012-059509 A | 3/2012 |
| JP | 2013-037809 A | 2/2013 |
| JP | 2013-510405 A | 3/2013 |
| JP | 2013-134884 A | 7/2013 |
| JP | 2013-234088 A | 11/2013 |
| JP | 2014-7120 A | 1/2014 |
| WO | 2010/029135 A2 | 3/2010 |
| WO | 2013/025707 A1 | 2/2013 |
| WO | WO2013025707 * | 2/2013 |
| WO | 2013/038494 A1 | 3/2013 |
| WO | 2013/069197 A1 | 5/2013 |
| WO | 2013/087780 A1 | 6/2013 |
| WO | 2013/114094 A1 | 8/2013 |

OTHER PUBLICATIONS

Communication dated Feb. 1, 2018 from the Japanese Patent Office in counterpart application No. 2017-060837.
Communication dated Feb. 1, 2018 from the Japanese Patent Office in counterpart application No. 2017-060838.
Communication dated Feb. 1, 2018 from the Japanese Patent Office in counterpart application No. 2017-060840.
Communication dated Feb. 6, 2018 from the Japanese Patent Office in counterpart application No. 2017-060839.
He et al., "A Novel Bath Lily-like Graphene Sheet-wrapped Nano-Si Composite as a High Performance Anode Material for Li-ion Batteries," RSC Advances, vol. 1, 2011, pp. 958-960.
Communication dated Jan. 31, 2018 from the State Intellectual Property Office of the P.R.C. in counterpart application No. 201480074606.8.
H.D. Fuchs, et al., "Porous silicon and siloxene: Vibrational and structural properties", Physical Review, Sep. 15, 1993, pp. 8172-8189, vol. 48.
International Search Report for PCT/JP2014/004403 dated Dec. 9, 2014 [PCT/ISA/210].
Written Opinion or PCT/JP2014/004403 dated Dec. 9, 2014 [PCT/ISA/237].
Second Office Action dated Aug. 21, 2018, issued in counterpart Chinese Application No. 201480074606.8; 48 pages total including English translation.

* cited by examiner

NEGATIVE ELECTRODE FOR NONAQUEOUS SECONDARY BATTERY AND NONAQUEOUS SECONDARY BATTERY, NEGATIVE ELECTRODE ACTIVE MATERIAL AND METHOD FOR PRODUCING SAME, COMPLEX INCLUDING NANO SILICON, CARBON LAYER, AND CATIONIC POLYMER LAYER, AND METHOD FOR PRODUCING COMPLEX FORMED OF NANO SILICON AND CARBON LAYER

CROSS REFERENCE TO RELATED APPLICATIONS

This application is a National Stage of International Application No. PCT/JP2014/004403 filed Aug. 27, 2014, claiming priority based on Japanese Patent Application No. 2014-016481 filed Jan. 31, 2014 and 2014-037833 filed Feb. 28, 2014, the contents of all of which are incorporated herein by reference in their entirety.

TECHNICAL FIELD

The present invention relates to: a negative electrode used for nonaqueous secondary batteries such as lithium ion secondary batteries; a nonaqueous secondary battery using the negative electrode, a negative electrode active material and a method for producing the negative electrode active material; a complex including a nano silicon, a carbon layer, and a cationic polymer layer; and a method for producing a complex formed of a nano silicon and a carbon layer.

BACKGROUND ART

Lithium ion secondary batteries are secondary batteries having a high charge/discharge capacity and capable of achieving high output. Currently, lithium ion secondary batteries are mainly used as power supplies for portable electronic equipment, and are expected to be used as power supplies for electric vehicles assumed to be used widely in the future. Lithium ion secondary batteries have, respectively in a positive electrode and a negative electrode, active materials capable of inserting and eliminating lithium therein/therefrom. The lithium ion secondary batteries operate when lithium ions move through an electrolytic solution provided between the two electrodes.

In lithium ion secondary batteries, a lithium-containing metallic complex oxide such as a lithium cobalt complex oxide is mainly used as the active material for the positive electrode, and a carbon material having a multilayer structure is mainly used as the active material for the negative electrode. The performance of a lithium ion secondary battery is influenced by materials of the electrolyte and the positive and negative electrodes included in the secondary battery. Research and development are actively conducted for a substance for the active materials. For example, usage of silicon or a silicon oxide having a higher capacity than carbon is discussed as a substance for the negative electrode active material.

When silicon is used as the negative electrode active material, a battery with a capacity higher than when a carbon material is used is obtained. However, silicon undergoes a large volume change associated with occlusion and release of Li during charging and discharging. Since silicon turns into a fine powder during charging and discharging and undergoes a structural change to become eliminated or detached from a current collector as a result, a problem regarding shortening of charge/discharge cycle life of a battery occurs. Thus, by using a silicon oxide as the negative electrode active material, the volume change of the negative electrode active material associated with occlusion and release of Li during charging and discharging is suppressed.

For example, usage of a silicon oxide ($SiO_x$: x is about $0.5 \leq x \leq 1.5$) is discussed as the negative electrode active material. $SiO_x$, when being heated, is known to decompose into Si and $SiO_2$. This is referred to as a disproportionation reaction in which a solid separates into two phases, i.e., Si phase and $SiO_2$ phase, through an internal reaction. The Si phase obtained from the separation is extremely fine. In addition, the $SiO_2$ phase that covers the Si phase has a function of suppressing decomposition of the electrolytic solution. Thus, the secondary battery using the negative electrode active material formed of $SiO_x$ that has been decomposed into Si and $SiO_2$ has excellent cycle characteristics.

The cycle characteristics of the secondary battery improve further when the secondary battery uses, as the negative electrode active material, finer silicon particles forming the Si phase of the $SiO_x$ described above.

JP3865033 (B2) (Patent Literature 1) discloses a method of heating metal silicon and $SiO_2$ to sublimate those into a silicon oxide gas, and cooling the gas to produce $SiO_x$. With this method, the particle size of the silicon particles forming the Si phase can be set to a nano size level of 1-5 nm.

JP2009102219 (A) (Patent Literature 2) discloses a production method including decomposing a silicon raw material into an elemental state in a high temperature plasma, rapidly cooling that to the temperature of liquid nitrogen to obtain silicon nano particles, and fixing the silicon nano particles into a $SiO_2$—$TiO_2$ matrix by using a sol-gel method or the like.

In the production method according to Patent Literature 1, the matrix is limited to those that are sublimable. In addition, in the production method according to Patent Literature 2, high energy for plasma discharge is required. Furthermore, silicon complexes obtained from these production methods have a flaw regarding the silicon particles of the Si phase having low dispersibility and being easily aggregated. When the silicon particles aggregate with each other and the particle sizes thereof become large, the secondary battery using those as the negative electrode active material results in having a low initial capacity and deteriorated cycle characteristics. Since an oxide layer is necessary for fixing a nano silicon from a standpoint of production in the case with the methods described in Patent Literature 1 and Patent Literature 2, the methods have a flaw regarding an irreversible reaction occurring between the oxide layer and Li to cause decrease in the capacity of the secondary battery.

In recent years, nano silicon materials that are expected for usage in semiconductors, electrics or electronics fields, and the like have been developed. For example, Physical Review B (1993), vol. 48, 8172-8189 (Non-Patent Literature 1) discloses a method for synthesizing a layered polysilane by causing a reaction between hydrogen chloride and calcium disilicide, i.e., $CaSi_2$, and describes that the layered polysilane obtained in this manner can be used in a light-emitting element or the like.

JP2011090806 (A) (Patent Literature 3) discloses a lithium ion secondary battery using a layered polysilane as the negative electrode active material. In addition, JP2013037809 (A) (Patent Literature 4) discloses a lithium ion secondary battery using, as the negative electrode active material, a layered polysilane coated with a carbon layer.

CITATION LIST

Patent Literature

Patent Literature 1: JP3865033 (B2)
Patent Literature 2: JP2009102219 (A)
Patent Literature 3: JP2011090806 (A)
Patent Literature 4: JP2013037809 (A)

Non-Patent Literature

Non-Patent Literature 1: Physical Review B (1993), vol. 48, 8172-8189

SUMMARY OF INVENTION

Technical Problem

The layered polysilane described in Non-Patent Literature 1 has a flaw of not being suitable as a substance for the negative electrode active material of a secondary battery since having a large specific surface area and containing a large amount of a $SiO_2$ component. Similarly, the negative electrode active material described in Patent Literature 4 has a flaw of not being preferable as a substance for the negative electrode active material of a secondary battery since having a large BET specific surface area. For example, in the negative electrode of a lithium ion secondary battery, when the specific surface area of the negative electrode active material is large, achieving high capacity is difficult since decomposition of the electrolytic solution is accelerated and the irreversible capacity consumed at the negative electrode becomes large.

Thus, the inventors of the present application conducted thorough research in the layered polysilane described in Non-Patent Literature 1, and found out that a nano silicon having a small specific surface area is obtained by heating the layered polysilane at a temperature higher than 100° C. in a non-oxidizing atmosphere.

The layered polysilane described in Non-Patent Literature 1 is represented by a composition formula $(SiH)_n$ and has, as the basic structure, a structure in which multiple six-membered rings formed from silicon atoms are connected. A Raman spectrum of the layered polysilane is shown in FIG. 1, and a Raman spectrum of a single-crystal silicon is shown in FIG. 2. In a Raman shift, a bond is estimated to be stronger when a shift toward the high wave number side is observed, and a bond is estimated to be more easily cut when a shift toward the low wave number side is observed. A peak of Si—Si bond observed at 500 $cm^{-1}$ in the single-crystal silicon (FIG. 2) is shifted to the vicinity of 320 $cm^{-1}$ on the low wave number side in the layered polysilane (FIG. 1) when compared to that of the single-crystal silicon. Thus, by having a layered polysilane structure, since the bond between Si—Si becomes weak, forming a nano silicon under a mild condition is considered to be possible.

However, when battery characteristics of the lithium ion secondary battery using the obtained nano silicon material as the negative electrode active material were carefully examined, a decrease in capacity was observed in a cycle test and the capacity retention rate was recognized to be low. A result of thorough research has shown combining the nano silicon material with a negative electrode active material that is of a species different from the nano silicon material improves cycle characteristics.

One mode of the present invention has been made in view of such a situation, and the problem to be solved is to provide a nonaqueous secondary battery having improved cycle characteristics, and a negative electrode used for the nonaqueous secondary battery.

In another mode of the present invention, the problem to be solved is to provide: a new negative electrode active material; a new complex including a nano silicon, a carbon layer, and a cationic polymer layer; and a new method for producing a complex formed of a nano silicon and a carbon layer.

Solution to Problem

A feature of a negative electrode for nonaqueous secondary batteries, which is one mode of the present invention solving the problem described above, is including a current collector and a negative electrode active material layer bound to the current collector, wherein the negative electrode active material layer includes a first active material that contains a nano silicon produced by heating a layered polysilane represented by a composition formula $(SiH)_n$ and having a structure in which multiple six-membered rings formed from silicon atoms are connected, and a second active material that contains a graphite.

A feature of a negative electrode active material, which is another one mode of the present invention, is including a complex formed of: nano silicon aggregated particles each having a structure in which multiple layers of a plate-like silicon body, having a structure in which nano-sized silicon particles are arranged as layers, are overlaid in a thickness direction thereof; and a carbon layer having a thickness within a range of 1 nm to 100 nm and at least formed on a surface of the plate-like silicon body, and satisfying following relational formula (1) regarding average thickness (R) and standard deviation (σ) of the thickness:

$$R/3\sigma > 1. \qquad \text{Relational formula (1):}$$

A feature of a complex, which is another one mode of the present invention, is including: nano silicon aggregated particles each having a structure in which multiple layers of a plate-like silicon body, having a structure in which nano-sized silicon particles are arranged as layers, are overlaid in a thickness direction thereof; a carbon layer covering the nano silicon aggregated particles; and a cationic polymer layer including a cationic polymer covering the carbon layer.

A feature of a method, which is another one mode of the present invention, for producing a complex formed of nano silicon aggregated particles and a carbon layer relates to mixing $CaSi_2$ and a halogen-containing polymer to obtain a mixture thereof, and heating the mixture at a temperature not lower than the carbonization temperature of the halogen-containing polymer.

Advantageous Effects of Invention

In the negative electrode of the present invention, the negative electrode active material layer containing the first active material that contains a nano silicon and the second active material that contains a graphite is included. Expansion and contraction of silicon occurs during charging and discharging in a nonaqueous secondary battery using a negative electrode containing a nano silicon. However, by additionally using the second active material containing the graphite, since the graphite functions as a buffer material, flaws such as cracking of the negative electrode active material layer or separating of the negative electrode active material layer from the current collector are prevented, and cycle characteristics improve.

With another mode of the present invention, a new negative electrode active material, a new complex including a nano silicon, a carbon layer, and a cationic polymer layer, and a new production method for a complex formed of a nano silicon and a carbon layer are provided.

DESCRIPTION OF EMBODIMENTS

A negative electrode for nonaqueous secondary batteries, which is one mode of the present invention, includes a current collector and a negative electrode active material layer bound to the current collector. The current collector refers to a fine electron conductor that is chemically inert for continuously sending a flow of current to the electrode during discharge or charging. The current collector may be used in the form of a foil, a plate, or the like. However, the form is not particularly limited as long as the form is in accordance with the purpose. As the current collector, those generally used in lithium ion secondary batteries and the like may be used. Examples of the current collector include aluminum foil, aluminum mesh, punched aluminum sheet, aluminum expansion sheet, stainless steel foil, stainless steel mesh, punched stainless steel sheet, stainless steel expansion sheet, foamed nickel, nickel nonwoven fabric, copper foil, copper mesh, punched copper sheet, copper expansion sheet, titanium foil, titanium mesh, carbon nonwoven fabric, and carbon woven fabric, etc.

The negative electrode active material layer includes a first active material containing a nano silicon, i.e., nano-sized silicon particles, and a second active material containing a graphite. The nano silicon is produced by heating, in a non-oxidizing atmosphere, a layered polysilane represented by a composition formula $(SiH)_n$ and having a structure in which multiple six-membered rings formed from silicon atoms are connected, and is obtained by, for example, heating the layered polysilane described in Non-Patent Literature 1 in a non-oxidizing atmosphere.

Figure 4:
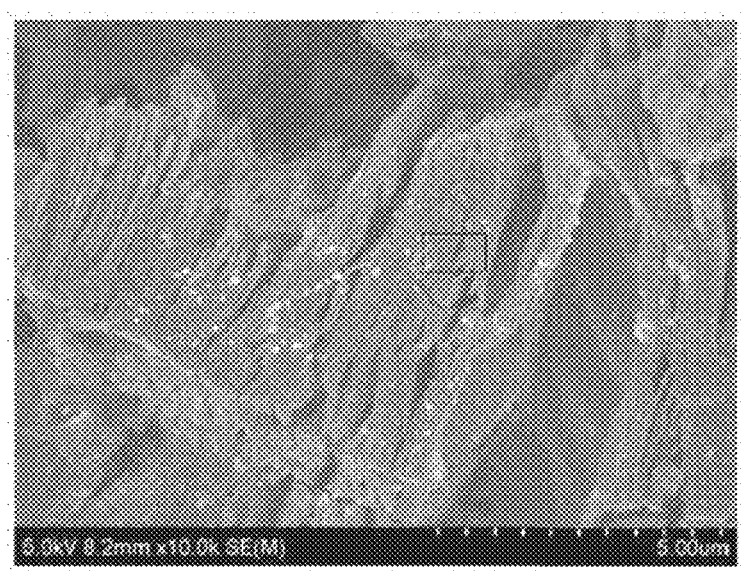
FIG. 4 shows an SEM image of nano silicon aggregated particles according to Example 1.
Figure 5:
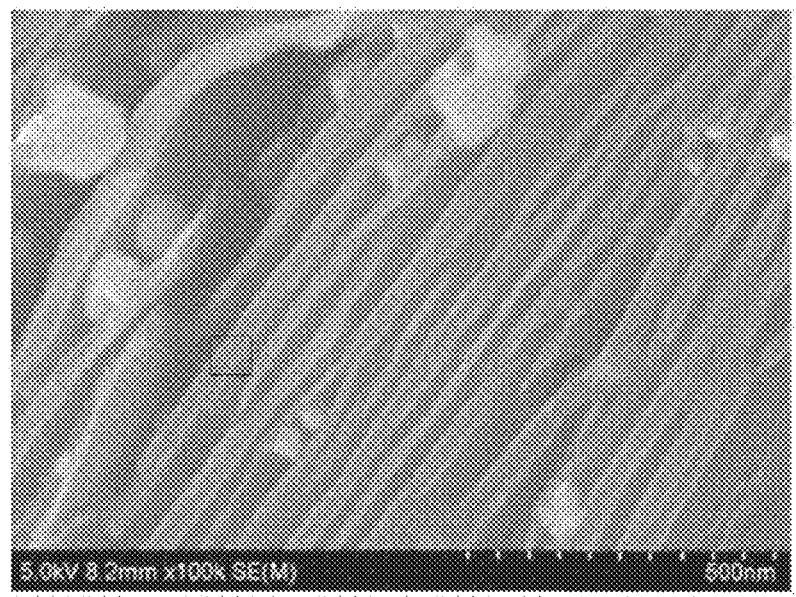
FIG. 5 shows an enlarged SEM image of the nano silicon aggregated particles according to Example 1.

The first active material contains aggregated particles containing the nano silicon (hereinafter, sometimes referred to as "nano silicon aggregated particles"). In the present application, "aggregated particles containing the nano silicon" refer to particles formed of silicon crystallites adhered to each other and particles formed of multiple silicon crystallites adhered to other materials including amorphous silicon and impurities, and particles in which these types of particles are adhered to each other. The "aggregated particles containing the nano silicon" each has a structure in which multiple layers of a plate-like silicon body, formed of silicon particles having a nanometer-order particle size and arranged as layers, are overlaid in a thickness direction thereof. This structure is confirmed through SEM observation as shown in FIGS. 4 and 5. FIG. 5 shows an enlarged view of the rectangular portion shown in FIG. 4. The thickness of the plate-like silicon body has been observed to be approximately 10 nm to approximately 100 nm. However, from standpoints of strength and easy insertion/extraction of lithium ions and the like, the thickness of the plate-like silicon body is preferably within a range of 20 nm to 90 nm and more preferably within a range of 20 nm to 50 nm. Furthermore, the length of the plate-like silicon body in the long axis direction is 0.1 µm to 50 µm. An aspect ratio (long axis direction length/thickness) of 2 to 1000 is conceivably preferable for the plate-like silicon body.

Figure 6:
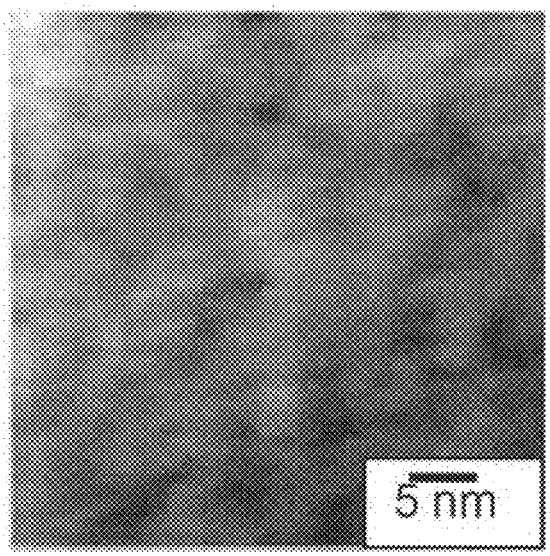
FIG. 6 shows a TEM image of the nano silicon aggregated particles according to Example 1.
Figure 7:
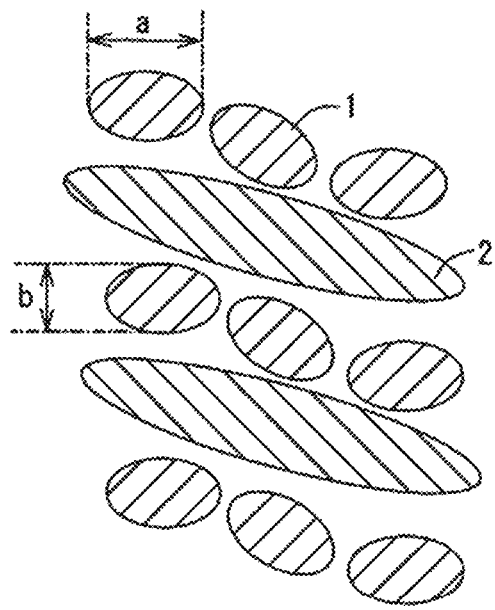
FIG. 7 is a schematic cross sectional view showing, in an enlarged manner, relevant parts of a plate-like silicon body according to Example 1.

Based on a result of TEM (Transmission Electron Microscopy) observation, the plate-like silicon body was observed to have a light-and-dark banded structure as shown in FIG. 6. FIG. 6 shows an enlarged view of the square portion shown in FIG. 5, and FIG. 7 shows a schematic cross sectional view showing, in an enlarged manner, relevant parts of the plate-like silicon body. In FIG. 6, the light gray portions are thought to represent a structure in which nano-sized silicon particles (1) are arranged in layers oriented perpendicularly with respect to the long sides of the plate-like silicon body, and the dark gray portions existing between layers of the nano-sized silicon particles (1) are thought to be gaps and/or a silicon oxide (2). A long axis direction length (a) and a short axis direction length (b) of the nano-sized silicon particles (1) are respectively 5 nm to 20 nm and 2 nm to 5 nm, and the ratio (a/b) of the long axis and the short axis is 2.5 to 10, i.e., indicates a flat shape. The thickness of the gaps and/or the silicon oxide (2) is 2 nm to 10 nm, and a ratio of the thickness of the gaps and/or the silicon oxide (2) with respect to the thickness of the nano-sized silicon particles (1) is 0.5 to 2.

The nano silicon aggregated particles are produced by heating the layered polysilane described in Non-Patent Literature 1 at a temperature higher than 100° C. in a non-oxidizing atmosphere. The layered polysilane is obtained through of a reaction between calcium disilicide and an acid. For example, as described in Non-Patent Literature 1, the layered polysilane is produced through a reaction between hydrogen chloride and calcium disilicide. Calcium disilicide forms a layered crystal in which a Ca atomic layer is inserted within the (111) plane of Si having a diamond structure, and the layered polysilane is obtained when calcium is extracted through a reaction with an acid.

However, the layered polysilane obtained from the production process described above contains a large amount of oxygen, and the nano silicon aggregated particles obtained therefrom subsequently contains a large amount of oxygen. A secondary battery using such nano silicon aggregated particles as the negative electrode active material has a problem regarding low initial capacity. Thus, the layered polysilane is preferably produced from a reaction between calcium disilicide and a mixture of hydrogen fluoride and hydrogen chloride.

By using hydrogen fluoride, the $SiO_2$ component generated during synthesis or refining is etched, and the amount of oxygen in the layered polysilane is reduced. Although a layered polysilane is obtained even when hydrogen fluoride is used alone, the layered polysilane obtained in such manner is not preferable since being highly active and oxidized with a minute amount of air, but having an increased amount of oxygen.

The composition ratio between hydrogen fluoride and hydrogen chloride is preferably within a range of HF/HCl=1/1 to 1/100 in mol ratio. Having a too large amount of hydrogen fluoride is not preferable since impurities such as $CaF_2$ and CaSiO-type are generated, and separating the layered polysilane from these impurities is difficult. Furthermore, when the amount of hydrogen fluoride is too small, the etching action by HF becomes weak, and a large amount of oxygen remains in the layered polysilane in some cases.

The blend ratio between calcium disilicide and the mixture of hydrogen fluoride and hydrogen chloride is preferably excessive for the acid than equivalency. Furthermore, the reaction atmosphere is preferably a vacuum or inert gas atmosphere. Using this production method has been shown to shorten the reaction time compared to that with the production method in Non-Patent Literature 1. Since having a reaction time that is too long causes the generation of $SiF_4$ as a result of additional reaction between Si and HF, a reaction time of about 0.25 to 24 hours is sufficient. Regarding the reaction temperature, the reaction occurs easily even at room temperature.

Although $CaCl_2$ or the like is generated from the reaction, $CaCl_2$ or the like is easily removed through rinsing with water and refinement of the layered polysilane is easy.

By heating the produced layered polysilane in a non-oxidizing atmosphere at a temperature not lower than 100° C., nano silicon aggregated particles having less amount of oxygen are obtained. The nano silicon aggregated particles also reduce BET specific surface area. Examples of the non-oxidizing atmosphere include an inert gas atmosphere and a vacuum atmosphere. The inert gas is not specified in particular as long as the inert gas is such as nitrogen, argon, or helium, and does not contain oxygen.

The heating temperature is preferably within a range of 100° C. to 1200° C., and particularly preferably within a range of 400° C. to 1200° C. The nano silicon is not generated when the temperature is lower than 100° C. A lithium ion secondary battery having, as the negative electrode active material, nano silicon aggregated particles formed particularly through heating at a temperature not lower than 400° C. has improved initial efficiency.

The size of Si crystallites of the nano silicon in the nano silicon aggregated particles, when being used as an electrode active material of an electrical storage device, is within a range of preferably 0.5 nm to 300 nm, more preferably 1 nm to 100 nm, further preferably 1 nm to 50 nm, and particularly preferably 1 nm to 10 nm. The size of the Si crystallites is calculated in accordance with Scherrer's equation from the half width of a diffraction peak of the Si (111) plane in an X-ray diffraction measurement result.

The amount of oxygen in the nano silicon material obtained by heating the layered polysilane produced with the production method described in Non-Patent Literature 1 is as large as approximately 33%. However, the amount of oxygen in the nano silicon aggregated particles obtained by heating the layered polysilane produced by the production method of causing a reaction between calcium disilicide and the mixture of hydrogen fluoride and hydrogen chloride is as small as 30% or less.

In addition, the nano silicon aggregated particles are also produced by a production method including a layered polysilane production step of causing a reaction between $CaSi_2$ and a tertiary amine halide to obtain a layered polysilane, and a nano silicon aggregated particle production step of heating the layered polysilane at a temperature of not lower than 300° C. into nano silicon aggregated particles.

First, the layered polysilane production step using the tertiary amine halide is described. The layered polysilane production step is a step of causing a reaction between $CaSi_2$ and the tertiary amine halide to obtain the layered polysilane.

$CaSi_2$ generally has a structure in which Ca layers and Si layers are overlaid. The tertiary amine halide becomes a supply source for a hydrogen halide. The step described above is considered as a step in which a reaction of substituting Ca of $CaSi_2$ with hydrogen of a hydrogen halide occurs. The same step is represented in the following manner with simple reaction formulae.

Tertiary amine halide→Tertiary amine+Hydrogen halide

CaSi$_2$+Hydrogen halide→Layered polysilane+Calcium halide

CaSi$_2$ may be synthesized with a production method known in the art, or one that is commercially available may be used. The CaSi$_2$ to be used in the layered polysilane production step is preferably ground in advance.

As the tertiary amine, a linear tertiary amine or a cyclic tertiary amine may be used, and the tertiary amine may have a chemical structure having both a linear tertiary amine structure and a cyclic tertiary amine structure. Furthermore, the tertiary amine may be a monoamine in which a single nitrogen atom is included as the amine, a diamine in which two nitrogen atoms are included as the amine, or a polyamine in which three or more nitrogen atoms are included as the amine.

A linear tertiary amine is a compound in which three hydrocarbon groups are bound to the nitrogen of the amine. Examples of the hydrocarbon group include alkyl groups, cycloalkyl groups, alkene groups, cycloalkene groups, alkyne groups, cycloalkyne groups, and aromatic hydrocarbon groups. In addition, hydrogen in each of the hydrocarbon groups may be substituted with another hydrocarbon group.

Examples of the number of carbon atoms in an alkyl group include 1 to 18, 1 to 12, and 1 to 6. Examples of the number of carbon atoms in an alkene group or an alkyne group include 2 to 18, 2 to 12, and 2 to 6. Examples of the number of carbon atoms in a cycloalkyl group, a cycloalkene group, or a cycloalkyne group include 3 to 18, 4 to 12, and 5 to 8. Examples of the number of carbon atoms in an aromatic hydrocarbon group include 6 to 18, 6 to 14, and 6 to 10. Specific examples of an aromatic hydrocarbon group include phenyl group, naphthyl group, and anthranil group.

Specific examples of the linear tertiary amine include trimethylamine, triethylamine, tripropylamine, tridodecylamine, tricyclohexylamine, N,N-dimethylethylamine, N,N-dimethylallylamine, N,N-dimethylcyclohexylamine, N,N-diethylcyclohexylamine, N,N-dimethylaniline, N,N-diethylaniline, N,N-dimethylbenzylamine, N,N,N',N'-tetramethylethylene diamine, and pentamethyl diethylenetriamine.

A cyclic tertiary amine refers a compound in which the nitrogen of the amine forms one part of a cyclic skeleton, and in which the nitrogen of the amine is bound to an element other than hydrogen such as carbon. The cyclic tertiary amine is preferably formed of nitrogen, carbon, and hydrogen. Examples of the number of carbon atoms in a cyclic tertiary amine include 4 to 30 and 4 to 20. Cyclic tertiary amines include saturated cyclic tertiary amines and unsaturated cyclic tertiary amines.

Specific examples of the saturated cyclic tertiary amines include N-methylpyrrolidine, N-ethylpyrrolidine, N-methylpiperidine, N-ethylpiperidine, N,N'-dimethylpiperazine, N,N'dimethyl-1,4-diazacycloheptane, N-methylmorpholine 1,4-diazabicyclo[2.2.2]octane.

Specific examples of the unsaturated cyclic tertiary amines include pyridine, pyrazine, quinoline, isoquinoline, quinoxaline, cinnoline, pteridine, acridine, N-methylimidazole, N-methylimidazoline, N-methylpyrazole, diazabicycloundecene, and diazabicyclononene.

As an amine having the chemical structure having both a linear tertiary amine structure and a cyclic tertiary amine structure, N,N-dimethyl-4-aminopyridine is illustrated.

Examples of the hydrogen halide that forms the tertiary amine halide together with the tertiary amine include hydrogen fluoride, hydrogen chloride, hydrogen bromide, and hydrogen iodide.

As the tertiary amine halide, one that is a combination of the above described tertiary amine and hydrogen halide may be used. In the layered polysilane production step, a single tertiary amine halide may be used or a plurality of tertiary amine halides may be used in combination.

Generally, the tertiary amine halide is a solid and CaSi$_2$ is also a solid. In the layered polysilane production step, the solid CaSi$_2$ and tertiary amine halide may be caused to react without a solvent, or react in the presence of a nonaqueous solvent. The layered polysilane production step may be conducted in an ordinary temperature, or may be conducted under a heating condition. Examples of the range of the heating condition include 50 to 200° C. and 70 to 150° C.

The layered polysilane production step may be conducted in atmospheric air or may be conducted under a pressurized condition. The layered polysilane production step is preferably conducted in an atmosphere of an inert gas such as argon, helium, or nitrogen. In any case, conducting the layered polysilane production step in an environment with less moisture is important.

Regarding the usage rate of the CaSi$_2$ and the tertiary amine halide, the mol ratio of the hydrogen halide of the tertiary amine halide with respect to Ca of the used CaSi$_2$ is preferably not lower than 2.

The following is an ideal reaction formula for the layered polysilane production step when hydrogen chloride is used as the hydrogen halide.

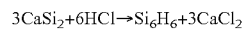

$$3CaSi_2 + 6HCl \rightarrow Si_6H_6 + 3CaCl_2$$

This reaction may be considered as forming Si—H bond while substituting Ca of the layered CaSi$_2$ with 2H. However, since the layered polysilane that is actually obtained contains a small amount of moisture and unavoidable impurities, the layered polysilane contains not only Si$_6$H$_6$ but also unavoidable impurities and oxygen by not more than 10 mass %. The amount of oxygen in the layered polysilane is preferably not more than 8 mass % and more preferably not more than 7 mass %.

Next, the nano silicon aggregated particle production step is described. The same step is a step of heating the layered polysilane at a temperature not lower than 300° C. to extract hydrogen and the like and obtain nano silicon aggregated particles.

The following is an ideal reaction formula for the nano silicon aggregated particle production step.

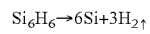

$$Si_6H_6 \rightarrow 6Si + 3H_2\uparrow$$

However, since the layered polysilane that is actually used in the nano silicon aggregated particle production step contains a small amount of moisture and unavoidable impurities, the actually obtained nano silicon aggregated particles contain not only Si but also unavoidable impurities and oxygen by not more than 10 mass %. The amount of oxygen in the nano silicon aggregated particles is preferably not more than 8 mass % and more preferably not more than 7 mass %.

The nano silicon aggregated particles are preferably ground to have a constant particle size distribution. As the grinding method, a method using a grinding device known in the art may be used. Grinding by using a jet mill is particularly preferable. A preferable particle size distribution of the nano silicon aggregated particles is a range of 1 μm<D10<4 μm for cumulative 10% (D10), 4 μm<D50<10

μm for cumulative 50% (D50), and 8 μm<D90<15 μm for cumulative 90% (D90), each measured by a laser diffraction type particle-size-distribution measuring device. Another preferable particle size distribution of the nano silicon aggregated particles is a range of D10<0.5 μm, 0.5 μm<D50<2 μm, and 2 μm<D90<5 μm, and a further preferable particle size distribution is a narrow distribution in which a range from D10 to D90, i.e., a numerical value obtained by subtracting D10 from D90, is smaller than 3 μm.

The nano silicon of the nano silicon aggregated particles preferably has a band gap within a range of larger than 1.1 eV but not larger than 2.1 eV, and more preferably has a band gap within a range of 1.2 eV to 1.6 eV. A secondary battery using, as the negative electrode active material, the nano silicon aggregated particles showing a band gap within the specific range shows a preferable initial efficiency. The band gap is calculated from an absorption edge wavelength of the nano silicon aggregated particles in a light absorption spectrum.

The first active material may be the above described nano silicon aggregated particles alone, but preferably contains a complex (hereinafter, sometimes referred to as "Si/C complex") in which a carbon layer is covering at least one portion of the nano silicon aggregated particles. By having the carbon layer, advantageous effects regarding conductivity being improvement and the nano silicon aggregated particles being reinforced are obtained. In the following, the Si/C complex is described. Carbon that forms the carbon layer may be solely of an amorphous or crystalline carbon, or may be a mixture of an amorphous carbon and a crystalline carbon.

<Si/C Complex>

The Si/C complex is a complex in which the carbon layer is covering at least one portion of the nano silicon aggregated particles, and one mode thereof is considered as a complex in which the carbon layer covers at least the surface of the plate-like silicon body. The carbon layer may be formed on the surface of the nano-sized silicon particles of the plate-like silicon body, may be formed between layers of the plate-like silicon body, or may be formed between the nano-sized silicon particles. The carbon layer preferably covers the whole surface of the plate-like silicon body.

The thickness of the carbon layer composited when covering the nano silicon aggregated particles is preferably within a range of 1 to 100 nm, more preferably within a range of 10 to 50 nm, and further preferably within a range of 5 to 50 nm. When the thickness of the carbon layer is too small, the BET specific surface area of the Si/C complex becomes too large and the cycle characteristics of a secondary battery deteriorate as a result of SEI being generated in some cases, and battery resistance increases and initial efficiency deteriorates in some cases. When the carbon layer is too thick, initial capacity of the secondary battery reduces and charging and discharging become difficult in some cases due to difficulty in insertion/extraction of Li. The Si/C complex preferably has a structure in which the nano silicon aggregated particles are dispersed in a matrix of the carbon layer.

When the thickness of the carbon layer is within a range of 1 nm to 100 nm, carbon is contained in the Si/C complex by 1 to 30 mass %, and the BET specific surface area of the complex is within a range of 1 m²/g to 10 m²/g. In addition, the complex has a resistibility, which is a reciprocal of electric conductivity, of 100 Ω·cm or lower.

The carbon layer preferably satisfies the following relational formula (1) regarding average thickness (R) and standard deviation (σ) of the thickness:

$R/3\sigma > 1$.  Relational formula (1):

When the standard deviation (σ) of the thickness of the carbon layer is too large, the properties of the negative electrode active material becomes unstable and cycle characteristics of an electrical storage device deteriorate in some cases. In addition, the smaller the average thickness (R) of the carbon layer is, the instability of the properties of the negative electrode active material caused by variability of the thickness of the carbon layer becomes more prominent. Thus, the carbon layer preferably satisfies relational formula (1).

A particularly preferable Si/C complex has a carbon layer that has a thickness within a range of 1 nm to 100 nm and that is uniformly formed thinly such that the average thickness (R) and the standard deviation (σ) of the thickness of the carbon layer satisfy relational formula (1): $R/3\sigma > 1$. With a nonaqueous secondary battery using the Si/C complex as the negative electrode active material, improvement of conductivity while suppressing increase in resistance, and suppression of generation of SEI as a result of reduction in the specific surface area of the negative electrode active material, etc., become possible. In addition, with the carbon layer, the Si/C complex turning into fine powder because of repeated expansion and contraction during charging and discharging in a nonaqueous secondary battery is suppressed.

The carbon layer preferably has a G/D ratio, which is a ratio between G-band and D-band in a Raman spectrum of carbon therein, not lower than 0.5. In a Raman spectrum of carbon, a peak of G-band and a peak of D-band are respectively observed around 1590 cm$^{-1}$ and around 1350 cm$^{-1}$. G-band is derived from graphite and D-band is derived from a defect. Thus, having a higher G/D ratio, which is a ratio between G-band and D-band, means having higher crystallinity of the carbon.

Experiments performed by the present inventors have shown that an electrical storage device including a Si/C complex with a carbon layer having a low G/D ratio has reduced initial efficiency. Thus, the carbon of the carbon layer in the Si/C complex preferably has a G/D ratio, which is a ratio between G-band and D-band in a Raman spectrum, not lower than 0.2, and more preferably not lower than 0.5. When such a Si/C complex is used for the negative electrode active material, irreversible capacity is reduced and initial efficiency is improved in an electrical storage device.

Regarding the composition of silicon and carbon in the Si/C complex, carbon is contained preferably within a range of 1 to 40 mass %, more preferably within a range of 1 to 30 mass %, and particularly preferably within a range of 3 to 7 mass %. Containing carbon by more than 40 mass % is not suitable for practical use in some cases since initial capacity becomes low when the complex is used in the negative electrode of an electrical storage device. The advantageous effect of compositing the carbon layer is not obtained in some cases when carbon is contained by less than 1 mass %.

Figure 8:
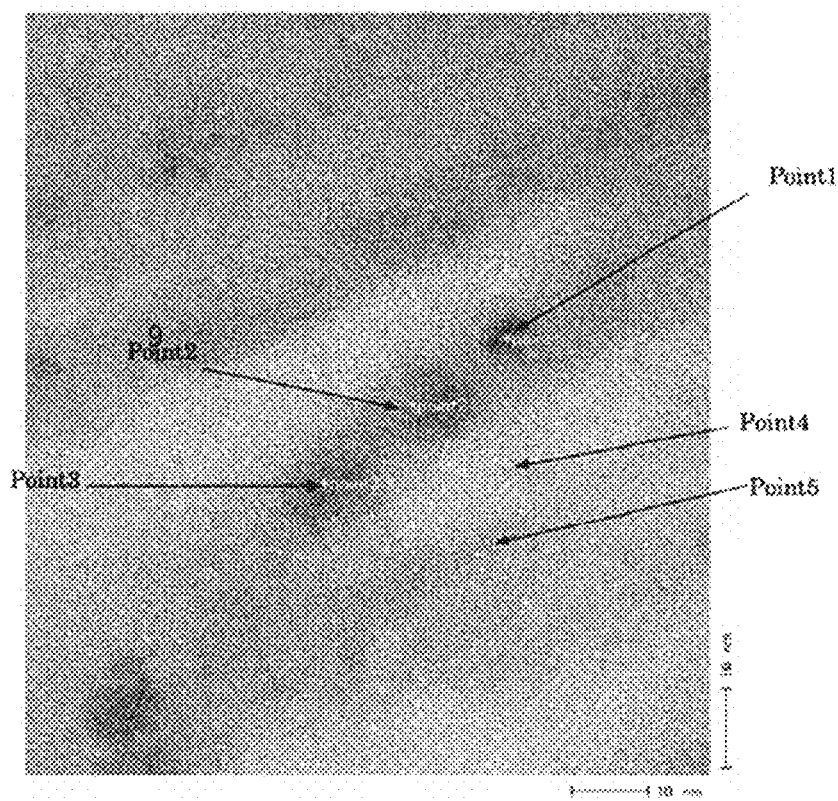
FIG. 8 shows a TEM image of a Si/C complex powder according to Example 1.
Figure 9:
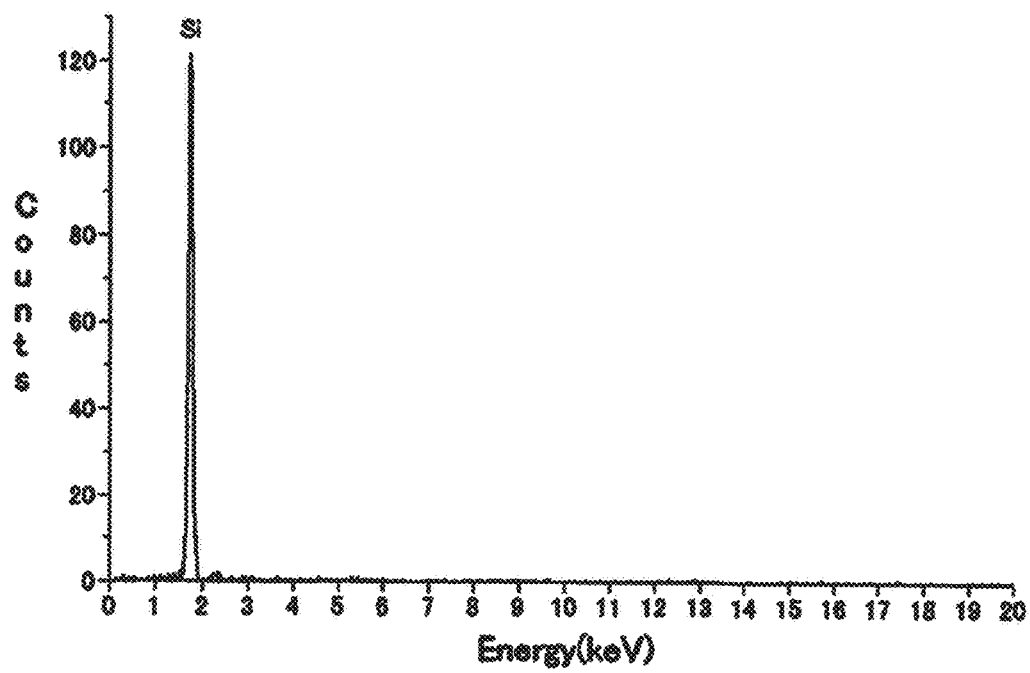
FIG. 9 is a TEM-EDX spectrum of the portion of Point 1 in FIG. 8.
Figure 10:
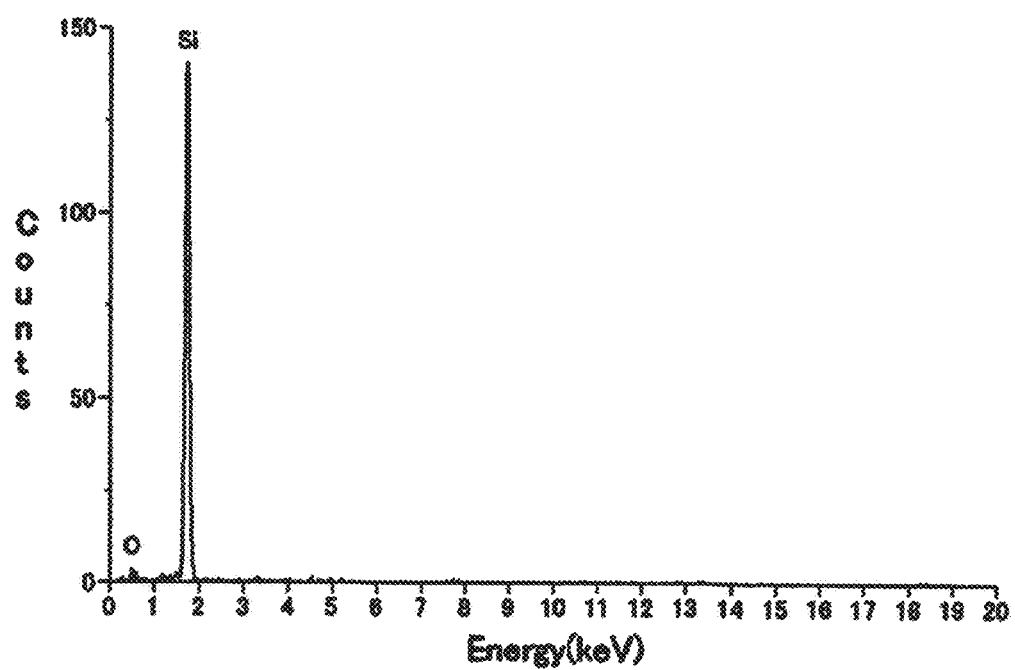
FIG. 10 is a TEM-EDX spectrum of the portion of Point 2 in FIG. 8.
Figure 11:
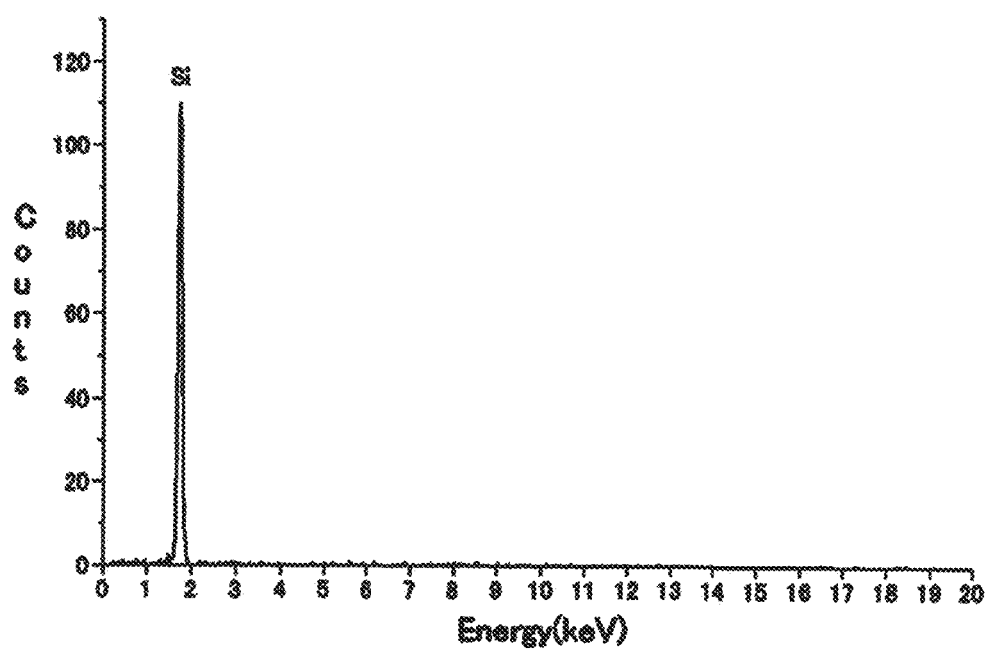
FIG. 11 is a TEM-EDX spectrum of the portion of Point 3 in FIG. 8.
Figure 12:
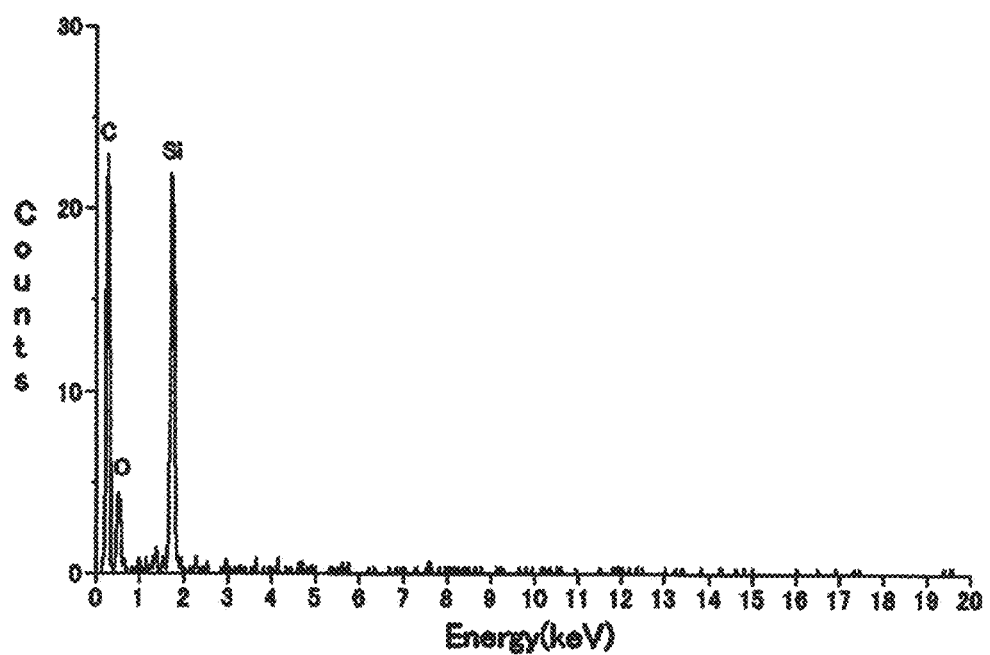
FIG. 12 is a TEM-EDX spectrum of the portion of Point 4 in FIG. 8.
Figure 13:
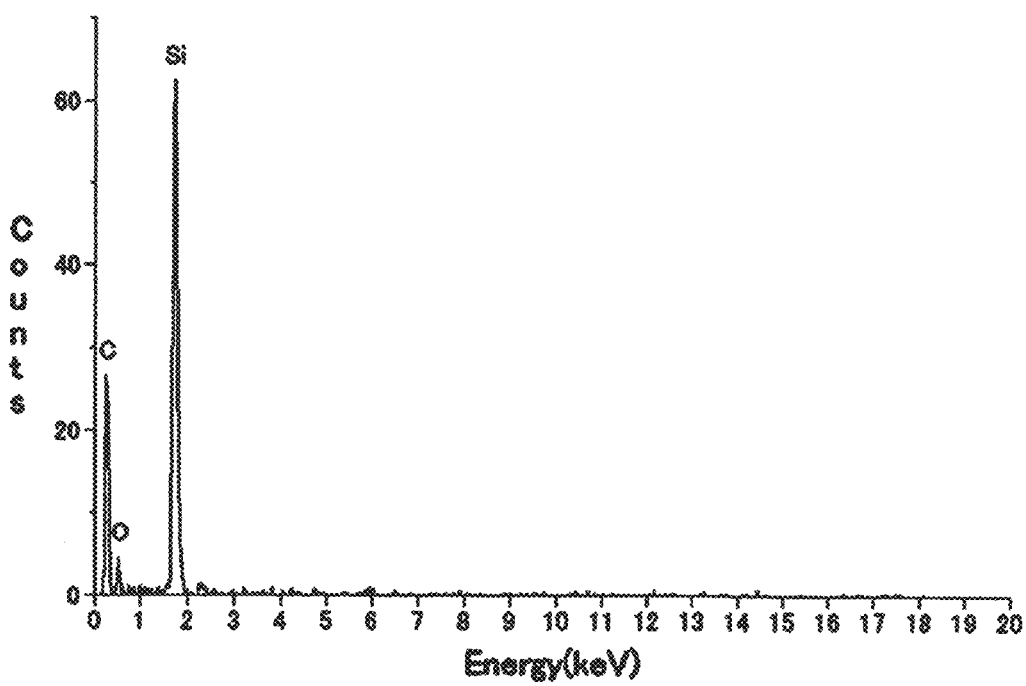
FIG. 13 is a TEM-EDX spectrum of the portion of Point 5 in FIG. 8.

FIG. 8 shows the result of TEM (Transmission Electron Microscopy) observation conducted on the Si/C complex. In FIG. 8, similarly to FIG. 6, a structure was observed in which a light gray portion, and a portion, where dark gray particles whose particle size in the longer diameter is approximately 10 nm are arranged in layers oriented perpendicularly with respect to the long sides of the plate-like silicon body, are overlaid in layers.

Thus, for the purpose of examining the composition at each spot of Points 1 to 5 in FIG. 8, TEM-EDX analysis was conducted. The results are respectively shown in FIGS. 9 to 13. Since compositions at Points 1 to 3 were 91.5 atm % or more of silicon (Si), the dark gray particles indicated at Points 1 to 3 were confirmed to be nano silicon particles. Furthermore, since a large amount of carbon (C) and a minute amount of oxygen (O) were detected at Points 4 and 5 besides Si, the light gray portions indicated by Points 4 and 5 were revealed to be carbon layers with a large amount of carbon (C).

The carbon layer may include at least one type of a metal atom selected from transition metals. By having the metal atom, electrical conductivity within the carbon layer improves, and, as a result, ion conductivity of lithium ions and the like in the negative electrode improves. Thus, since the property regarding occluding and releasing lithium and the like during charging and discharging of a secondary battery improves and transfer resistance of Li is reduced, initial efficiency and initial capacity in the secondary battery improve.

The metal atom selected from transition metals is preferably Cu, Fe, Ni, or the like, and Cu is particularly preferable. The contained amount of the metal atom in the carbon layer is preferably within a range of 0.1 to 10 mass %. When the contained amount of the metal atom is less than 0.1 mass %, obtaining the advantageous effect of adding the metal atom becomes difficult in some cases: whereas, when the contained amount of the metal atom is more than 10 mass %, the strength of the carbon layer deteriorates and cycle characteristics of the secondary battery deteriorate in some cases.

The carbon layer may contain a conductive powder added separately. By having the conductive powder, electrical conductivity within the carbon layer improves, and, as a result, the resistance for electrons transferring to the nano silicon aggregated particles is reduced and ion conductivity of lithium ions and the like in the negative electrode improves. Thus, the property regarding occluding and releasing lithium and the like during charging and discharging improves, and initial efficiency and initial capacity of a secondary battery improve. In addition, by introducing the conductive powder, cycle characteristics of the secondary battery also improve, although the detailed reason thereof is unknown.

As the conductive powder, acetylene black, Ketchen black (registered trademark), carbon fiber, carbon nanotube, graphene, carbon based conductive powders such as fine graphite particles described in WO2011/155486, or conductive metal powders may be used. The contained amount of the conductive powder in the carbon layer is preferably within a range of 1 to 50 mass %. When the contained amount of the conductive powder is less than 1 mass %, obtaining the advantageous effect of adding the conductive powder becomes difficult in some cases; whereas, when the contained amount of the conductive powder is more than 50 mass %, the strength of the carbon layer deteriorates and cycle characteristics of the secondary battery deteriorate in some cases.

Between particles of the Si/C complex, a fibrous material having a graphite-like carbon skeleton and including carbon by not less than 90 mass % is preferably interposed. Since the fibrous material is superior in conductivity and also is superior in strength and flexibility, the fibrous material easily follows movement of expansion and contraction in the negative electrode of the secondary battery during charging and discharging. Thus, charging/discharging characteristics improve, and cycle characteristics greatly improve since breakage of the negative electrode active material layer is prevented.

Although the inside of the fibrous material may be solid, the fibrous material preferably has a hollow cylindrical shape and an outer diameter of not smaller than 40 nm. By having the hollow cylindrical shape, the current carrying ability of the electrode further improves since a flexible conducting path is formed. When the outer diameter of the fibrous material is smaller than 40 nm, the fibrous material lacks sufficient strength and is unsuitable for a negative electrode active material in some cases. Although the upper limit of the outer diameter is not specified in particular, a fibrous material having an outer diameter of 500 nm or larger is thought to be impossible to produce with currently available production methods. Although the contained amount of the fibrous material is not specified in particular, the fibrous material is preferably contained in the negative electrode active material within a range of not more than 5 mass %. When the amount of the fibrous material is more than the above described range, the specific surface area increases and the produced amount of SEI associated therewith increases, and thereby the initial capacity of the secondary battery becomes small in some cases.

As described above, a particularly preferable Si/C complex has a carbon layer having a thickness within a range of 1 nm to 100 nm and satisfying relational formula (1): $R/3\sigma>1$ regarding the average thickness (R) and the standard deviation ($\sigma$) of the thickness of the carbon layer. An electrical storage device including the Si/C complex as the negative electrode active material shows suitable battery performance even when the following second active material is not included. It should be noted that the electrical storage device in the present application refers to a secondary battery, an electric double layer capacitor, a lithium ion capacitor, or the like.

Thus, the negative electrode active material of the present invention may be understood as a negative electrode active material including a complex formed of: nano silicon aggregated particles each having a structure in which multiple layers of a plate-like silicon body, having a structure in which nano-sized silicon particles are arranged as layers, are overlaid in a thickness direction thereof; and a carbon layer having a thickness within a range of 1 nm to 100 nm and at least formed on a surface of the plate-like silicon body, and satisfying the above relational formula (1) regarding average thickness (R) and standard deviation ($\sigma$) of the thickness. In addition, the electrical storage device of the present invention may be understood as an electrical storage device including the complex as the negative electrode active material. As described above, the BET specific surface area of the complex is within a range of 1 $m^2/g$ to 10 $m^2/g$, and the complex contains carbon by 1 to 30 mass %. Other physical properties are as described above. Preferable physical properties of the complex include: the plate-like silicon body contained in the complex having a thickness of 20 nm to 50 nm, a length of 0.1 μm to 50 μm in the long axis direction, and an aspect ratio, i.e., (length in long axis direction/thickness), of 2 to 1000; and the silicon particles contained in the plate-like silicon body having a length of 5 nm to 20 nm in the long axis direction, a length of 2 nm to 5 nm in the short axis direction, and a value of the ratio (long axis/short axis) between the lengths of the long axis and the short axis of 2.5 to 10.

<Production Method (1) of Si/C Complex>

When forming the carbon layer, mixing carbon, produced separately by some sort of method, with the nano silicon aggregated particles merely provides a heterogeneous mixture, and covering at least one portion of the aggregated particles by carbon becomes difficult. Thus, a production method (1) of the Si/C complex includes the following steps to be performed in the following order: an aggregated particle formation step of obtaining nano silicon aggregated particles by heating a layered polysilane represented by a composition formula $(SiH)_n$ and having a structure in which multiple six-membered rings formed from silicon atoms are connected; a polymerization step of polymerizing, in a state in which the aggregated particles and an aromatic heterocyclic compound are mixed, the aromatic heterocyclic compound; and a carbonization step of carbonizing a polymer of the aromatic heterocyclic compound. With the production method, at least one portion of the aggregated particles is covered with amorphous carbon with certainty, and a homogeneous Si/C complex is produced.

The aggregated particle formation step of obtaining the nano silicon aggregated particles is performed with the above described production process.

At the polymerization step, the aromatic heterocyclic compound is polymerized in the state in which the nano silicon aggregated particles and the aromatic heterocyclic compound are mixed. With this, the polymer of the aromatic heterocyclic compound is obtained in a state of being adhered to the nano silicon aggregated particles. Examples of compounds that may be used as the aromatic heterocyclic compound include polymerizable compounds such as five-membered ring aromatic heterocyclic compounds such as furan, pyrrole, thiophene, imidazole, pyrazole, oxazole, isoxazole, thiazole, and isothiazole, and polycyclic aromatic heterocyclic compound such as indole, benzimidazole, benzofuran, and purine.

Although various types of polymerization methods may be used for polymerizing these compounds, when pyrrole or the like is to be used, a method of applying heat in the presence of a polymerization catalyst such as concentrated hydrochloric acid or iron trichloride is simple to use. When iron trichloride is used in particular, the advantageous effect of increasing the initial capacity of the electrical storage device including the Si/C complex produced with the method is obtained, since polymerization can be conducted in a nonaqueous atmosphere and oxidization of Si is suppressed.

At the carbonization step, the polymer of the aromatic heterocyclic compound is carbonized in the state of being mixed with the nano silicon aggregated particles. Although this step is performed sufficiently as long as the heating is conducted in an inert atmosphere at a temperature not lower than 100° C. similarly to when the nano silicon aggregated particles are produced; the heating is preferably conducted at a temperature not lower than 400° C. The aromatic heterocyclic compound, when being polymerized, undergoes carbonization without evaporating even when heated, and a complex in which the carbon layer including an amorphous carbon is bound to the surface of the nano silicon aggregated particles is obtained. Without performing the polymerization step, if the heating is conducted in the state in which the nano silicon aggregated particles and the aromatic heterocyclic compound are mixed, the aromatic heterocyclic compound evaporates and carbonizing the aromatic heterocyclic compound becomes difficult.

<Production Method (2) of Si/C Complex>

The production method described above requires a step of polymerization etc., and has low productivity. In addition, the production method has a problem regarding difficulty in forming the Si/C complex in which the carbon layer is formed uniformly. Thus, a production method (2) of the Si/C complex includes the following steps to be performed in the following order: a aggregated particle formation step of obtaining nano silicon aggregated particles by heating a layered polysilane represented by a composition formula $(SiH)_n$ and having a structure in which multiple six-membered rings formed from silicon atoms are connected; and a carbonization step of mixing a resin solution and the nano silicon aggregated particles, removing the solvent, and carbonizing the resin. With this production method, by optimally selecting the resin, the carbon layer including an amorphous carbon is easily formed. In particular, by using a pre-polymerized resin, the polymerization step is shortened and unevenness caused during polymerization is reduced.

The aggregated particle formation step of forming the nano silicon aggregated particles is as described above.

At the carbonization step, the resin solution and the aggregated particles are mixed, solvent is removed therefrom, and the resin is carbonized. As the resin used as a carbon precursor, an easily graphitizable material or a hardly graphitizable material is preferably used, and a resin having a high carbonization rate is more preferable. Examples of resins having a high carbonization rate include polycarbonate whose raw material is bisphenol A, an epoxy resin, and phenolic resins whose raw material is phenol, etc. Phenolic resins having a particularly high carbonization rate are particularly preferable. As the solvent of the resin solution, any solvent capable of dissolving the resin may be used. In order to obtain Si/C complex particles with fewer flaws, the aggregated particles are preferably sufficiently mixed and dispersed uniformly in the resin solution.

Examples of the carbonization step include a step of carbonizing a composition obtained by simply removing the solvent from the mixture of the resin solution and the nano silicon aggregated particles and forming the composition into a film form or block form. The Si/C complex may be obtained by grinding the film form or block form composition obtained at the step described above. Furthermore, as in the case with a spray-drying method, a powder composition may be obtained through volatilization of the solvent from the mixture of the resin solution and the nano silicon aggregated particle, and the composition may be carbonized to obtain the Si/C complex.

Although the carbonization step is performed sufficiently as long as the heating is conducted under in an inert atmosphere at a temperature not lower than 100° C. similarly to when the nano silicon aggregated particles are produced; the heating is preferably conducted at a temperature not lower than 400° C. When a thermosetting resin is used as the resin, carbonization may be conducted after the resin is heated and cured. Furthermore, the resin may be thermally cured at a low temperature in advance and then heated at a high temperature for carbonization, or the resin may be thermally cured in the carbonization step while the temperature is being increased.

The experiments conducted by the present inventors have shown that the G/D ratio of the produced carbon is different depending on the baking temperature in the carbonization step. Specifically the G/D ratio became higher when the baking temperature was higher. In addition, the experiments have shown that, as described above, initial efficiency of a nonaqueous secondary battery including the Si/C complex deteriorates when the G/D ratio is low, since conductivity is not imparted to the carbon layer sufficiently. Thus, the carbon of the carbon layer in the Si/C complex preferably has a G/D ratio, which is a ratio between G-band and D-band in a Raman spectrum, not lower than 0.2. When such a Si/C complex is used for the negative electrode active material, irreversible capacity of a nonaqueous secondary battery is reduced and initial efficiency of the nonaqueous secondary battery is improved. In order to achieve a G/D ratio of not lower than 0.2, the baking temperature in the carbonization step is preferably not lower than 500° C. However, when the baking temperature is too high, a side reaction that generates SiC occurs, and, when the Si/C complex is used in a nonaqueous secondary battery, initial efficiency and initial capacity deteriorate. Thus, the baking temperature is preferably lower than 1100° C.

A detailed analysis of the carbon formed in the carbonization step with soft X-ray emission spectrometry (SXES) using electron beams or synchrotron radiation has revealed that an X-ray emission spectrum of the carbon is different depending on the type of the carbon source. X-ray emission occurs when an electron in an occupying orbit at the outer shell transitions to a pore formed in an inner shell orbit. The energy (hv) of X-ray emission depends on the energy difference between the inner shell and the outer shell. In cases with carbon, a peak of hv appears at around 276 to 282 eV because of the transition of electrons from the L shell to the more inner K shell at the valence band. The peak is generally referred to as CKα spectrum.

An analysis of a CKα spectrum of acetylene black has shown that a peak top (top of peak (A)) appears at around hv=277.5 to 279.5 eV (h: Planck's constant, v: frequency). Here, the peak (A) is thought to correspond to $sp^2$ orbit of carbon. In cases with carbon formed using a phenolic resin, an epoxy resin, a polycarbonate, or the like as the carbon source, a characteristic peak top (top of peak (B)) appears at around hv=279.5 to 281.0 eV besides peak (A), and the height of peak (B) differs depending on the difference in the type of the resin. Carbon formed from furan does not have these peaks (A) and (B), but has another characteristic peak at around hv=279 to 279.5 eV. Based on these results, the present inventors have thought characterizing the property of carbon is possible on the basis of X-ray emission spectrum obtained using SXES. Here, (h) is the Planck's constant $[6.62606957 \times 10^{-34} m^2 kg/s]$, and (v) is the frequency [Hz] of X-ray emission.

Carbon of the carbon layer in the Si/C complex preferably has, in an X-ray emission spectrum CKα obtained using SXES, peak (A) at around hv=277.5 to 279.5 eV (h: Planck's constant, v: frequency), and peak (B) at around hv=279.5 to 281.0 eV. Examples of carbon whose ratio (peak (B)/peak (A)) of the height of peak (B) with respect to the height of peak (A) is not lower than 0.92 include carbon derived from a phenolic resin. An electrical storage device including the Si/C complex containing such carbon in the carbon layer is particularly superior in initial efficiency and initial capacity.

<Production Method (3) of Si/C Complex>

As described above, a carbon layer containing a conductive powder and/or a metal atom selected from transition metals is preferable. In the following, the method for forming the carbon layer containing the conductive powder and/or the metal atom is described.

In order to form the carbon layer contain the metal atom, a metal atom precursor is mixed when mixing the nano silicon aggregated particles and the resin solution, and the carbonization step is performed after the solvent is removed. As the metal atom precursor, one that has high affinity with the resin in the resin solution or one that dissolves in the resin solution is preferable, and an organometallic complex such as phthalocyanine copper is preferable. Organic matters are carbonized when heat is applied at the carbonization step, and, as a result, the metal atom disperses uniformly in the carbon layer of the Si/C complex.

In order to form the carbon layer containing the conductive powder, the conductive powder is mixed when mixing the nano silicon aggregated particles and the resin solution, and the carbonization step is performed after the solvent is removed. When the resin is carbonized at the carbonization step, the conductive powder disperses uniformly in the carbon layer of the Si/C complex.

<Production Method (4) of Si/C Complex>

The fibrous material, which is to be formed between particles of the Si/C complex, which has a graphite-like carbon skeleton, and which includes carbon by not less than 90 mass %, is formed at the carbonization step after the nano silicon aggregated particles and the resin solution are mixed and the solvent is removed. At the carbonization step, carbon adheres to the surface of the nano silicon aggregated particles, the fibrous material of carbon grows from the surface of the adhered carbon toward other aggregated particles, and the fibrous material becomes interposed between particles of the Si/C complex.

The fibrous material is cut and loses the function thereof when the obtained negative electrode active material is ground. Thus, the carbonization step is performed by using nano silicon aggregated particles that have been ground in advance to a desired size, and grinding is preferably not conducted after the carbonization step. By grinding the nano silicon aggregated particles in advance, the fibrous material that forms a conducting path is easily interposed between particles of the Si/C complex since the surface area of the carbon layer that is being produced increases.

As the resin that serves as a carbon source, a phenolic resin is particularly preferable. As the phenolic resin, phenolic resins of both a resol form and a novolac form may be used.

<Production Method (5) of Si/C Complex>

As described above, the nano silicon aggregated particles are each formed of multiple layers of the plate-like silicon body, having a structure in which nano-sized silicon particles are arranged as layers, overlaid in a thickness direction thereof. Since the carbon source preferably permeates in between the layers of the plate-like silicon body, using a gas as a carbon source is also preferable. Thus, in the production method of the Si/C complex, the carbon layer is preferably formed at least on the surface of the plate-like silicon body by bringing the nano silicon aggregated particles in contact with an organic gas in a non-oxidizing atmosphere, and carbonizing the organic gas by applying heat thereto.

The production method (5) of the Si/C complex is characterized by having the following steps to be performed in the following order: an aggregated particle formation step of obtaining nano silicon aggregated particles in which multiple layers of a plate-like silicon body, having a structure in which nano-sized silicon particles are arranged as layers, are overlaid in a thickness direction thereof, by heating a layered polysilane represented by a composition formula $(SiH)_n$ and having a structure in which multiple six-membered rings formed from silicon atoms are connected; and a carbonization step of forming a carbon layer at least on the surface of the plate-like silicon body by bringing the nano silicon aggregated particles in contact with an organic gas in a non-oxidizing atmosphere, and carbonizing the organic gas by applying heat thereto.

The aggregated particle formation step of obtaining the nano silicon aggregated particles is as described above.

At the carbonization step, the carbon layer is formed at least on the surface of the plate-like silicon body by bringing the nano silicon aggregated particles in contact with an organic gas in a non-oxidizing atmosphere, and carbonizing the organic gas by applying heat thereto. This method is referred to as a thermal CVD method, and, for example, the method described in JP2004047404 (A) may be used. By using an organic gas as the carbon source, the carbon source is supplied not only between layers of the plate-like silicon body but also in between the nano-sized silicon particles, and thereby the carbon layer is formed fully with a uniform layer thickness with certainty.

The carbon layer formed from the production method (5) is formed at least on the surface of the plate-like silicon body. The carbon layer formed from the production method (5) may be formed on the surfaces of the nano-sized silicon particles (1) arranged in layers, or between layers of the nano-sized silicon particles (1). The carbon layer preferably covers the whole surface of the plate-like silicon body.

As the organic gas, a gas obtained through evaporation of an organic matter, a gas obtained through sublimation of an organic matter, or a vapor of an organic matter may be used. As an organic matter that generates an organic gas, one that is carbonizable through thermal decomposition when being heated in a non-oxidizing atmosphere is used, and is one type selected from, for example, saturated aliphatic hydrocarbons such as methane, ethane, propane, butane, isobutane, pentane, and hexane, unsaturated aliphatic hydrocarbons such as ethylene, propylene, and acetylene, alcohol s such as methanol, ethanol, propanol, and butanol, aromatic hydrocarbons such as benzene, toluene, xylene, styrene, ethylbenzene, diphenylmethane, naphthalene, phenol, cresol, benzoic acid, salicylic acid, nitrobenzene, chlorobenzene, indene, coumarone, pyridine, anthracene, and phenanthrene, esters such as ethyl acetate, butyl acetate, and amyl acetate, and fatty acids, or a mixture thereof. As the organic matter, a saturated aliphatic hydrocarbon such as propane is preferable.

The processing temperature at the carbonization step is different depending on the type of the organic matter, but is preferably at least 50° C. higher than a temperature at which the organic gas undergoes thermal decomposition. However, free carbon, i.e., soot, is generated when the temperature is too high or when the concentration of the organic gas is too high. Thus, a condition in which free carbon is not generated has to be selected. The thickness of the carbon layer to be formed is controlled by the processing time.

The carbonization step is preferably performed while the nano silicon aggregated particles are in a flowing state. By doing so, the whole surfaces of the nano silicon aggregated particles are brought in contact with the organic gas, and the carbon layer is formed uniformly. In order to keep the nano silicon aggregated particles in a flowing state, although various types of methods such as using a fluid bed exist, bringing the nano silicon aggregated particles in contact with the organic gas while stirring the nano silicon aggregated particles is preferable. For example, when a rotary furnace having a baffle plate therein is used, nano silicon aggregated particles remaining on the baffle plate are stirred when being dropped from a certain height associated with rotation of the rotary furnace and are brought in contact with the organic gas to form the carbon layer. As a result a uniform carbon layer is formed fully.

The production method (5) enables the thickness of the carbon layer to be within a range of 1 nm to 100 nm, easily, and the carbon layer to be formed thinly and uniformly such that the average thickness (R) of the carbon layer and the standard deviation (σ) of the thickness satisfy relational formula (1): R/3σ>1.

When the thickness of the carbon layer is within a range of 1 nm to 100 nm, carbon is contained in the Si/C complex by 1 to 30 mass %, and the BET specific surface area of the Si/C complex is within a range of 1 m²/g to 10 m²/g. In addition, the Si/C complex has a resistibility, which is a reciprocal of electric conductivity, of 100 Ω·cm or lower.

The experiments conducted by the present inventors have shown that having a low G/D ratio of the Si/C complex produced from the production method (5) results in deteriorated initial efficiency when being cased in an electrical storage device. Thus, the carbon in the carbon layer of the Si/C complex preferably has a G/D ratio, which is a ratio between G-band and D-band in a Raman spectrum, not lower than 0.5. An electrical storage device using such a Si/C complex as the negative electrode active material has reduced irreversible capacity and improved initial efficiency.

<Production Method (6) of Si/C Complex>

A complex formed of the nano silicon aggregated particles and the carbon layer is produced by mixing $CaSi_2$ and a halogen-containing polymer to obtain a mixture thereof, and heating the mixture at a temperature not lower than a carbonization temperature of the halogen-containing polymer.

The reaction mechanism of a production method (6) of the Si/C complex when polyvinyl chloride is used as a halogen-containing polymer is described in the following.

Through heating, first, polyvinyl chloride is decomposed and hydrogen chloride is released.

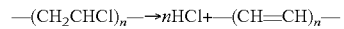

Next, $CaSi_2$ reacts with the released hydrogen chloride and turns into a layered polysilane represented by $Si_6H_6$.

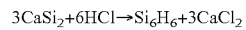

Since the reaction is conducted under a heating condition, hydrogen in $Si_6H_6$ is extracted, and silicon is obtained.

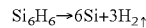

Furthermore, $(CH=CH)_n$, which is a decomposition product of polyvinyl chloride, carbonizes at a heating condition in which the temperature is equal to or higher than the carbonization temperature thereof. At this moment, since silicon and a carbide of $(CH=CH)_n$ coexist, the Si/C complex in which silicon and carbon are integrated is obtained.

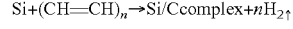

Details of the production method (6) of the Si/C complex is described in the following.

$CaSi_2$ generally has a structure in which Ca layers and Si layers are overlaid. $CaSi_2$ may be synthesized with a production method known in the art, or one that is commercially available may be used. The $CaSi_2$ used in the production method (6) of the Si/C complex is preferably ground in advance.

As the halogen-containing polymer, a polymer including a halogen in a chemical structure thereof may be used. The reason is described next. In the heating condition of the production method (6) of the Si/C complex, a hydrohalic acid and/or a halogen molecule are/is extracted from the halogen-containing polymer. Then, a negatively-charged halogen forming the hydrohalic acid or the halogen molecule reacts with Ca of $CaSi_2$. Thus, when the halogen-containing polymer is used, the halogen-containing polymer becomes a supply source of the negatively-charged halogen, and a desired reaction proceeds. When $CaSi_2$ and a hydrohalic acid react with each other, $Si_6H_6$ and a calcium halide is thought to be generated; whereas, when $CaSi_2$ and a halogen molecule react with each other, a silicon halide and a calcium halide are thought to be generated.

Examples of the halogen-containing polymer include those having a monomer unit of general formula (1).

General Formula (1)

[Chem. 1]

($R^1$ represents a hydrocarbon group having a valence of 3 or higher. Each X independently represents a halogen. "n" is an integer not smaller than 1.)

Hydrocarbons include saturated hydrocarbons and unsaturated hydrocarbons. Saturated hydrocarbons include linear saturated hydrocarbons and cyclic saturated hydrocarbons. Unsaturated hydrocarbons include linear unsaturated hydrocarbons and cyclic unsaturated hydrocarbons.

In the chemical structure of $R^1$, the chemical structure that forms a main chain of a monomer unit (chemical structure including carbon that is involved in polymerization reaction) may be any one of a linear saturated hydrocarbon, a cyclic saturated hydrocarbon, a linear unsaturated hydrocarbon, or a cyclic unsaturated hydrocarbon. Specific examples of the chemical structure that forms the main chain of the monomer unit include CH, $CH_2$—CH, CH=CH, a cyclohexane ring, a benzene ring, and the like.

In the chemical structure of $R^1$, the chemical structure that binds to the main chain of the monomer unit (hereinafter, the chemical structure is sometimes referred to as a sub chain) may be any one of hydrogen, a linear saturated hydrocarbon, a cyclic saturated hydrocarbon, a linear unsaturated hydrocarbon, or a cyclic unsaturated hydrocarbon. Furthermore, hydrogen in each hydrocarbon may be substituted with another element or another hydrocarbon.

X is any one of fluorine, chlorine, bromine, or iodine. When "n" is not smaller than 2, X's may be the same kind or may be different kinds. X may directly bind to carbon that forms the main chain of the monomer unit, or may bind to a carbon of a sub chain. The upper limit number of "n" is determined in accordance with the chemical structure of $R^1$.

The halogen-containing polymer may be formed solely of a singular type of a monomer unit represented by general formula (1), or may be formed of multiple types of monomer units represented by general formula (1). Furthermore, the halogen-containing polymer may be formed of a monomer unit represented by general formula (1) and a monomer unit with another chemical structure.

Here, since using a halogen-containing polymer with high mass % of a halogen is considered to cause the desired reaction to proceed more efficiently, the halogen-containing polymer is preferably formed solely of a monomer unit represented by general formula (1).

The molecular weight of the halogen-containing polymer in number average molecular weight is preferably within a range of 1,000 to 1,000,000, more preferably within a range of 1,000 to 500,000, and further preferably within a range of 3,000 to 100,000. The degree of polymerization of the halogen-containing polymer is preferably within a range of 5 to 100,000, more preferably within a range of 10 to 50,000, and further preferably within a range of 100 to 10,000.

Among the monomer units represented by general formula (1), preferable monomer units are represented by the following general formula (2).

General Formula (2)

[Chem. 2]

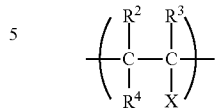

($R^2$, $R^3$, and $R^4$ are each independently selected from a monovalent hydrocarbon group, a halogen-substituted hydrocarbon group, hydrogen, and a halogen. X is a halogen.)

The description of the hydrocarbon and the halogen is the same as described above. Examples of preferable hydrocarbons in general formula (2) include an alkyl group having 1 to 6 carbon atoms, vinyl group, and phenyl group.

As described above, since a halogen-containing polymer with high mass % of a halogen is considered to be preferable; $R^2$, $R^3$, and $R^4$ of the monomer unit represented by general formula (2) are each preferably hydrogen or a halogen, independently.

Examples of particularly suitable halogen-containing polymers include polyvinylidene fluoride, polyvinyl fluoride, polyvinylidene chloride, and polyvinyl chloride.

The usage amount of $CaSi_2$ and the halogen-containing polymer is preferably set such that the halogen-containing polymer is used in an amount that results in a mol ratio of a halogen with respect to Ca of the used $CaSi_2$ of not lower than 2.

The heating temperature in the production method (6) of the Si/C complex is a temperature not lower than the carbonization temperature of the halogen-containing polymer. Generally, an organic compound starts carbonizing from around 400° C. A higher heating temperature results in a highly conductive carbide. Thus, the heating temperature in the production method (6) of the Si/C complex is preferably within a range of 400 to 1500° C., more preferably within a range of 500 to 1300° C., and further preferably within a range of 600 to 1200° C. The proportion of amorphous silicon and silicon crystallites contained in the Si/C complex, the size of the silicon crystallites, and the shape and size of nano-level thick layers included in the amorphous silicon and silicon crystallites contained in the produced Si/C complex, are adjusted depending on the heating temperature.

The size of the silicon crystallites is preferably within a range of 0.5 nm to 300 nm, more preferably within a range of 1 nm to 100 nm, further preferably within a range of 1 nm to 50 nm, and particularly preferably within a range 1 nm to 10 nm. The size of the silicon crystallites is calculated in accordance with the Scherrer's equation by using the half width of a diffraction peak of the Si (111) plane in an XRD chart obtained from an X-ray diffraction measurement (XRD measurement) conducted on the Si/C complex.

With the production method (6) of the Si/C complex, the Si/C complex having a structure in which multiple layers of the plate-like silicon body are overlaid in the thickness direction is obtained. This structure is observable with a scanning electron microscope or the like. When considering using the Si/C complex as the active material of a lithium ion secondary battery, in order to achieve efficient insertion and elimination reactions of lithium ions, the thickness of the plate-like silicon body is preferably within a range of 10 nm to 100 nm and more preferably within a range of 20 nm to 50 nm. The length of the plate-like silicon body in the long axis direction is preferably within a range of 0.1 μm to 50

μm. In the plate-like silicon body, (length in long axis direction)/(thickness) is preferably within a range of 2 to 1000.

In the production method (6) of the Si/C complex, the heating condition may be a multi-stage heating condition with two or more stages including a step of applying heat at a temperature not lower than a decomposition temperature of the halogen-containing polymer, and a step of applying heat at a temperature not lower than the carbonization temperature of the polymer after being decomposed. Here, the decomposition temperature of the halogen-containing polymer is a temperature at which a hydrohalic acid or a halogen molecule is extracted from the halogen-containing polymer.

Furthermore in the production method (6) of the Si/C complex, the heating condition may be a multi-stage heating condition with three or more stages including a step of applying heat at a temperature not lower than the melting point or the glass transition point of the halogen-containing polymer, a step of applying heat at a temperature not lower than a decomposition temperature of the halogen-containing polymer, and a step of applying heat at a temperature not lower than the carbonization temperature of the polymer after being decomposed.

When polyvinyl chloride is used as an example for the description, the melting point of polyvinyl chloride is within a range of about 85 to 210° C., and the decomposition temperature of polyvinyl chloride, i.e., the temperature at which hydrogen chloride is generated, is within a range of about 210 to 300° C. In this case, when polyvinyl chloride is used as the halogen-containing polymer in the production method (6) of the Si/C complex, the heating condition may be a 3-stage heating condition including a first heating step of applying heat at around 200° C., a second heating step of applying heat at around 300° C., and a third heating step of applying heat at around 900° C. When the first heating step is finished, $CaSi_2$ is estimated to be uniformly dispersed within a matrix of polyvinyl chloride. Next, when the second heating step is finished, since the suitably dispersed $CaSi_2$ reacts efficiently with HCl, the conversion rate of $CaSi_2$ to $Si_6H_6$ and Si is estimated to be high. Lastly, when the third heating step is finished, the final conversion rate from $CaSi_2$ to Si improves and the amount of silicon crystal in the nano silicon aggregated particles increases, and a Si/C complex in which a more uniform carbon coating is formed on the nano silicon aggregated particles is estimated to be obtained.

The production method (6) of the Si/C complex is preferably conducted in an inert gas atmosphere such as with argon, helium, and nitrogen gas.

<Production Method (7) of Si/C Complex>

A Si/C complex is produced by heating a Si/C/benzene-ring-containing polymer complex describe below. The Si/C/benzene-ring-containing polymer complex used in a production method (7) of the Si/C complex preferably has a mass %, regarding a benzene-ring-containing polymer with respect to the Si/C/benzene-ring-containing polymer complex, within a range of 0.1 to 3 mass %, and more preferably within a range of 0.5 to 2 mass %.

As the heating temperature, 300 to 600° C. is preferable, 350 to 550° C. is more preferable, and 380 to 450° C. is further preferable.

The production method (7) of the Si/C complex may be conducted in atmospheric air, or may be conducted under an increased or reduced pressure condition. In addition, the production method (7) of the Si/C complex is preferably conducted in an inert gas atmosphere such as with argon or helium.

<Si/C/Cationic Polymer Complex>

A Si/C/cationic polymer complex in which a cationic polymer is covering the Si/C complex may be used as the negative electrode active material.

The Si/C/cationic polymer complex is a complex including: nano silicon aggregated particles each having a structure in which multiple layers of a plate-like silicon body, having a structure in which nano-sized silicon particles are arranged as layers, are overlaid in a thickness direction thereof; a carbon layer covering the nano silicon aggregated particles; and a cationic polymer layer including a cationic polymer covering the carbon layer.

Considering use of the Si/C/cationic polymer complex as the negative electrode active material, the cationic polymer layer is preferably in a state of covering the whole surface of the Si/C complex in order to sufficiently mitigate the degree of expansion and contraction of the included nano silicon aggregated particles, or prevent breakdown of the negative electrode active material caused by the expansion and contraction, and avoid a direct contact between an electrolytic solution and the nano silicon aggregated particles that are exposed through cracks generated because of the expansion and contraction. Thus, a preferable Si/C/cationic polymer complex has a cationic polymer layer on the whole outermost layer, has a carbon layer therein, and has the nano silicon aggregated particles at the central part.

The mass % of the cationic polymer with respect to the Si/C/cationic polymer complex is preferably within a range of 0.1 to 5 mass % and more preferably within a range of 0.5 to 3 mass %.

As the cationic polymer, a polymer having any one of a primary amine, a secondary amine, a tertiary amine, and a quaternary ammonium cation (hereinafter, primary amine, secondary amine, tertiary amine, and quaternary ammonium cation are collectively referred to as "amine derivative groups") is preferable. As described later, the Si/C complex shows a negative zeta-potential in weakly acidic to alkaline liquids. The reason why the Si/C complex shows a negative zeta-potential in weakly acidic to alkaline liquids may be the existence of hydroxyl group or carbonic acid group on the surface of the carbon layer. A solution of a polymer including any one of the amine derivative groups is generally weakly acidic to alkaline, and an amine derivative group of the polymer is cationic in a solution. In a cationic polymer solution, the negatively-charged Si/C complex and the cationic amine derivative group are thought to be electrically attracted to each other to form an ionic bond while the cationic polymer is being chemically adsorbed to the outer layer of the carbon layer of the Si/C complex.

Specific examples of the cationic polymer include polyethyleneimine, polyvinyl amine, polyallylamine, polyaniline, polypyrrole, and polyvinyl pyridine. Regarding the cationic polymer, a single type described above may be used by itself, or a combination of two or more types may be used.

The molecular weight of the cationic polymer in number average molecular weight or weight average molecular weight is preferably 200 to 2,000,000, more preferably 1,000 to 500,000, and further preferably 3,000 to 100,000.

A method for forming the cationic polymer layer, i.e., a cationic polymer coating step of obtaining the Si/C/cationic polymer complex by coating the Si/C complex with the cationic polymer, will be described.

The cationic polymer coating step includes a step of preparing a cationic polymer solution and a step of bringing the Si/C complex in contact with the cationic polymer solution.

First, the step of preparing the cationic polymer solution is described.

Examples of a solvent of the cationic polymer solution include water, methanol, ethanol, propanol, tetrahydrofuran, N-methyl-2-pyrrolidone, and the like. These solvents may be used singly or in a combination of two or more.

The cationic polymer solution is prepared by mixing the cationic polymer and the solvent to dissolve the cationic polymer. The concentration of the cationic polymer in the cationic polymer solution is not particularly limited, but is preferably within a range of 0.01 mass % to 10 mass %, more preferably within a range of 0.05 mass % to 5 mass %, further preferably within a range of 0.1 mass % to 3 mass %, and particularly preferably within a range of 0.5 mass % to 2 mass %.

The step of bringing the Si/C complex in contact with the cationic polymer solution will be described.

Examples of methods for bringing the Si/C complex in contact with the cationic polymer solution include a method of soaking the Si/C complex in the cationic polymer solution, a method of applying the cationic polymer solution on the Si/C complex, and a method of applying the cationic polymer solution in a spray state on the Si/C complex. From the standpoint of simplicity of the process and effectively generating ionic bonds, the method of soaking the Si/C complex in the cationic polymer solution is preferable. The method may be conducted under a stirring condition or a ultrasonication condition, under ordinary pressure, increased pressure, or reduced pressure, or at an ordinary temperature or under a heating condition. The length of time for soaking the Si/C complex in the cationic polymer solution may be appropriately selected depending on the type and concentration of the cationic polymer solution. The length of time is preferably 10 seconds to 120 minutes and more preferably 1 to 70 minutes, for example.

After the step of bringing the Si/C complex in contact with the cationic polymer solution, a drying step for removing the solvent of the cationic polymer solution is preferably conducted. The drying temperature is preferably lower than 200° C., more preferably not higher than 150° C., and further preferably within a range of 70 to 140° C. The drying step is preferably conducted under reduced pressure. The drying time may be appropriately set to a time sufficient for removing the solvent of the cationic polymer solution. Examples of the drying time include 1 to 24 hours. If necessary, a filtration step may be added after the step of bringing the Si/C complex in contact with the cationic polymer solution.

<Si/C/Benzene-Ring-Containing Polymer Complex>

A Si/C/benzene-ring-containing polymer complex in which a benzene-ring-containing polymer is covering the Si/C complex may be used as the negative electrode active material.

The mass % of the benzene-ring-containing polymer with respect to the Si/C/benzene-ring-containing polymer complex is preferably within a range of 0.01 to 0.5 mass % and more preferably within a range of 0.05 to 0.4 mass %.

As the benzene-ring-containing polymer, a polymer containing styrene monomer is preferable. From a standpoint of affinity with the carbon layer on the surface of the Si/C complex, a benzene-ring-containing polymer having a high ratio of benzene ring is preferable. A more preferable benzene-ring-containing polymer is styrene-butadiene rubber (hereinafter, abbreviated as SBR in some cases) from a standpoint of usage track record in a secondary battery.

The Si/C/benzene-ring-containing polymer complex may be produced with a method similar to the production method of the Si/C/cationic polymer complex described above. The carbon layer of the Si/C complex and benzene ring of the benzene-ring-containing polymer have affinity to each other. Thus, when the Si/C complex and the benzene-ring-containing polymer are brought in contact, the two immediately stick to each other.

<Rinsing Step>

The nano silicon aggregated particles and/or the Si/C complex preferably undergo a rinsing step of being rinsed with a solvent having a relative permittivity of not lower than 5. The rinsing step is a step of removing unnecessary components adhered to the nano silicon aggregated particles and/or the Si/C complex by rinsing with a solvent having a relative permittivity of not lower than 5 (hereinafter, sometimes referred to as "rinsing solvent"). The same step is intended to particularly remove a substance dissolvable to the rinsing solvent, such as a calcium salt or a component derived from the acid used for producing the layered polysilane. For example, when hydrochloric acid is used for producing the layered polysilane, chlorine is estimated to exist in the nano silicon aggregated particles or the Si/C complex as $CaCl_2$ or as Si—Cl bond. By rinsing the nano silicon aggregated particles and/or the Si/C complex by using the rinsing solvent, salts such as $CaCl_2$ are dissolved in the rinsing solvent to be removed. The rinsing step may be a method of immersing the nano silicon aggregated particles in the rinsing solvent or may be a method of pouring the rinsing solvent with respect to the nano silicon aggregated particles. Similarly, the rinsing step may be a method of immersing the Si/C complex in the rinsing solvent or may be a method of pouring the rinsing solvent with respect to the Si/C complex.

As the rinsing solvent, from a standpoint of easily dissolving a salt, a solvent having a further higher relative permittivity is preferable, and a solvent having a relative permittivity of not lower than 10 or not lower than 15 is more preferable. The range of the relative permittivity of the rinsing solvent is preferably within a range of 5 to 90, more preferably within a range of 10 to 90, and further preferably within a range 15 to 90. Regarding the rinsing solvent, a single solvent may be used by itself, or a mixed solvent of multiple solvents may be used.

Specific examples of the rinsing solvent include water, methanol, ethanol, n-propanol, i-propanol, n-butanol, i-butanol, sec-butanol, tert-butanol, ethylene glycol, glycerin, N-methyl-2-pyrrolidone, N,N-dimethylformamide, N,N-dimethylacetamide, dimethyl sulfoxide, acetonitrile, ethylene carbonate, propylene carbonate, benzyl alcohol, phenol, pyridine, tetrahydrofuran, acetone, ethyl acetate, and dichloromethane. A solvent in which one portion or all hydrogen molecules in the chemical structures of these specific solvents are substituted with fluorine may be used as the rinsing solvent. Water as the rinsing solvent is preferably any one of distilled water, reverse osmotic membrane permeated water, or deionized water.

As reference, relative permittivities of various types of solvents are shown in Table 1.

TABLE 1

| Solvent | Relative Permittivity |
| --- | --- |
| Water | 80 |
| Methanol | 33 |
| Ethanol | 24 |
| n-Propanol | 20 |
| i-Propanol | 18 |

TABLE 1-continued

| Solvent | Relative Permittivity |
| --- | --- |
| n-Butanol | 18 |
| Ethylene Glycol | 39 |
| Glycerin | 43 |
| N-Methyl-2-Pyrrolidone | 32 |
| N,N-Dimethylformamide | 38 |
| Dimethyl Sulfoxide | 47 |
| Acetonitrile | 37 |
| Ethylene Carbonate | 90 |
| Propylene Carbonate | 64 |
| Benzyl Alcohol | 13 |
| Phenol | 9.8 |
| Pyridine | 12 |
| Acetone | 21 |
| Dichloromethane | 9 |
| Tetrahydrofuran | 7.5 |
| Ethyl Acetate | 6 |
| Those below are solvents with relative permittivity lower than 5. | |
| Dimethyl Carbonate | 3 |
| Diethyl Carbonate | 3 |
| Ethyl Methyl Carbonate | 3 |
| Benzene | 2 |
| Cyclohexane | 2 |
| Diethyl Ether | 4 |

When a rinsing solvent having a nucleophilic substituent group such as hydroxyl group is used in the rinsing step, nucleophilic substitution reaction may occur with respect to Si—Cl bond possibly included in the nano silicon aggregated particles or the Si/C complex. For example, when the rinsing solvent is water, the hydroxyl group of water conducts a nucleophilic attack against Si—Cl bond, and, as a result, Cl ions are eliminated and Si—OH bonds are formed in the nano silicon aggregated particles or the Si/C complex. Because of the nucleophilic substitution reaction, Si—Cl bonds are reduced in the nano silicon aggregated particles or the Si/C complex.

In a lithium ion secondary battery using, as the negative electrode active material, a Si/C complex having a Si—Cl bond; the Si—Cl bond is thought to react with lithium to generate stable LiCl, or the Si—Cl bond and lithium are thought to form a stable coordinate bond. Thus, the presence of the Si—Cl bond is estimated to be a cause of irreversible capacity of the negative electrode or a cause of resistance in the negative electrode.

Thus, in the rinsing step, when a rinsing solvent having a nucleophilic substituent group is used, reduction of irreversible capacity of the negative electrode or reduction of resistance of the negative electrode is expected. Thus, the rinsing solvent preferably has a nucleophilic substituent group.

Considering use of the Si/C complex as the negative electrode active material of a lithium ion secondary battery, the rinsing solvent is preferably one that is easily removed, one that is soluble to a solvent such as N-methyl-2-pyrrolidone used when producing the negative electrode active material layer of the lithium ion secondary battery, one that is identical to the solvent, or one that is usable as a nonaqueous solvent of the electrolytic solution of the lithium ion secondary battery.

When considering the above described situation, the rinsing solvent is preferably water, methanol, ethanol, n-propanol, i-propanol, n-butanol, i-butanol, sec-butanol, tert-butanol, N-methyl-2-pyrrolidone, N,N-dimethylformamide, N,N-dimethylacetamide, dimethyl sulfoxide, acetonitrile, ethylene carbonate, or propylene carbonate.

The rinsing time in the rinsing step is preferably 1 minute to 3 hours, more preferably 5 minutes to 2 hours, and further preferably 10 minutes to 90 minutes. After the rinsing, the rinsing solvent is preferably removed from the nano silicon aggregated particles or the Si/C complex through filtration and drying.

Performing the rinsing step with respect to the nano silicon aggregated particles is preferable, since the step in the production method of the Si/C complex doubles as the drying of the nano silicon aggregated particles after the rinsing, and thereby the total number of steps for the production is reduced.

The rinsing step may be repeated for multiple times. When doing so, the rinsing solvent may be changed. For example, water having remarkably high relative permittivity may be selected as the rinsing solvent for the first rinsing step, and N-methyl-2-pyrrolidone that is soluble to water may be used next as the rinsing solvent. By selecting the rinsing solvent in such manner, components derived from acids such as salts are effectively removed, and a protic solvent, of which residue thereof is unpreferable, is efficiently removed.

The rinsing step is preferably performed under a heating condition. As the heating condition, within a range of not lower than 40° C. but lower than the boiling point of the rinsing solvent is preferable, and within a range of 50° C. to (boiling point of rinsing solvent–10° C.) is more preferable. When the rinsing solvent is water, 60 to 90° C. is illustrated as a preferable specific heating temperature range.

The rinsing step is preferably performed under a stirring condition. Examples of a stirring device include a magnetic stirrer and a mixing machine including a stirring impeller. The stirring speed is preferably 1 to 50,000 rpm, more preferably 10 to 10,000 rpm, and further preferably 100 to 1,000 rpm.

The rinsing step is preferably performed under ultrasonication. The ultrasonication is performed by using a ultrasonic generator such as a ultrasonic cleaning machine and a ultrasonic homogenizer. As the condition of ultrasonic waves, a frequency within a range of 10 to 500 kHz is preferable, a frequency within a range of 15 to 400 kHz is more preferable, and a frequency within a range of 20 to 300 kHz is further preferable.

The rinsing step is preferably performed by appropriately combining the heating condition, the stirring condition, and the ultrasonication described above. By performing the rinsing step under heating condition, stirring condition, or ultrasonication; rinsing of the nano silicon aggregated particles or the Si/C complex is accomplished efficiently.

In the Si/C complex produced through the rinsing step (hereinafter, sometimes referred to as "rinsed Si/C complex"), components derived from an acid used for producing the layered polysilane is significantly reduced. Thus, the concentration of anion derived from an acid eluted in water when 1 g of the rinsed Si/C complex is stirred in 10 g of water for 1 hour becomes 50 ppm or lower. Since the anion adversely affects charging/discharging reactions in a secondary battery, the rinsed Si/C complex with almost no residual anions is suitable as the active material of the secondary battery.

<Second Active Material>

In one mode of the present invention, the second active material used together with the first active material contains a graphite. As the graphite, both a high-crystallinity graphite whose G/D ratio which is a ratio between G-band and D-band is not lower than 3.5, and a low-crystallinity graphite whose G/D ratio is lower than 3.5 may be used. As the high-crystallinity graphite, both a natural graphite and an artificial graphite may be used. When a classification method based on shape is used, flake-like graphites, spheroidal graphites, block-like graphites, earthy graphites, hard carbon, soft carbon, and the like may be used. In addition, a coated graphite obtained by coating the surface of a graphite with a carbon material or the like may also be used. Among those described above, a soft natural graphite is preferable.

When the first active material containing the nano silicon and the second active material containing the graphite are included in the negative electrode of a nonaqueous secondary battery, stress during charging and discharging is mitigated and cycle characteristics improve. The reason may be that the graphite is functioning as a buffer material. The contained amount of the graphite may be set within a range of 10 to 90 mass % with respect to the total amount of the first active material and the second active material.

When the contained amount of the graphite is larger, although cycle characteristics of the nonaqueous secondary battery improve, the initial capacity of the nonaqueous secondary battery reduces since the amount of the nano silicon decreases, relatively. Thus, when cycle characteristics are to be valued, the graphite is preferably contained by 40 to 90 mass % with respect to the total amount of the first active material and the second active material. Furthermore, when the initial capacity is to be valued, the graphite is preferably contained by 10 to 40 mass % with respect to the total amount of the first active material and the second active material.

<Negative Electrode of Electrical Storage Device Such as Nonaqueous Secondary Battery>

A negative electrode of an electrical storage device such as a nonaqueous secondary battery is produced by: mixing a negative electrode active material powder, a conductive additive such as a carbon powder, a binder, and a proper amount of an organic solvent to obtain a slurry; applying the slurry on a current collector by using a method such as roll coating method, dip coating method, doctor blade method, spray coating method, and curtain coating method; and drying the slurry.

The negative electrode active material powder contained in the slurry is preferably classified to have a particle size within a range of 2 μm to 20 μm. When the particle size of the negative electrode active material powder is too small, the contact interface with the electrolytic solution becomes large, and the amount of decomposition products in the electrolytic solution when being used as a secondary battery increases in some cases. Furthermore, when the particle size of the negative electrode active material powder is too large, stress on the outermost shell of the powder increases, and breakage and elimination of the negative electrode active material layer occur in some cases, and control of the thickness of the negative electrode active material layer becomes difficult in some cases since the thickness of the negative electrode active material layer depends on the particle size of the negative electrode active material. As the classification method, a method known in the art may be used.

Although the binder is demanded to bind the active material or the like with the smallest possible amount, the added amount is preferably 0.5 wt % to 50 wt % of the total amount of the active material, the conductive additive, and the binder. Moldability of an electrode deteriorates in some cases when the amount of the binder is less than 0.5 wt %, whereas energy density of an electrode decreases in some cases when the amount of the binder is more than 50 wt %.

Examples of the binder include polyvinylidene difluoride (PVdF), polytetrafluoroethylene (PTFE), styrene-butadiene rubber (SBR), polyimide (PI), polyamide-imide (PAI), carboxymethyl cellulose (CMC), polyvinyl chloride (PVC), methacrylic resin (PMA), polyacrylonitrile (PAN), modified polyphenylene oxide (PPO), polyethylene oxide (PEO), polyethylene (PE), polypropylene (PP), and polyacrylic acid (PAA), etc. Those described within parentheses above are respective abbreviations of the substances.

When polyvinylidene difluoride is used as the binder, the potential of the negative electrode is reduced and voltage of the electrical storage device improves. Furthermore, using polyamide-imide or polyacrylic acid as the binder improves initial efficiency and discharge capacity.

As the negative electrode active material, other than the first active material and the second active material described above, those known in the art such as silicon, carbon fibers, tin, and a silicon oxide may also be mixed. Among those described above, a silicon oxide represented by $SiO_x$ ($0.3 \leq x \leq 1.6$) is preferable. The silicon oxide powder is formed of $SiO_x$ derived from decomposition into fine Si and $SiO_2$ covering the Si as a result of a disproportionation reaction. When x of the silicon oxide is lower than the lower limit value, the volume change during charging and discharging becomes too large and the cycle characteristics deteriorate since the Si ratio becomes high. Furthermore, when x of the silicon oxide is higher than the upper limit value, the energy density is reduced since the Si ratio becomes low. The "x" of the silicon oxide is preferably within a range of $0.5 \leq x \leq 1.5$ and further preferably within a range of $0.7 \leq x \leq 1.2$.

Generally, nearly all $SiO_x$ molecules are said to disproportionate and separate into two phases at a temperature of not lower than 1000° C. in an oxygen-less state. Specifically, by heating a material including an amorphous $SiO_x$ powder at 1000 to 1200° C. for 1 to 5 hours in an inert atmosphere such as under vacuum or in an inert gas, a silicon oxide powder including two phases, i.e., an amorphous $SiO_2$ phase and a crystalline Si phase, is obtained.

Furthermore, as the negative electrode active material, a material obtained by compositing 1 to 50 mass % of a carbon material with respect to $SiO_x$ may be used. A secondary battery including the negative electrode active material has improved cycle characteristics. When the composited amount of the carbon material is less than 1 mass %, the advantageous effect regarding the improvement of conductivity is not obtained in some cases; whereas when the composited amount is more than 50 mass %, the relative proportion of $SiO_x$ becomes less and negative-electrode capacity reduces. The composited amount of the carbon material with respect to $SiO_x$ is preferably within a range of 5 to 30 mass %, and further preferably within a range of 5 to 20 mass %. CVD or the like may be used for compositing the carbon material with respect to $SiO_x$.

The mean particle size (D50) of the silicon oxide powder is preferably within a range of 1 μm to 10 μm. When the mean particle size is larger than 10 μm, durability of the nonaqueous secondary battery deteriorates in some cases; whereas when the mean particle size is smaller than 1 μm, durability of the nonaqueous secondary battery deteriorates similarly in some cases since bulky particles are obtained through aggregation.

The conductive additive is added if necessary for increasing conductivity of the electrode. As the conductive additive, carbonaceous fine particles such as carbon black, graphite, acetylene black (AB), Ketchen black (KB) (registered trademark), vapor grown carbon fiber (VGCF), and the like may be added singly or in a combination of two or more. One mode of the vapor grown carbon fiber is a carbon nanotube. Here, a carbon nanotube refers to those having a tubular shape with a diameter of 10 to 50 nm and a length of 1 to 50 µm. The carbon nanotube forms a long conducting path because of the structural characteristics thereof. When the carbon nanotube is used as the conductive additive, the carbon nanotube is preferably used in combination with another conductive additive such as acetylene black. When used in combination, the preferable mass ratio between the carbon nanotube and another conductive additive is 1:9 to 5:5.

Although the usage amount of the conductive additive is not limited in particular, for example, about 20 to 100 parts by mass may be used with respect to 100 parts by mass of the active material. When the amount of the conductive additive is less than 20 parts by mass, an efficient conducting path is not formed in some cases; whereas when the amount is more than 100 parts by mass, moldability of the electrode worsens and energy density of the electrode becomes low in some cases. When the silicon oxide composited with the carbon material is used as the active material, the added amount of the conductive additive may be reduced or may be zero.

The organic solvent is not limited in particular, and a mixture of multiple solvents may be used. As the organic solvent, N-methyl-2-pyrrolidone, or a mixed solvent of N-methyl-2-pyrrolidone, and an ester based solvent or a glyme based solvent is particularly preferable. Examples of the ester based solvent include ethyl acetate, n-butyl acetate, butyl cellosolve acetate, butyl carbitol acetate, and the like; whereas, examples of the glyme based solvent include diglyme, triglyme, tetraglyme, and the like.

When the nonaqueous secondary battery is a lithium ion secondary battery, lithium may be predoped on the negative electrode. For the doping of the negative electrode with lithium, for example, an electrode forming method of assembling a half cell using metal lithium as a counter electrode, and electrochemically conducting lithium doping may be used. The degree of lithium doping is not particularly limited.

<Nonaqueous Secondary Battery>

In a case with a lithium ion secondary battery having the negative electrode described above, a not-particularly limited positive electrode, electrolytic solution, or separator known in the art may be used. Any positive electrode may be used as long as the positive electrode is one that is usable in a nonaqueous secondary battery. The positive electrode includes a current collector, and a positive electrode active material layer bound on the current collector. A positive electrode active material layer contains the positive electrode active material and the binder, and may further contain a conductive additive. The positive electrode active material, the conductive additive, and the binder are not particularly limited, and those usable in a lithium ion secondary battery may be used.

The positive electrode includes a positive electrode active material capable of occluding and releasing lithium ions. The positive electrode includes a current collector and the positive electrode active material layer bound to the surface of the current collector. The positive electrode active material layer includes a positive electrode active material, and, if necessary, a binder and/or a conductive additive. The current collector of the positive electrode is not particularly limited as long as the current collector is a metal capable of withstanding a voltage suited for the active material that is used. Examples of the current collector include at least one selected from silver, copper, gold, aluminum, tungsten, cobalt, zinc, nickel, iron, platinum, tin, indium, titanium, ruthenium, tantalum, chromium, or molybdenum, and metal materials such as stainless steel. The current collector may be coated with a protective layer known in the art. One obtained by treating the surface of the current collector with a method known in the art may be used as the current collector.

The current collector takes forms such as a foil, a sheet, a film, a line shape, a bar shape, and a mesh. Thus, as the current collector, for example, metal foils such as copper foil, nickel foil, aluminum foil, and stainless steel foil are suitably used. When the current collector is in the form of a foil, a sheet, or a film, its thickness is preferably within a range of 1 µm to 100 µm.

The binder and the conductive additive of the positive electrode are similar to those described in relation to the negative electrode.

Examples of the positive electrode active material include layer compounds that are $Li_aNi_bCo_cMn_dD_eO_f$ ($0.2 \leq a \leq 1.2$; $b+c+d+e=1$; $0 \leq e <1$; D is at least one element selected from Li, Fe, Cr, Cu, Zn, Ca, Mg, S, Si, Na, K, Al, Zr, Ti, P, Ga, Ge, V, Mo, Nb, W, or La; $1.7 \leq f \leq 2.1$) and $Li_2MnO_3$. Additional examples of the positive electrode active material include spinel such as $LiMn_2O_4$, a solid solution formed from a mixture of spinel and a layer compound, and polyanion based compounds such as $LiMPO_4$, $LiMVO_4$, or $Li_2MSiO_4$ (wherein, "M" is selected from at least one of Co, Ni, Mn, or Fe). Further additional examples of the positive electrode active material include tavorite based compounds represented by $LiMPO_4F$ ("M" is a transition metal) such as $LiFePO_4F$ and borate based compounds represented by $LiMBO_3$ ("M" is a transition metal) such as $LiFeBO_3$. Any metal oxide used as the positive electrode active material may have a basic composition of the composition formulae described above, and those in which a metal element included in the basic composition is substituted with another metal element may also be used. In addition, as the positive electrode active material, a raw material for the positive electrode active material not including a lithium ion contributing to the charging and discharging may be used, such as, for example, elemental substance sulfur, a compound that is a composite of sulfur and carbon, metal sulfides such as $TiS_2$, oxides such as $V_2O_5$ and $MnO_2$, polyaniline and anthraquinone and compounds including such aromatics in the chemical structure, conjugate based materials such as conjugate diacetic acid based organic matters, and other materials known in the art. Furthermore, a compound having a stable radical such as nitroxide, nitronyl nitroxide, galvinoxyl, and phenoxyl may be used as the positive electrode active material. When a material for the positive electrode active material not containing lithium is to be used, an ion has to be added in advance to the positive electrode and/or the negative electrode using a method known in the art. For the purpose of adding the ion, a metal or a compound including the ion may be used.

In order to form the active material layer on the surface of the current collector, the active material may be applied on the surface of the current collector using a conventional method known in the art such as roll coating method, die coating method, dip coating method, doctor blade method, spray coating method, and curtain coating method. Specifically, an active material layer forming composition including the active material and, if necessary, the binder and the conductive additive are prepared, and, after adding a suitable solvent to this composition to obtain a paste, the paste is applied on the surface of the current collector and then dried.

Examples of the solvent include organic solvents such as N-methyl-2-pyrrolidone (hereinafter, abbreviated as NMP in some cases), methanol, and methyl isobutyl ketone, and water. In order to increase electrode density, compression may be performed after drying.

The electrolytic solution is obtained by dissolving a lithium metal salt, which is an electrolyte, in the organic solvent. The electrolytic solution is not limited in particular. As the organic solvent, one or more types selected from aprotic organic solvents such as, for example, propylene carbonate (PC), ethylene carbonate (EC), dimethyl carbonate (DMC), diethyl carbonate (DEC), and ethyl methyl carbonate (EMC) may be used. Those described within parentheses above are respective abbreviations of the substances. As the electrolyte to be dissolved, a lithium metal salt that is soluble to the organic solvent, such as $LiPF_6$, $LiBF_4$, $LiAsF_6$, LiI, $LiClO_4$, and $LiCF_3SO_3$ may be used.

As the electrolytic solution, for example, a solution obtained by dissolving a lithium metal salt such as $LiClO_4$, $LiPF_6$, $LiBF_4$, or $LiCF_3SO_3$ in an organic solvent such as ethylene carbonate, dimethyl carbonate, propylene carbonate, or dimethyl carbonate at a concentration of about 0.5 mol/L to 1.7 mol/L may be used.

A separator is used in the lithium ion secondary battery, if necessary. The separator is for separating the positive electrode and the negative electrode to allow passage of lithium ions while preventing short circuiting of current due to a contact of both electrodes. Examples of the separator include porous materials, nonwoven fabrics, and woven fabrics using one or more types of materials having electrical insulation property such as: synthetic resins such as polytetrafluoroethylene, polypropylene, polyethylene, polyimide, polyamide, polyamide (aromatic polyamide), polyester, and polyacrylonitrile; polysaccharides such as cellulose and amylose; natural polymers such as fibroin, keratin, lignin, and suberin; and ceramics. In addition, the separator may have a multilayer structure.

One example of the method for producing the lithium ion secondary battery will be described.

An electrode assembly is formed from the positive electrode, the negative electrode, and, if necessary, the separator interposed therebetween. The electrode assembly may be a laminated type obtained by stacking the positive electrode, the separator, and the negative electrode, or a wound type obtained by winding the positive electrode, the separator, and the negative electrode. A nonaqueous secondary battery is formed by respectively connecting, using current collecting leads or the like, the positive electrode current collector to a positive electrode external connection terminal and the negative electrode current collector to a negative electrode external connection terminal, and adding the electrolytic solution to the electrode assembly. In addition, the nonaqueous secondary battery of the present invention preferably executes charging and discharging at a voltage range suitable for the types of active materials included in the electrodes.

The lithium ion secondary battery of the present invention may be mounted on a vehicle. The vehicle may be a vehicle that uses, as all or one portion of the source of power, electrical energy obtained from the lithium ion secondary battery, and examples thereof include electric vehicles and hybrid vehicles. When the lithium ion secondary battery is to be mounted on the vehicle, a plurality of the lithium ion secondary batteries may be connected in series to form an assembled battery. Other than the vehicles, examples of instruments on which the lithium ion secondary battery may be mounted include various home appliances, office instruments, and industrial instruments driven by a battery such as personal computers and portable communication devices. In addition, the negative electrode and the like including the negative electrode active material of the present invention may be used as power storage devices and power smoothing devices for wind power generation, photovoltaic power generation, hydroelectric power generation, and other power systems, power supply sources for auxiliary machineries and/or power of ships, etc., power supply sources for auxiliary machineries and/or power of aircraft and spacecraft, etc., auxiliary power supply for vehicles that do not use electricity as a source of power, power supply for movable household robots, power supply for system backup, power supply for uninterruptible power supply devices, and power storage devices for temporarily storing power required for charging at charge stations for electric vehicles.

The electrical storage device of the present invention may be understood as an electrical storage device including the Si/C complex, the Si/C/cationic polymer complex, or the Si/C/benzene-ring-containing polymer complex obtained from the one of the production methods. The configuration of any of these electrical storage devices may be obtained by appropriately combining those described above.

Although the embodiments of the present invention have been described above, the present invention is not limited to the embodiments. Without departing from the gist of the present invention, the present invention can be implemented in various modes with modifications and improvements, etc., that can be made by a person skilled in the art.

EXAMPLES

In the following, embodiments of the present invention are described specifically by means of Examples and Comparative Examples.

Example 1

A mixed solution of 7 ml of an HF aqueous solution having a concentration of 46 mass % and 56 ml of an HCl aqueous solution having a concentration of 36 mass % was set to a temperature of 0° C. in an ice bath, and 3.3 g of calcium disilicide was added thereto and the mixed solution was stirred in an argon gas current. After completion of foaming was confirmed, the mixed solution was warmed to room temperature, further stirred for 2 hours at room temperature, had 20 ml of distilled water added thereto, and further stirred for 10 minutes. At this moment, suspension of a yellow powder was observed.

Figure 1:
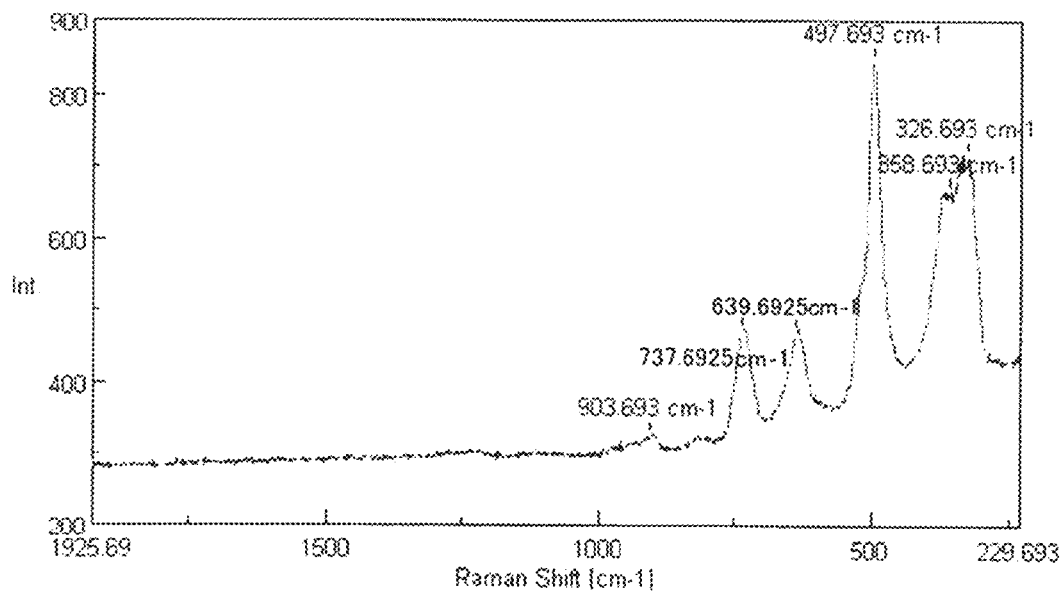
FIG. 1 is a Raman spectrum of a layered polysilane.
Figure 2:
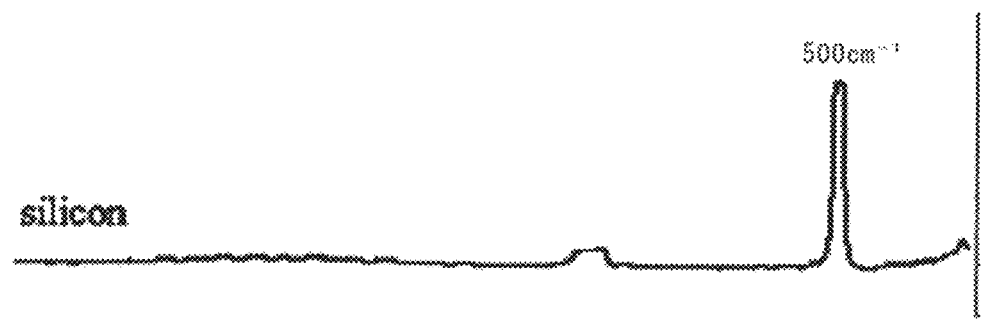
FIG. 2 is a Raman spectrum of a single-crystal silicon.
Figure 3:
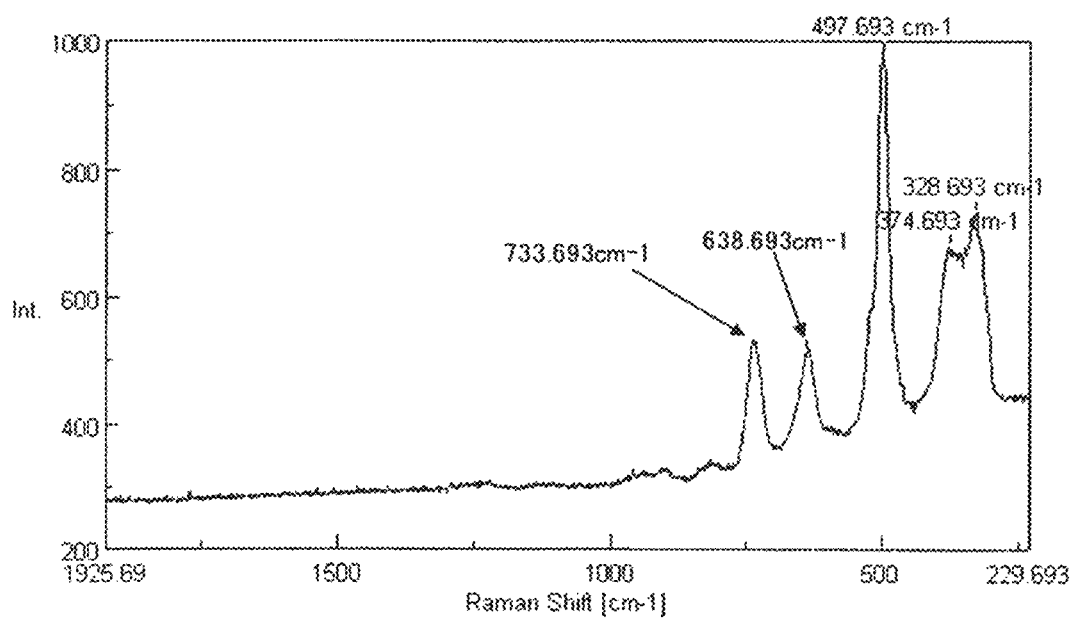
FIG. 3 is a Raman spectrum of a layered polysilane according to Example 1.

The obtained mixed solution was filtered, and the residue was rinsed with 10 ml of distilled water, rinsed with 10 ml of ethanol, and then vacuum dried to obtain 2.5 g of a layered polysilane. A Raman spectrum of that is shown in FIG. 3. Peaks of Raman shifts existed at $341\pm10$ $cm^{-1}$, $360\pm10$ $cm^{-1}$, $498\pm10$ $cm^{-1}$, $638\pm10$ $cm^{-1}$, and $734\pm10$ $cm^{-1}$.

Then, 1 g of the layered polysilane was weighed out, and was kept under heat for 1 hour at 500° C. in argon gas in which the amount of $O_2$ was not more than 1 vol % to obtain nano silicon aggregated particles. With respect to the nano silicon aggregated particles, X-ray diffraction measurement (XRD measurement) using CuKα radiation was conducted. In the XRD measurement, a halo considered to be derived from silicon particles was observed. The silicon crystallites had a crystallite size of approximately 7 nm calculated in accordance with Scherrer's equation from the half width of a diffraction peak of the (111) plane in the X-ray diffraction measurement result.

During the heating described above, Si—H bond of the layered polysilane is cut and hydrogen is detached, and cutting and rebinding of Si—Si bond occur. Rebinding of Si—Si bond occurs within the same layer and between adjacent layers. As a result, nano silicon particles having a diameter in the nano order are generated. Nano silicon aggregated particles (secondary particles) are generated as a result of the nano silicon particles binding to each other through aggregation and adhesion, multiple nano silicon particles binding to amorphous silicon, or the like.

SEM images of the obtained nano silicon aggregated particles are shown in FIGS. 4 and 5. The nano silicon aggregated particles have a structure in which multiple layers of a plate-like silicon body are overlaid in the thickness direction. FIG. 5 shows an enlarged view of the rectangular portion shown in FIG. 4. The thickness of the plate-like silicon body is observed to be approximately 10 nm to approximately 100 nm. However, from standpoints of strength and easy insertion/extraction of lithium ions and the like, the thickness of the plate-like silicon body is preferably within a range of 20 nm to 50 nm. Furthermore, the length thereof in the long axis direction was 0.1 µm to 50 µm. An aspect ratio (long axis direction length/thickness) of 2 to 1000 is conceivably preferable for the plate-like silicon body.

The plate-like silicon body was further observed with TEM (Transmission Electron Microscopy). As shown in FIG. 6, a light-and-dark banded structure was observed in the plate-like silicon body. FIG. 6 corresponds to the square portion in FIG. 5 in an enlarged view, and FIG. 7 shows a schematic cross sectional view showing, in an enlarged manner, relevant parts of the plate-like silicon body.

In FIG. 6, the light gray portions are thought to represent a structure in which flat nano silicon particles (1) are arranged in layers oriented perpendicularly with respect to the long sides of the plate-like silicon body, and the dark gray portions existing between the layers of the nano silicon particles (1) are thought to be gaps and/or a silicon oxide (2). A long axis direction length (a) and a short axis direction length (b) of the nano silicon particles (1) are respectively 5 nm to 20 nm and 2 to 5 nm, and a ratio (a/b) of lengths of the long axis and the short axis is 2.5 to 10. The thickness of the gaps and/or the silicon oxide (2) is 2 nm to 10 nm, and the ratio of the thickness of the gaps and/or the silicon oxide (2) with respect to the thickness of the nano silicon particles (1) is 0.5 to 2.

With respect to 1 g of the obtained nano silicon aggregated particles, 0.86 g of a resol-type phenolic resin solution (solid content: 58 mass %) dissolved in a mixed solvent of acetone and methanol was added, and thoroughly stirred to obtain a suspension. The weight ratio between the nano silicon aggregated particles and the phenolic resin in the suspension was Si/C=2/1. After the solvent was removed from the suspension, the phenolic resin was cured through heating for 1 hour at 120° C. under reduced pressure, and then carbonized through baking in argon gas for 20 minutes at 900° C. to obtain a Si/C complex. A Si/C weight ratio calculated from the weight of the recovered powder and the load amount was 80/20.

FIG. 8 shows the result of turning the obtained Si/C complex into a flake by using an ion milling method and observing the particles through TEM (Transmission Electron Microscopy). Similarly to FIG. 6, a structure was observed in which a light gray portion, and a portion where dark gray particles whose particle size for the longer diameter was approximately 10 nm were arranged in layers oriented perpendicularly with respect to the long sides of the plate-like silicon body, were overlaid in layers.

Thus, for the purpose of examining the composition at each spot of Points 1 to 5 in FIG. 8, TEM-EDX (energy dispersion type X-ray spectrometry) analysis was conducted. The results are respectively shown in FIGS. 9 to 13. Since compositions at Points 1 to 3 were 91.5 atm % or more of silicon (Si), the dark gray particles were confirmed to be nano silicon particles. Furthermore, since a large amount of carbon (C) and a minute amount of oxygen (O) were detected at Points 4 and 5 besides Si, the light gray portions were revealed to be carbon layers having a large amount of carbon (C). Thus, the phenolic resin conceivably had impregnated parts corresponding to the silicon oxide (2) and/or the gaps shown in FIG. 7 and was carbonized to form the carbon layer.

The obtained Si/C complex was ground so as to have a mean particle size of 10 µm by using a ball mill to prepare a Si/C complex I powder. Then, 100 g of zirconia balls (4 mm in diameter) was added with respect to 1 g of the Si/C complex, and the grinding was conducted for 2 hours at 70 rpm.

Figure 14:
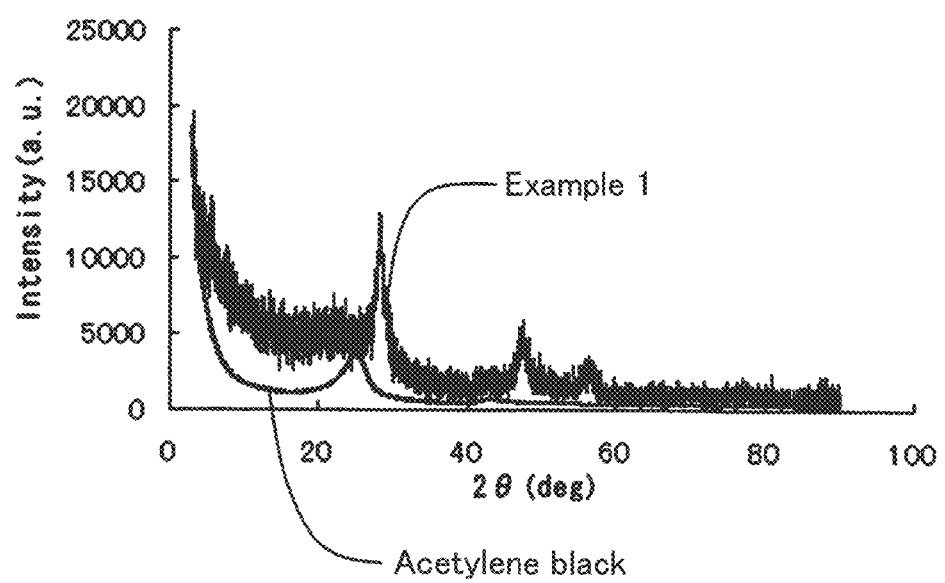
FIG. 14 shows XRD spectra of acetylene black and the Si/C complex powder according to Example 1.

With respect to the Si/C complex I powder, X-ray diffraction measurement (XRD measurement) using CuKα radiation was conducted. The XRD spectrum is shown in FIG. 14. FIG. 14 also shows an XRD spectrum of acetylene black. With the Si/C complex I powder, since a peak of 2θ=26° (crystalline carbon peak) existing for acetylene black was not observed, the carbon contained in the Si/C complex I powder is understood as to be amorphous. Based on the half width, the size of Si crystallites in the Si/C complex I powder is understood as to be not larger than 10 nm.

A slurry was prepared by mixing 70 parts by mass of the obtained Si/C complex I powder, 15 parts by mass of a natural graphite powder, 5 parts by mass of acetylene black, and 33 parts by mass of a binder solution. As the binder solution, a solution in which a polyamide imide resin was dissolved in N-methyl-2-pyrrolidone by 30 mass % was used. The slurry was applied on the surface of an electrolytic copper foil (current collector) having a thickness of approximately 20 µm by using a doctor blade, and then dried to form a negative electrode active material layer on the copper foil. Then, the current collector and the negative electrode active material layer were firmly adhered and joined by using a roll press machine. The obtained joined object was vacuum dried at 100° C. for 2 hours to form a negative electrode in which the thickness of the negative electrode active material layer was 16 µm. This was used as the negative electrode of Example 1.

A lithium ion secondary battery (half-cell) was produced by using, as the evaluation electrode, the negative electrode of Example 1. A metallic lithium foil (thickness: 500 µm) was used as the counter electrode.

The counter electrode and the evaluation electrode were respectively cut to have diameters of 13 mm and 11 mm, and a separator (glass filter manufactured by the Hoechst Celanese Corp., and "Celgard 2400" manufactured by Celgard LLC.) was interposed between the two to form an electrode assembly battery. The electrode assembly battery was housed in a battery case (member for CR2032 type coin batteries, manufactured by Hohsen Corp.). A nonaqueous electrolytic solution obtained by dissolving $LiPF_6$ at a concentration of 1 M in a mixed solvent in which ethylene carbonate and diethyl carbonate were mixed at 1:1 (volume ratio) was poured in the battery case, and then the battery case was sealed to obtain a lithium ion secondary battery of Example 1.

Example 2

A negative electrode of Example 2 was formed similarly to Example 1 while using a slurry obtained by mixing 45 parts by mass of the Si/C complex I powder of Example 1, 40 parts by mass of the natural graphite powder, 5 parts by mass of acetylene black, and 33 parts by mass of the binder solution. A lithium ion secondary battery of Example 2 was obtained similarly to Example 1 while using the negative electrode of Example 2.

Example 3

A negative electrode of Example 3 was formed similarly to Example 1 while using a slurry obtained by mixing 25 parts by mass of the Si/C complex I powder of Example 1, 60 parts by mass of the natural graphite powder, 5 parts by mass of acetylene black, and 33 parts by mass of the binder solution. A lithium ion secondary battery of Example 3 was obtained similarly to Example 1 while using the negative electrode of Example 3.

Example 4

A negative electrode of Example 4 was formed similarly to Example 1 while using a slurry obtained by mixing 45 parts by mass of the Si/C complex I powder of Example 1, 40 parts by mass of an artificial graphite powder, 5 parts by mass of acetylene black, and 33 parts by mass of the binder solution. A lithium ion secondary battery of Example 4 was obtained similarly to Example 1 while using the negative electrode of Example 4.

Example 5

A negative electrode of Example 5 was formed similarly to Example 1 while using a slurry obtained by mixing 45 parts by mass of a powder of nano silicon aggregated particles produced similarly to Example 1, 40 parts by mass of the natural graphite powder, 5 parts by mass of acetylene black, and 33 parts by mass of the binder solution. A lithium ion secondary battery of Example 5 was obtained similarly to Example 1 while using the negative electrode of Example 5.

Example 6

Nano silicon aggregated particles obtained similarly to Example 1 were placed in a rotary kiln type reactor, and thermal CVD was conducted thereon under a flow of a butane-containing inert gas with a condition of 800° C. and a retention time of 5 minutes to obtain a Si/C complex II of Example 6. The furnace core tube of the reactor was arranged horizontally and the rotational speed was set to 1 rpm. A baffle plate was arranged on the inner circumference wall of the furnace core tube, and was configured such that a content deposited on the baffle plate falls off the baffle plate from a predetermined height associated with rotation, and the content was stirred because of the configuration.

Figure 15:
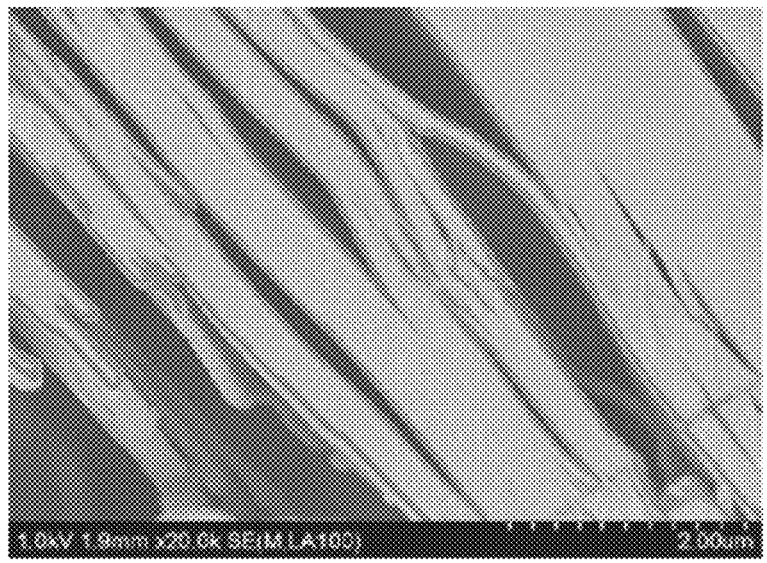
FIG. 15 is an SEM image of a complex powder prepared in Example 6.
Figure 16:
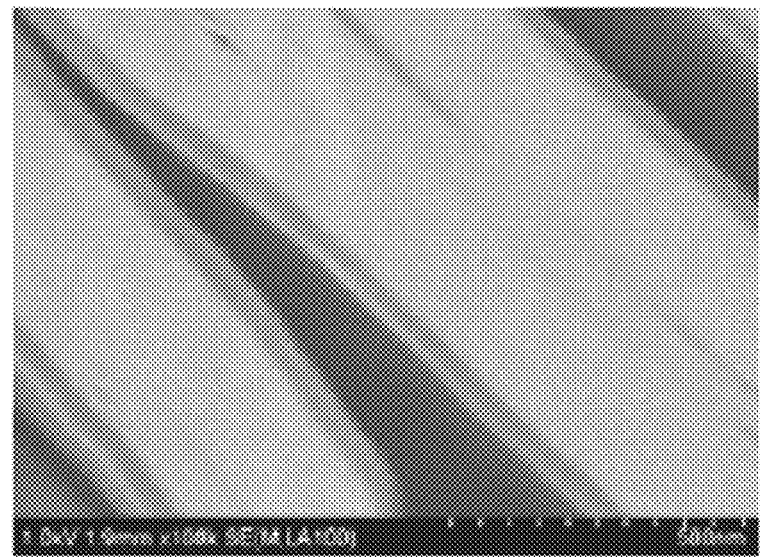
FIG. 16 is an SEM image of the complex powder prepared in Example 6 but with a magnification different from that in FIG. 15.

SEM images of a powder of the Si/C complex II of Example 6 are shown in FIGS. 15 and 16. Formation of a gray carbon layer on the surface of the plate-like silicon body is observed. From SEM observation of cross sections, seven particles were randomly selected in the complex powder, and the thickness of the carbon layer was measured at five points of each of the particles, i.e., a total of 35 points. The average thickness (R) of the carbon layer was 23 nm, and the standard deviation ($\sigma$) of the thickness of the carbon layer was 5.7. As a result, relational formula (1) was expressed as $R/3\sigma=1.37$, and the carbon layer was shown to be formed in a uniform thickness.

The contained amount of carbon, measured through combustion in oxygen current (high-frequency dielectric-heating furnace method)-infrared-absorption method ("carbon/sulfur analyzer EMIA" manufactured by HORIBA, Ltd.), in the Si/C complex II powder of Example 6 was 6.8 wt %. In addition, the specific surface area of the Si/C complex II powder of Example 6, measured with BET method, was 4.9 m$^2$/g. A Raman spectrum of the carbon layer of the Si/C complex II powder of Example 6 was measured, and, from the spectrum, a G/D ratio, which is a ratio between G-band and D-band, was calculated. The G/D ratio was calculated from areas of peaks separated in the waveform in the Raman spectrum. The G/D ratio was 0.81. Furthermore, the Si/C complex II powder of Example 6 was molded into a circular-column shaped compact in which the diameter of the bottom surface thereof was 10 mm, and a resistance value in the height direction thereof and the height of the circular-column shaped compact were measured. A resistibility, which is a reciprocal of electric conductivity, was calculated as 3.0 Ω·cm, by multiplying the measured resistance value by an area of the circular base having a diameter of 10 mm, and dividing that with the height of the compact.

A slurry was prepared by mixing 45 parts by mass of the Si/C complex II powder of Example 6, 40 parts by mass of a natural graphite powder, 5 parts by mass of acetylene black, and 33 parts by mass of a binder solution. As the binder solution, a solution in which a polyamide imide resin was dissolved in N-methyl-2-pyrrolidone by 30 mass % was used. The slurry was applied on the surface of an electrolytic copper foil (current collector) having a thickness of approximately 20 μm by using a doctor blade, and then dried to form a negative electrode active material layer on the copper foil. Then, the current collector and the negative electrode active material layer were firmly adhered and joined by using a roll press machine. The obtained joined object was vacuum dried at 100° C. for 2 hours to form a negative electrode of Example 6 in which the thickness of the negative electrode active material layer was 16 μm.

A lithium ion secondary battery (half-cell) of Example 6 was produced similarly to Example 1 except for using the negative electrode of Example 6.

Example 7

A negative electrode was formed similarly to Example 1 while using a slurry obtained by mixing 85 parts by mass of the Si/C complex I powder of Example 1, 5 parts by mass of acetylene black, and 33 parts by mass of the binder solution. By using this negative electrode, a lithium ion secondary battery of Example 7 was obtained similarly to Example 1.

Comparative Example 1

A negative electrode was formed similarly to Example 1 while using a slurry obtained by mixing 85 parts by mass of a powder of nano silicon aggregated particles produced similarly to Example 1, 5 parts by mass of acetylene black, and 33 parts by mass of the binder solution. By using this negative electrode, a lithium ion secondary battery of Comparative Example 1 was obtained similarly to Example 1.

Comparative Example 2

A negative electrode was formed similarly to Example 1 while using a slurry obtained by mixing 85 parts by mass of the natural graphite powder, 5 parts by mass of acetylene black, and 33 parts by mass of the binder solution. By using this negative electrode, a lithium ion secondary battery of Comparative Example 2 was obtained similarly to Example 1.

Example 8

A slurry was prepared by mixing 85 parts by mass of the Si/C complex II powder of Example 6, 5 parts by mass of acetylene black, and 33 parts by mass of a binder solution. As the binder solution, a solution in which a polyamide imide resin was dissolved in N-methyl-2-pyrrolidone by 30 mass % was used. The slurry was applied on the surface of an electrolytic copper foil (current collector) having a thickness of approximately 20 μm by using a doctor blade, and then dried to form a negative electrode active material layer on the copper foil. Then, the current collector and the negative electrode active material layer were firmly adhered and joined by using a roll press machine. The obtained joined object was vacuum dried at 100° C. for 2 hours to form a negative electrode in which the thickness of the negative electrode active material layer was 16 μm.

A lithium ion secondary battery (half-cell) of Example 8 was produced similarly to Example 1 except for using this negative electrode.

<Battery Characteristic Test>

With respect to each of the lithium ion secondary batteries of Examples 1 to 8 and Comparative Examples 1 and 2, discharging was performed at a temperature of 25° C. with a current of 0.2 mA until the voltage of the evaluation electrode with respect to the counter electrode reached 0.01 V, and then charging was performed at a temperature of 25° C. with a current of 0.2 mA until the voltage of the evaluation electrode with respect to the counter electrode reached 1 V. From here, (charge capacity/discharge capacity)×100 was calculated as initial efficiency (%). The results are shown in Table 2.

Furthermore, by using each of the lithium ion secondary batteries, a cycle test of repeating a cycle of: discharging at a temperature of 25° C. with a current of 0.2 mA until the voltage of the evaluation electrode with respect to the counter electrode reached 0.01 V; after 10 minutes, charging at a temperature of 25° C. with a current of 0.2 mA until the voltage of the evaluation electrode with respect to the counter electrode reached 1 V; and pausing for 10 minutes was performed. After 30 cycles and 50 cycles, the values of 100× (charge capacity after respective cycles)/(charge capacity after 1 cycle) were calculated as capacity retention rates. The results are shown in Table 2.

attributed to using a mixture of the nano silicon and the natural graphite for the negative electrode active material.

The batteries of Examples 1 to 3 had improved cycle characteristics when compared to that of Example 7 and had a larger initial capacity when compared to that of Comparative Example 2. These advantageous effects are attributed to using a mixture of the Si/C complex and the natural graphite for the negative electrode active material.

When compared to those of Examples 2 and 4, the battery of Example 2 had a larger initial capacity and was slightly superior in other properties. Thus, as the graphite, the natural graphite was shown to be preferable over the artificial graphite.

From a comparison among Examples 1 to 3, the initial capacity was shown to decrease and the capacity retention rate was shown to improve as the content ratio of the natural graphite became larger. Thus, by adjusting the mixing ratio between the Si/C complex and the natural graphite, an intended battery characteristic is changeable, and thereby the degree of freedom in designing improves.

A comparison between Examples 2 and 5 shows using the Si/C complex instead the nano silicon largely improves cycle characteristics although the initial capacity slightly decreases. In addition, a comparison between Examples 2 and 6 shows using the Si/C complex II having a carbon layer formed through thermal CVD further improves cycle characteristics.

Example 9

A mixed solution of 7 mL of an HF aqueous solution having a concentration of 46 mass % and 56 mL of an HCl aqueous solution having a concentration of 36 mass % was set to a temperature of 0° C. in an ice bath, and 3.3 g of calcium disilicide was added thereto and the mixed solution was stirred in an argon gas current. After completion of foaming was confirmed, the mixed solution was warmed to room temperature, further stirred for 2 hours at room temperature, had 20 mL of distilled water added thereto, and further stirred for 10 minutes. At this moment, suspension of a yellow powder was observed.

TABLE 2

| | Contained Amount (mass %) | | | | | Initial Capacity (mAh/g) | Initial Efficiency (%) | Capacity Retention Rate (%) | |
|---|---|---|---|---|---|---|---|---|---|
| | Si/C Complex I | Si/C Complex II | Nano Silicon | Natural Graphite | Artificial Graphite | | | 30cyc | 50cyc |
| Example 1 | 70 | — | — | 15 | — | 1060 | 75 | 96 | 73 |
| Example 2 | 45 | — | — | 40 | — | 705 | 76 | 97 | 76 |
| Example 3 | 25 | — | — | 60 | — | 515 | 74 | 98 | 80 |
| Example 4 | 45 | — | — | — | 40 | 695 | 75 | 96 | 75 |
| Example 5 | — | — | 45 | 40 | — | 1590 | 71 | 56 | 40 |
| Example 6 | — | 45 | — | 40 | — | 970 | 75 | 90 | 80 |
| Example 7 | 85 | — | — | — | — | 1300 | 77 | 89 | 65 |
| Comparative Example 1 | — | — | 85 | — | — | 1072 | 65 | 33 | 25 |
| Comparative Example 2 | — | — | — | 85 | — | 310 | 77 | 99 | 98 |
| Example 8 | — | 85 | — | — | — | 1545 | 75 | 61 | 50 |

The battery of Example 5 has significantly improved cycle characteristics when compared to that of Comparative Example 1. In addition, the battery of Example 5 was superior in initial characteristics when compared to that of Comparative Example 2. These advantageous effects are The obtained mixed solution was filtered, and the residue was rinsed with 10 mL of distilled water, rinsed with 10 mL of ethanol, and then vacuum dried to obtain 2.5 g of a layered polysilane. In a Raman spectrum of that, peaks of Raman shifts existed at 341±10 cm$^{-1}$, 360±10 cm$^{-1}$, 498±10 cm$^{-1}$, 638±10 cm$^{-1}$, and 734±10 cm$^{-1}$.

Then, 1 g of the layered polysilane was weighed out, and was kept under heat for 1 hour at 500° C. in argon gas in which the amount of O$_2$ was not more than 1 vol % to obtain nano silicon aggregated particles. With respect to the nano silicon aggregated particles, X-ray diffraction measurement (XRD measurement) using CuKα radiation was conducted. In the XRD measurement, a halo considered to be derived from silicon particles was observed. The silicon crystallites had a crystallite size of approximately 7 nm calculated in accordance with Scherrer's equation from the half width of a diffraction peak of the Si (111) plane in the X-ray diffraction measurement result.

During the heating described above, Si—H bond of the layered polysilane is cut and hydrogen is detached, and cutting and rebinding of Si—Si bond occur. Rebinding of Si—Si bond occurs within the same layer and between adjacent layers. As a result, nano silicon particles having a diameter in the nano order are generated. Nano silicon aggregated particles (secondary particles) are generated as a result of the nano silicon particles binding to each other through aggregation and adhesion, multiple nano silicon particles binding to amorphous silicon, or the like.

As the carbonization step, the obtained nano silicon aggregated particles were placed in a rotary kiln type reactor, and thermal CVD was conducted thereon under a flow of a butane-containing inert gas with a condition of 800° C. and a retention time of 5 minutes to obtain a Si/C complex of Example 9. The furnace core tube of the reactor was arranged horizontally and the rotational speed was set to 1 rpm. A baffle plate was arranged on the inner circumference wall of the furnace core tube, and was configured such that a content deposited on the baffle plate falls off the baffle plate from a predetermined height associated with rotation, and the content was stirred because of the configuration.

SEM observation was performed on cross sections of the Si/C complex powder of Example 9. Seven particles were randomly selected in the Si/C complex powder, and the thickness of the carbon layer was measured at five points of each of the particles, i.e., a total of 35 points. The average thickness (R) of the carbon layer was 23 nm, and the standard deviation (σ) of the thickness of the carbon layer was 5.7. As a result, relational formula (1) was expressed as R/3σ=1.37, and the carbon layer was shown to be formed in a uniform thickness.

The contained amount of carbon in the Si/C complex powder of Example 9 was measured through combustion in oxygen current (high-frequency dielectric-heating furnace method)-infrared-absorption method ("carbon/sulfur analyzer EMIA" manufactured by HORIBA, Ltd.). In addition, the specific surface area of the Si/C complex powder of Example 9 was measured with BET method. A Raman spectrum of the carbon layer of the Si/C complex powder of Example 9 was measured, and, from the spectrum, a G/D ratio, which is a ratio between G-band and D-band, was calculated. The G/D ratio was calculated from areas of peaks separated in the waveform in the Raman spectrum.

Furthermore, the Si/C complex powder of Example 9 was molded into a circular-column shaped compact in which the diameter of the bottom surface thereof was 10 mm, and a resistance value in the height direction thereof and the height of the circular-column shaped compact were measured. A resistibility, which is a reciprocal of electric conductivity, was calculated by multiplying the measured resistance value by an area of the circular base having a diameter of 10 mm, and dividing that with the height of the compact. The results of physical properties of the Si/C complex powder of Example 9 described above are shown in Table 3.

A slurry was prepared by mixing 85 parts by mass of the Si/C complex powder of Example 9, 5 parts by mass of acetylene black, and 33 parts by mass of a binder solution. As the binder solution, a solution in which a polyamide imide resin was dissolved in N-methyl-2-pyrrolidone by 30 mass % was used. The slurry was applied on the surface of an electrolytic copper foil (current collector) having a thickness of approximately 20 μm by using a doctor blade, and then dried to form a negative electrode active material layer on the copper foil. Then, the current collector and the negative electrode active material layer were firmly adhered and joined by using a roll press machine. The obtained joined object was vacuum dried at 100° C. for 2 hours to form a negative electrode of Example 9 in which the thickness of the negative electrode active material layer was 16 μm.

A lithium ion secondary battery (half-cell) was produced by using, as the evaluation electrode, the negative electrode of Example 9. A metallic lithium foil having a thickness of 500 μm was used as the counter electrode.

The counter electrode and the evaluation electrode were respectively cut to have diameters of 13 mm and 11 mm, and a separator (glass filter manufactured by the Hoechst Celanese Corp., and "Celgard 2400" manufactured by Celgard LLC.) was interposed between the two electrodes to form an electrode assembly battery. The electrode assembly battery was housed in a battery case (member for CR2032 type coin batteries, manufactured by Hohsen Corp.). A nonaqueous electrolytic solution obtained by dissolving LiPF$_6$ at a concentration of 1 M in a mixed solvent in which ethylene carbonate and diethyl carbonate were mixed at 1:1 (volume ratio) was poured in the battery case, and then the battery case was sealed to obtain a lithium ion secondary battery of Example 9.

Example 10

A Si/C complex powder of Example 10 was obtained similarly to that of Example 9 except for setting the heating temperature at the carbonization step to 850° C. The average thickness (R) of the carbon layer, the standard deviation (σ) of the thickness of the carbon layer, the carbon content, the BET specific surface area, the G/D ratio, and the resistibility of the Si/C complex powder of Example 10 were measured similarly to the Si/C complex powder of Example 9. The results are shown in Table 3.

A lithium ion secondary battery (half-cell) of Example 10 was produced similarly to that of Example 9, except for using the Si/C complex powder of Example 10 as the negative electrode active material.

Example 11

A Si/C complex powder of Example 11 was obtained similarly to that of Example 9 except for setting the heating temperature at the carbonization step to 900° C. The average thickness (R) of the carbon layer, the standard deviation (σ) of the thickness of the carbon layer, the carbon content, the BET specific surface area, the G/D ratio, and the resistibility of the Si/C complex powder of Example 11 were measured similarly to the Si/C complex powder of Example 9. The results are shown in Table 3.

A lithium ion secondary battery (half-cell) of Example 11 was produced similarly to that of Example 9, except for using the Si/C complex powder of Example 11 as the negative electrode active material.

Example 12

A Si/C complex powder of Example 12 was obtained similarly to that of Example 9 except for, at the carbonization step, using a propane-containing inert gas instead of a butane-containing inert gas, and setting the heating temperature to 850° C. The average thickness (R) of the carbon layer, the standard deviation (σ) of the thickness of the carbon layer, the carbon content, the BET specific surface area, the G/D ratio, and the resistibility of the Si/C complex powder of Example 12 were measured similarly to the Si/C complex powder of Example 9. The results are shown in Table 3.

A lithium ion secondary battery (half-cell) of Example 12 was produced similarly to that of Example 9, except for using the Si/C complex powder of Example 12 as the negative electrode active material.

Example 13

A Si/C complex powder of Example 13 was obtained similarly to that of Example 9 except for, at the carbonization step, using an acetylene-containing inert gas instead of a butane-containing inert gas, setting the heating temperature to 700° C., and setting the retention time to 120 minutes. The average thickness (R) of the carbon layer, the standard deviation (σ) of the thickness of the carbon layer, the carbon content, the BET specific surface area, the G/D ratio, and the resistibility of the Si/C complex powder of Example 13 were measured similarly to the Si/C complex powder of Example 9. The results are shown in Table 3.

A lithium ion secondary battery (half-cell) of Example 13 was produced similarly to that of Example 9, except for using the Si/C complex powder of Example 13 as the negative electrode active material.

Example 14

A Si/C complex powder of Example 14 was obtained similarly to that of Example 9 except for, at the carbonization step, using an acetylene-containing inert gas instead of a butane-containing inert gas, setting the heating temperature to 700° C., setting the retention time to 120 minutes, and applying heat for 30 minutes at 900° C. after shut down of gas. The average thickness (R) of the carbon layer, the standard deviation (σ) of the thickness of the carbon layer, the carbon content, the BET specific surface area, the G/D ratio, and the resistibility of the Si/C complex powder of Example 14 were measured similarly to the Si/C complex powder of Example 9. The results are shown in Table 3.

A slurry was prepared by mixing 45 parts by mass of the Si/C complex powder of Example 14, 40 parts by mass of a natural graphite powder, 5 parts by mass of acetylene black, and 33 parts by mass of a binder solution. As the binder solution, a solution in which a polyamide imide resin was dissolved in N-methyl-2-pyrrolidone by 30 mass % was used. The slurry was applied on the surface of an electrolytic copper foil (current collector) having a thickness of approximately 20 μm by using a doctor blade, and then dried to form a negative electrode active material layer on the copper foil. Then, the current collector and the negative electrode active material layer were firmly adhered and joined by using a roll press machine. The obtained joined object was vacuum dried at 100° C. for 2 hours to form a negative electrode of Example 14 in which the thickness of the negative electrode active material layer was 16 μm.

A lithium ion secondary battery (half-cell) of Example 14 was produced similarly to that of Example 9, except for using the negative electrode of Example 14.

Example 15

A Si/C complex powder of Example 15 was obtained similarly to that of Example 9 except for, at the carbonization step, using an acetylene-containing inert gas instead of a butane-containing inert gas, setting the heating temperature to 700° C., setting the retention time to 60 minutes, and applying heat for 30 minutes at 900° C. after shut down of gas. The average thickness (R) of the carbon layer, the standard deviation (σ) of the thickness of the carbon layer, the carbon content, the BET specific surface area, the G/D ratio, and the resistibility of the Si/C complex powder of Example 15 were measured similarly to the Si/C complex powder of Example 9. The results are shown in Table 3.

A lithium ion secondary battery (half-cell) of Example 15 was produced similarly to that of Example 14, except for using the Si/C complex powder of Example 15.

Example 16

A Si/C complex powder of Example 16 was obtained similarly to that of Example 9 except for, at the carbonization step, using an acetylene-containing inert gas instead of a butane-containing inert gas, setting the heating temperature to 450° C., setting the retention time to 60 minutes, and applying heat for 30 minutes at 900° C. after shut down of gas. The average thickness (R) of the carbon layer, the standard deviation (σ) of the thickness of the carbon layer, the carbon content, the BET specific surface area, the G/D ratio, and the resistibility of the Si/C complex powder of Example 16 were measured similarly to the Si/C complex powder of Example 9. The results are shown in Table 3.

A lithium ion secondary battery (half-cell) of Example 16 was produced similarly to that of Example 14, except for using the Si/C complex powder of Example 16.

Example 17

A Si/C complex powder of Example 17 was obtained similarly to that of Example 12, except for increasing the load amount of the nano silicon aggregated particles by 30 times, increasing the flow rate of the propane-containing inert gas by 10 times, and setting the retention time to 60 minutes. The average thickness (R) of the carbon layer, the standard deviation (σ) of the thickness of the carbon layer, the carbon content, the BET specific surface area, the G/D ratio, and the resistibility of the Si/C complex powder of Example 17 were measured similarly to the Si/C complex powder of Example 9. The results are shown in Table 3.

A lithium ion secondary battery (half-cell) of Example 17 was produced similarly to that of Example 9, except for using the Si/C complex powder of Example 17.

Example 18

Nano silicon aggregated particles obtained with a method similar to that in Example 9 were placed in a rotary kiln type reactor, and thermal CVD was conducted thereon under a flow of a hexane-containing inert gas with a condition of 850° C. and a retention time of 20 minutes to obtain a Si/C complex of Example 18. The hexane-containing inert gas is a gas obtained by bubbling an inert gas in hexane. The average thickness (R) of the carbon layer, the standard deviation (σ) of the thickness of the carbon layer, the carbon content, the BET specific surface area, the G/D ratio, and the resistibility of the Si/C complex powder of Example 18 were measured similarly to the Si/C complex powder of Example 9. The results are shown in Table 3.

A lithium ion secondary battery (half-cell) of Example 18 was produced similarly to that of Example 9, except for using the Si/C complex powder of Example 18.

Comparative Example 3

A lithium ion secondary battery (half-cell) of Comparative Example 3 was produced similarly to that of Example 9, except for using, as the negative electrode active material, the nano silicon aggregated particles obtained in Example 9 but without conducting thermal CVD thereon.

Comparative Example 4

A Si/C complex powder of Comparative Example 4 was obtained similarly to that of Example 9 except for setting the heating temperature of thermal CVD to 700° C. The average thickness (R) of the carbon layer, the standard deviation (σ) of the thickness of the carbon layer, the carbon content, the BET specific surface area, the G/D ratio, and the resistivity of the Si/C complex powder of Comparative Example 4 were measured similarly to the Si/C complex powder of Example 9. The results are shown in Table 3. In the Si/C complex powder of Comparative Example 4, the carbon layer was too thin, and thereby measurements of the average thickness (R) and the standard deviation (σ) of the thickness of the carbon layer were not possible.

A lithium ion secondary battery (half-cell) of Comparative Example 4 was produced similarly to that of Example 9, except for using the Si/C complex powder of Comparative Example 4 as the negative electrode active material.

Example 19

A lithium ion secondary battery (half-cell) of Example 19 was produced similarly to that of Example 9, except for using, as the negative electrode active material, 45 parts by mass of the Si/C complex powder of Comparative Example 4 and 40 parts by mass of the natural graphite powder.

Example 20

A Si/C complex powder of Example 20 was obtained similarly to that of Example 9 except for, when performing thermal CVD, using propane gas instead butane gas, setting the heating temperature to 850° C., and setting the retention time to 20 minutes. The average thickness (R) of the carbon layer, the standard deviation (σ) of the thickness of the carbon layer, the carbon content, the BET specific surface area, the G/D ratio, and the resistivity of the Si/C complex powder of Example 20 were measured similarly to the Si/C complex powder of Example 9. The results are shown in Table 3.

A lithium ion secondary battery (half-cell) of Example 20 was produced similarly to that of Example 9, except for using the Si/C complex powder of Example 20 as the negative electrode active material.

Example 21

With respect to 1 g of the nano silicon aggregated particles obtained in Example 9, 0.86 g of a resol-type phenolic resin solution (solid content: 58 mass %) dissolved in a mixed solvent of acetone and methanol was added, and thoroughly stirred to obtain a suspension. The weight ratio between the nano silicon aggregated particles and the phenolic resin in the suspension was Si/C=2/1. After the solvent was removed from the suspension, the phenolic resin was cured through heating for 1 hour at 120° C. under reduced pressure, and then carbonized through baking in argon gas for 20 minutes at 900° C. to obtain a Si/C complex. The obtained Si/C complex was ground so as to have a mean particle size of 10 μm by using a ball mill to prepare a Si/C complex powder of Example 21. Then, 100 g of zirconia balls (4 mm in diameter) was added with respect to 1 g of the Si/C complex, and the grinding was conducted for 2 hours at 70 rpm.

The average thickness (R) of the carbon layer, the standard deviation (σ) of the thickness of the carbon layer, and the carbon content of the Si/C complex powder of Example 21 were measured similarly to the Si/C complex powder of Example 9. The results are shown in Table 3.

A lithium ion secondary battery (half-cell) of Example 21 was produced similarly to that of Example 9, except for using the Si/C complex powder of Example 21 as the negative electrode active material.

<Evaluation>

TABLE 3

| | Carbonization Step | | | Carbon Layer | | | | | | |
|---|---|---|---|---|---|---|---|---|---|---|
| | Carbon Source | Heating Temperature (° C.) | Time (min) | R (nm) | Wt % | σ | R/3σ | Specific Surface Area (m²/g) | G/D | Resistivity (Ωcm) |
| Example 9 | $C_4H_{10}$ | 800 | 5 | 23 | 6.8 | 5.7 | 1.35 | 4.9 | 0.81 | $3.0 \times 1$ |
| Example 10 | $C_4H_{10}$ | 850 | 5 | 44 | 12.8 | 9.6 | 1.53 | 4.2 | 0.78 | $9.0 \times 10^{-1}$ |
| Example 11 | $C_4H_{10}$ | 900 | 5 | 98 | 27.0 | 22.5 | 1.45 | 2.1 | 0.72 | $5.0 \times 10^{-1}$ |
| Example 12 | $C_3H_8$ | 850 | 5 | 51 | 13.8 | 10.5 | 1.62 | 4.9 | 0.80 | $1.0 \times 1$ |
| Example 13 | $C_2H_2$ | 700 | 120 | 45 | 13.0 | 9.1 | 1.65 | 6.1 | 0.90 | $1.2 \times 1$ |
| Example 14 | $C_2H_2$ | 700-900 | 120 | 45 | 13.0 | 12.1 | 1.24 | 7.0 | 0.73 | $4.0 \times 10^{-1}$ |
| Example 15 | $C_2H_2$ | 700-900 | 60 | 10 | 6.0 | 6.7 | 1.52 | 6.5 | 0.81 | $6.5 \times 10^{-2}$ |
| Example 16 | $C_2H_2$ | 450-900 | 60 | 2 | 2.8 | 0.55 | 1.21 | 12.0 | 0.83 | $1.4 \times 1$ |
| Example 17 | $C_3H_8$ | 850 | 60 | 46 | 13.2 | 9.3 | 1.65 | 5.3 | 0.81 | $1.0 \times 1$ |
| Example 18 | $C_6H_{14}$ | 850 | 20 | 21 | 6.6 | 5.9 | 1.18 | 4.9 | 0.82 | $4.2 \times 1$ |
| Comparative Example 3 | — | — | — | — | 0 | — | — | 15.0 | — | $3.5 \times 10^6$ |
| Comparative Example 4 | $C_4H_{10}$ | 700 | 5 | Approximately 0 | 0.1 | — | — | 7.5 | 0.90 | $5.0 \times 10^2$ |
| Example 20 | $C_3H_8$ | 850 | 20 | 140 | 38.4 | 33.2 | 1.41 | 2.5 | 0.80 | $9.8 \times 10^{-1}$ |
| Example 21 | Phenolic Resin | 900 | 20 | 20 | 5.3 | 49.3 | 0.137 | — | — | — |

Figure 17:
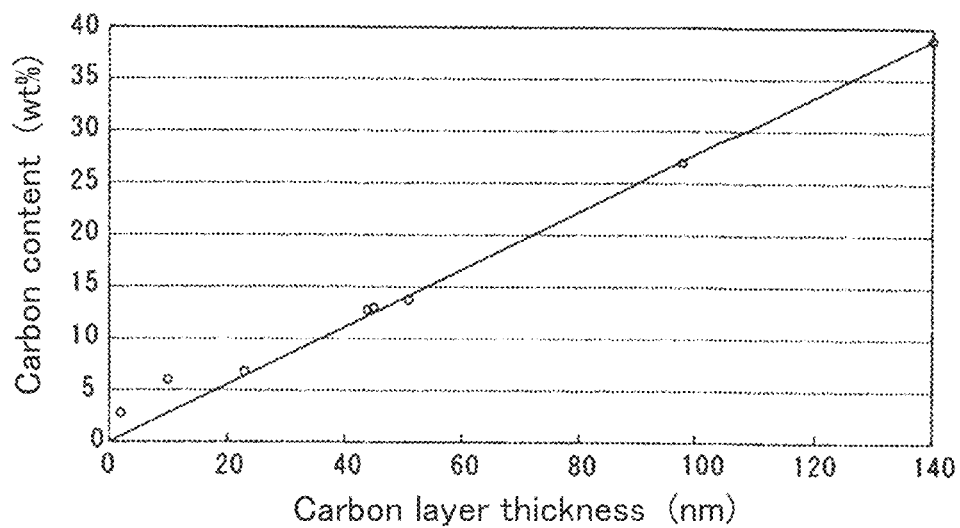
FIG. 17 is a graph showing the relationship between carbon layer thickness and carbon content of the Si/C complex.
Figure 18:
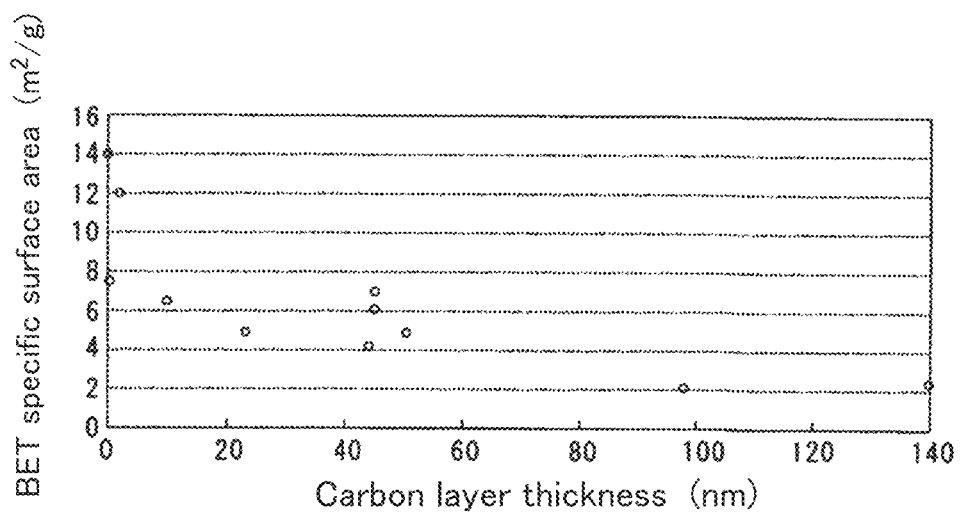
FIG. 18 is a graph showing the relationship between carbon layer thickness and BET specific surface area of the Si/C complex.
Figure 19:
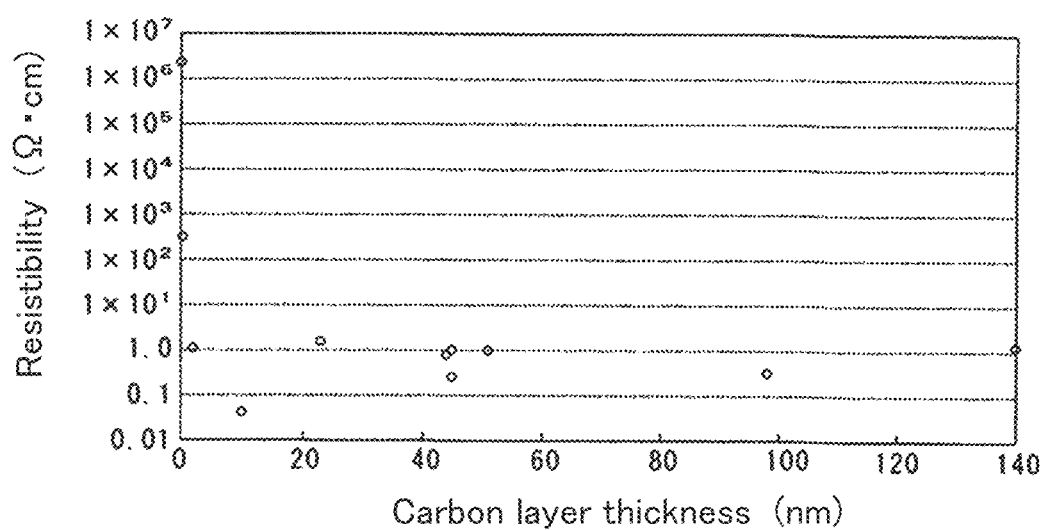
FIG. 19 is a graph showing the relationship between carbon layer thickness and resistibility of the Si/C complex.

Based on the numerical values in Table 3, the relationship between carbon content and average thickness (R) of the carbon layers of the Si/C complex is shown in FIG. 17, the relationship between BET specific surface area and average thickness (R) of the carbon layer of the Si/C complex is shown in FIG. 18, and the relationship between resistibility and average thickness (R) of the carbon layer of the Si/C complex is shown in FIG. 19.

The carbon content and the average thickness (R) of the carbon layer of the Si/C complex are shown to be in a direct proportional relationship. In addition, forming the carbon layer clearly resulted in reduction of the BET specific surface area and a decrease in resistibility, i.e., an increase in electric conductivity.

<Battery Characteristic Test>

With respect to the lithium ion secondary batteries of Examples 9 to 21 and Comparative Examples 3 and 4, discharging was performed at a temperature of 25° C. with a current of 0.2 mA until the voltage of the evaluation electrode with respect to the counter electrode reached 0.01 V, and then charging was performed at a temperature of 25° C. with a current of 0.2 mA until the voltage of the evaluation electrode with respect to the counter electrode reached 1 V. From here, (charge capacity/discharge capacity)×100 was calculated as initial efficiency (%). The results are shown in Table 4.

Furthermore, by using each of the lithium ion secondary batteries, a cycle test of repeating, for 30 cycles, a cycle of: discharging at a temperature of 25° C. with a current of 0.2 mA until the voltage of the evaluation electrode with respect to the counter electrode reached 0.01 V; after 10 minutes, charging at a temperature of 25° C. with a current of 0.2 mA until the voltage of the evaluation electrode with respect to the counter electrode reached 1 V; and pausing for 10 minutes was performed. A value of 100×(charge capacity after 30 cycles)/(charge capacity after 1 cycle) was calculated as a capacity retention rate. The results are shown in Table 4.

TABLE 4

|  | Discharge Capacity (mAh/g) | Charge Capacity (mAh/g) | Initial Efficiency (%) | 30-cycle Capacity Retention Rate (%) |
| --- | --- | --- | --- | --- |
| Example 9 | 1506 | 1130 | 75 | 83 |
| Example 10 | 1467 | 1100 | 75 | 84 |
| Example 11 | 1444 | 1040 | 72 | 88 |
| Example 12 | 1535 | 1090 | 71 | 85 |
| Example 13 | 1510 | 1120 | 74 | 89 |
| Example 14 | 1052 | 800 | 76 | 89 |
| Example 15 | 1082 | 812 | 75 | 87 |
| Example 16 | 1138 | 820 | 72 | 84 |
| Example 17 | 1498 | 1118 | 75 | 93 |
| Example 18 | 1529 | 1146 | 75 | 91 |
| Comparative Example 3 | 1650 | 1072 | 65 | 38 |
| Comparative Example 4 | 1610 | 1092 | 66 | 49 |
| Example 19 | 1223 | 795 | 65 | 47 |
| Example 20 | 1041 | 698 | 67 | 85 |
| Example 21 | 1550 | 1147 | 74 | 66 |

The lithium ion secondary batteries according to the Examples had higher initial efficiency when compared to those of the Comparative Examples. In addition, the lithium ion secondary batteries of Examples 9 to 18, and 20 were shown to be particularly superior in cycle characteristics. The preferable advantageous effect regarding cycle characteristics is thought to be a result of forming a carbon layer with a uniform and predetermined thickness.

Example 22

A Si/C complex and a lithium ion secondary battery of Example 22 were produced as described in the following.

A mixture was obtained by mixing 1 g of $CaSi_2$ and 1.3 g of polyvinyl chloride (degree of polymerization: 1100). In the mixture, the mol ratio between Ca and Cl was 1:2. The mixture was disposed in an electric furnace in an argon atmosphere. The temperature of the electric furnace was set to 200° C. and the mixture was heated for 1 hour at 200° C. Next, the temperature of the electric furnace was set to 300° C. and the mixture was heated for 1 hour at 300° C. Furthermore, the temperature of the electric furnace was set to 900° C. and the mixture was heated for 1 hour at 900° C. to obtain a baked object.

The obtained baked object was rinsed with water, rinsed with acetone, and then dried under reduced pressure to obtain a black Si/C complex of Example 22.

A slurry was prepared by mixing 45 parts by mass of the Si/C complex of Example 22 as a negative electrode active material, 40 parts by mass of a natural graphite as a negative electrode active material, 5 parts by mass of acetylene black as the conductive additive, 10 parts by mass of polyamide-imide as the binder, and N-methyl-2-pyrrolidone as the solvent. The slurry was applied, by using a doctor blade, on the surface of an electrolytic copper foil that functions as the current collector and has a thickness of approximately 20 μm, and then dried to form a negative electrode active material layer on the copper foil. Then, the current collector and the negative electrode active material layer were firmly adhered and joined by using a roll press machine. The obtained joined object was vacuum dried at 200° C. for 2 hours to form a negative electrode in which the thickness of the negative electrode active material layer was 20 μm.

A lithium ion secondary battery (half-cell) was produced by using, as the evaluation electrode, the negative electrode produced through the above described procedure. A metallic lithium foil (thickness: 500 μm) was used as the counter electrode.

The counter electrode and the evaluation electrode were respectively cut to have diameters of 13 mm and 11 mm, and a separator (glass filter manufactured by the Hoechst Celanese Corp., and "Celgard 2400" manufactured by Celgard LLC.) was interposed between the two electrodes to form an electrode assembly. The electrode assembly was housed in a battery case (member for CR2032 type coin batteries, manufactured by Hohsen Corp.). A nonaqueous electrolytic solution obtained by dissolving $LiPF_6$ at a concentration of 1 M in a mixed solvent in which ethylene carbonate and diethyl carbonate were mixed at 1:1 (volume ratio) was poured in the battery case, and then the battery case was sealed to obtain a lithium ion secondary battery of Example 22.

Example 23

A mixed solution of 7 mL of an HF aqueous solution having a concentration of 46 mass % and 56 mL of an HCl aqueous solution having a concentration of 36 mass % was set to a temperature of 0° C. in an ice bath. Then, 3.3 g of $CaSi_2$ was added to the mixed solution in an argon gas current and the mixed solution was stirred. After completion of foaming from the reaction liquid was confirmed, the reaction liquid was warmed to room temperature, further stirred for 2 hours at room temperature, had 20 mL of distilled water added thereto, and further stirred for 10 minutes. At this moment, suspension of a yellow powder was observed.

The obtained reaction liquid was filtered, and the residue was rinsed with 10 mL of distilled water, rinsed with 10 mL of ethanol, and then vacuum dried to obtain 2.5 g of a layered polysilane.

Then, 1 g of the layered polysilane was weighed out, and was kept under heat for 1 hour at 500° C. in an argon gas atmosphere in which the amount of $O_2$ was not more than 1 vol % to obtain nano silicon aggregated particles.

A lithium ion secondary battery of Example 23 was obtained with a method similar to that in Example 22, except for using 45 parts by mass of the nano silicon aggregated particles as a negative electrode active material, and 40 parts by mass of the natural graphite as a negative electrode active material.

<Evaluation of Si/C Complex of Example 22>

The following test was performed with respect to the Si/C complex of Example 22.

Figure 20:
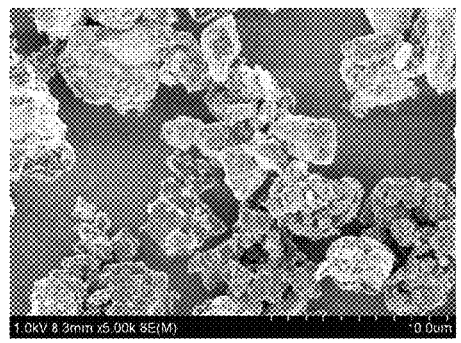
FIG. 20 is an SEM image of a Si/C complex of Example 22.
Figure 21:
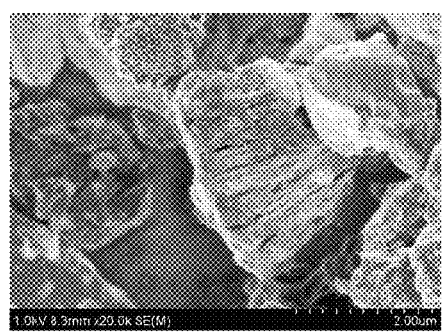
FIG. 21 is an SEM image of the Si/C complex of Example 22.
Figure 22:
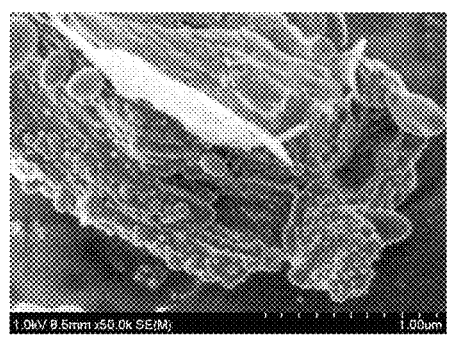
FIG. 22 is an SEM image of the Si/C complex of Example 22.

The Si/C complex of Example 22 was observed under a scanning electron microscope (SEM). The obtained SEM images are shown in FIGS. 20 to 22. The full length of the scale located at the bottom right of FIG. 20 represents 10 μm, the full length of the scale located at the bottom right of FIG. 21 represents 2 μm, and the full length of the scale located at the bottom right of FIG. 22 represents 1 μm. In FIGS. 20 to 22, particles resulting from nano silicon aggregated particles being coated with carbon were observed. In FIG. 21, a thin carbon coating formed on the plate-like silicon body was observed.

Composition analysis was performed on the Si/C complex of Example 22 by using a fluorescent light X-ray analyzer, oxygen/nitrogen analyzer EMGA (HORIBA, Ltd.), and carbon/sulfur analyzer EMIA (HORIBA, Ltd.). The results are shown in Table 5. The numerical values in Table 5 represent mass %.

TABLE 5

| O | C | Si | Ca | Fe | Al | Cl |
|---|---|---|---|---|---|---|
| 4.8 | 10.6 | 72.3 | 3.3 | 2.2 | 0.8 | 5.9 |

Fe and Al are impurities derived from the materials. O is thought to be derived from the materials, or derived from water rinsing or acetone rinsing. In the Si/C complex of Example 22, although Ca and Cl slightly remained, silicon existed as a main component, and carbon was confirmed to clearly exist.

With respect to the Si/C complex of Example 22, X-ray diffraction measurement was performed by using a powder X-ray diffractometer. An X-ray diffraction chart of the Si/C complex of Example 22 is shown in FIG. 23.

Figure 23:
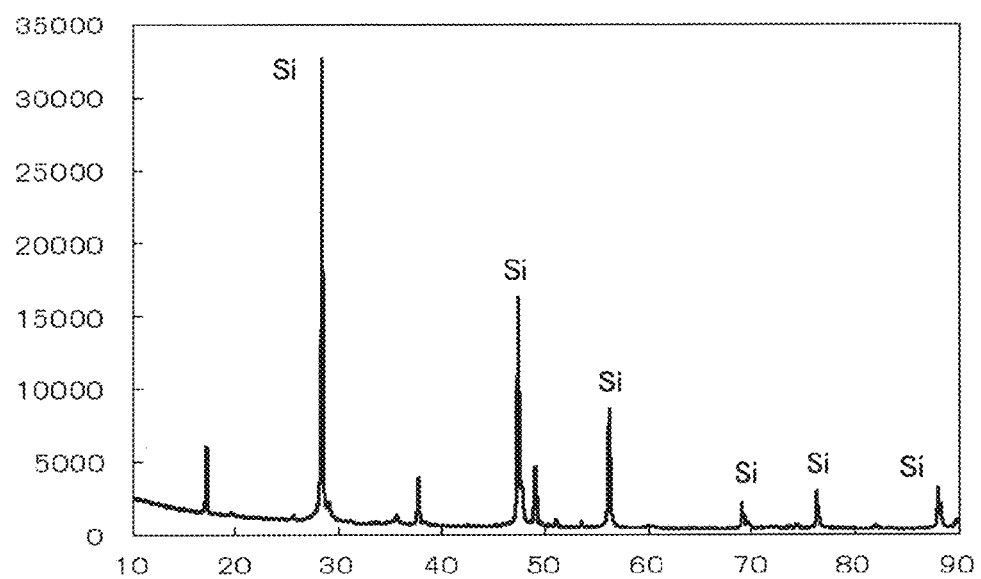
FIG. 23 is an X-ray diffraction chart of the Si/C complex of Example 22.

In the X-ray diffraction chart in FIG. 23, a peak representing silicon crystal was confirmed. In the X-ray diffraction chart in FIG. 23, the peaks indicated as "Si" are peaks derived from Si, and other peaks are peaks derived from α-$FeSi_2$ contained in the material for $CaSi_2$. Based on this result, $CaSi_2$ reacting and changing into silicon was confirmed.

Based on the results above, the production method (6) of the Si/C complex was confirmed to produce the Si/C complex containing silicon crystal from $CaSi_2$.

<Battery Characteristic Test>

Figure 24:
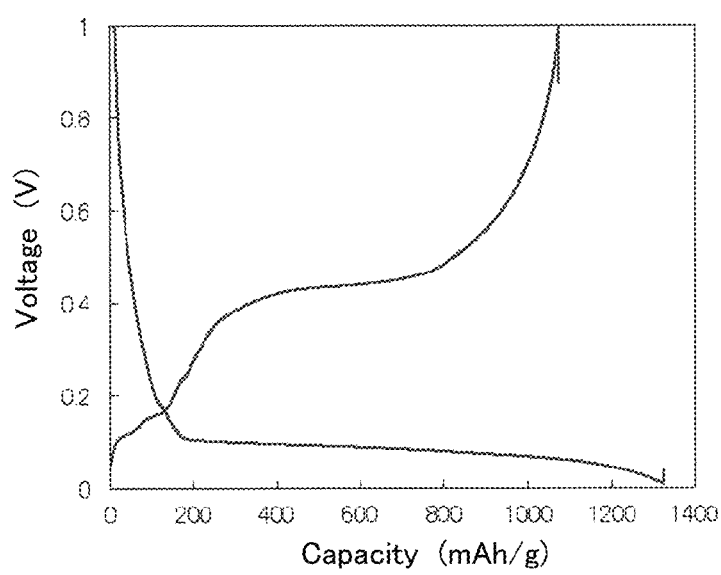
FIG. 24 shows initial charging/discharging curves of a lithium ion secondary battery of Example 22.

With respect to the lithium ion secondary batteries of Examples 22 and 23, discharging was performed at a temperature of 25° C. with a current of 0.2 mA until the voltage of the evaluation electrode with respect to the counter electrode reached 0.01 V, and then charging was performed at a temperature of 25° C. with a current of 0.2 mA until the voltage of the evaluation electrode with respect to the counter electrode reached 1 V. From here, (charge capacity/discharge capacity)×100 was calculated as initial efficiency (%). An IR drop of the lithium ion secondary battery of Example 22 measured 10 seconds after charging was 0.12V. The results of initial discharge capacity, initial charge capacity, and initial efficiency of each of the lithium ion secondary batteries are shown in Table 6, and initial charging/discharging curves of the lithium ion secondary battery of Example 22 are shown in FIG. 24.

Figure 25:
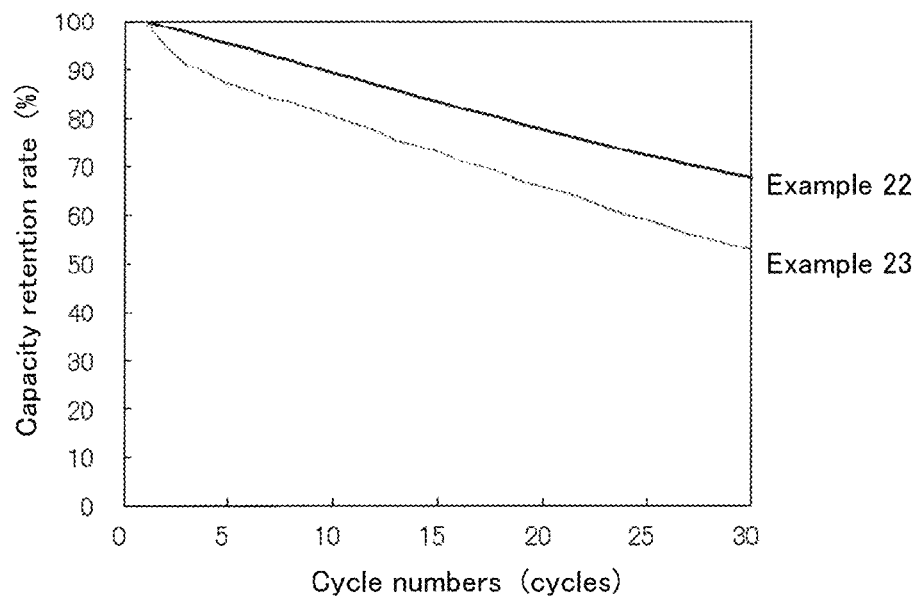
FIG. 25 is a graph of capacity retention rate with respect to cycles for a lithium ion secondary battery of Example 22 and a lithium ion secondary battery of Example 23.

Furthermore, by using each of the lithium ion secondary batteries, a cycle of: discharging at a temperature of 25° C. with a current of 0.2 mA until the voltage of the evaluation electrode with respect to the counter electrode reached 0.01 V; after 10 minutes, charging at a temperature of 25° C. with a current of 0.2 mA until the voltage of the evaluation electrode with respect to the counter electrode reached 1 V; and pausing for 10 minutes was repeated for 30 cycles. The value of 100×(charge capacity after respective cycles)/(charge capacity after 1 cycle) was calculated as a capacity retention rate. The results are shown in FIG. 25.

TABLE 6

| | Initial Discharge Capacity | Initial Charge Capacity | Initial Efficiency |
|---|---|---|---|
| Example 22 | 1324 mAh/g | 1075 mAh/g | 81.1% |
| Example 23 | 1529 mAh/g | 1255 mAh/g | 82.0% |

The lithium ion secondary battery of Example 22 showed an initial efficiency comparable to that of the lithium ion secondary battery of Example 23. The charging/discharging curves of the lithium ion secondary battery of Example 22 shown in FIG. 24 were comparable to the charging/discharging curves of a lithium ion secondary battery using silicon crystal as the negative electrode active material.

From FIG. 25, the lithium ion secondary battery of Example 22 is understood to have shown a capacity retention rate that is superior to that of the lithium ion secondary battery of Example 23. The production method (6) of the Si/C complex was confirmed to provide a preferable Si/C complex.

Example 24

A layered polysilane and nano silicon aggregated particles of Example 24 were produced as described in the following.

$CaSi_2$ was ground by using a ball mill. When the particle size distribution of the ground $CaSi_2$ was measured with a laser diffraction type particle-size-distribution measuring device, D50 was 20 μm.

A mixed powder was obtained by mixing, in an argon atmosphere and by using an agate mortar, 1 g of the ground $CaSi_2$ and 5 g of pyridine hydrochloride as the tertiary amine halide. The mixed powder was heated for 3 hours at 120° C. in an argon atmosphere to produce a layered polysilane.

The layered polysilane was mixed with ethanol to obtain a suspension. The suspension was filtered, and the obtained powder was further rinsed with ethanol. The rinsed powder was dried under reduced pressure to obtain a layered polysilane of Example 24.

The layered polysilane of Example 24 was kept under heat for 1 hour at 500° C. in an argon gas atmosphere in which the amount of $O_2$ was not more than 1 vol % to obtain nano silicon aggregated particles of Example 24.

Example 25

A layered polysilane and nano silicon aggregated particles of Example 25 were produced with a method similar to that in Example 24, except for setting the heating temperature for the mixed powder to 130° C.

A slurry was prepared by mixing 45 parts by mass of the nano silicon aggregated particles of Example 25 as a negative electrode active material, 40 parts by mass of a natural graphite as a negative electrode active material, 5 parts by mass of acetylene black as the conductive additive, 10 parts by mass of polyamide-imide as the binder, and N-methyl-2-pyrrolidone as the solvent. The slurry was applied, by using a doctor blade, on the surface of an electrolytic copper foil that functions as the current collector and has a thickness of approximately 20 μm, and then dried to form a negative electrode active material layer on the copper foil. Then, the current collector and the negative electrode active material layer were firmly adhered and joined by using a roll press machine. The obtained joined object was vacuum dried at 100° C. for 2 hours to form a negative electrode in which the thickness of the negative electrode active material layer was 20 μm.

A lithium ion secondary battery (half-cell) was produced by using, as the evaluation electrode, the negative electrode produced through the above described procedure. A metallic lithium foil (thickness: 500 μm) was used as the counter electrode.

The counter electrode and the evaluation electrode were respectively cut to have diameters of 13 mm and 11 mm, and a separator (glass filter manufactured by the Hoechst Celanese Corp., and "Celgard 2400" manufactured by Celgard LLC.) was interposed between the two electrodes to form an electrode assembly. The electrode assembly was housed in a battery case (member for CR2032 type coin batteries, manufactured by Hohsen Corp.). A nonaqueous electrolytic solution obtained by dissolving $LiPF_6$ at a concentration of 1 M in a mixed solvent in which ethylene carbonate and diethyl carbonate were mixed at 1:1 (volume ratio) was poured in the battery case, and then the battery case was sealed to obtain a lithium ion secondary battery of Example 25.

Example 26

A layered polysilane and nano silicon aggregated particles of Example 26 were produced with a method similar to that in Example 24, except for using pyridine hydrobromide as the tertiary amine halide. Furthermore, a lithium ion secondary battery of Example 26 was obtained with a method similar to that in Example 25, except for using the nano silicon aggregated particles of Example 26 as nano silicon aggregated particles.

Comparative Example 5

$CaSi_2$ was ground by using a ball mill. When the particle size distribution of the ground $CaSi_2$ was measured with a laser diffraction type particle-size-distribution measuring device, D50 was 20 μm.

In an argon atmosphere, 1 g of the ground $CaSi_2$ was added in 10 mL of hydrochloric acid at 5° C., and the mixture was stirred for 3 hours. The reaction liquid was filtered, and the obtained powder was rinsed with ethanol. The rinsed powder was dried under reduced pressure to obtain a layered polysilane of Comparative Example 5.

The layered polysilane of Comparative Example 5 was kept under heat for 1 hour at 500° C. in an argon gas atmosphere in which the amount of $O_2$ was not more than 1 vol % to obtain nano silicon aggregated particles of Comparative Example 5.

In the following, a lithium ion secondary battery of Comparative Example 5 was obtained with a method similar to that in Example 25, except for using the nano silicon aggregated particles of Comparative Example 5 as nano silicon aggregated particles.

<X-Ray Diffraction Measurement>

Figure 26:
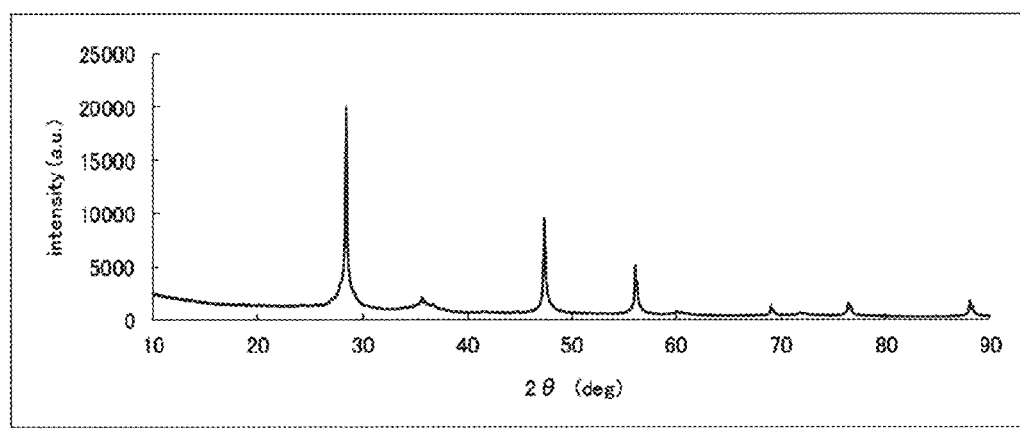
FIG. 26 is an X-ray diffraction chart of nano silicon aggregated particles of Example 25.
Figure 27:
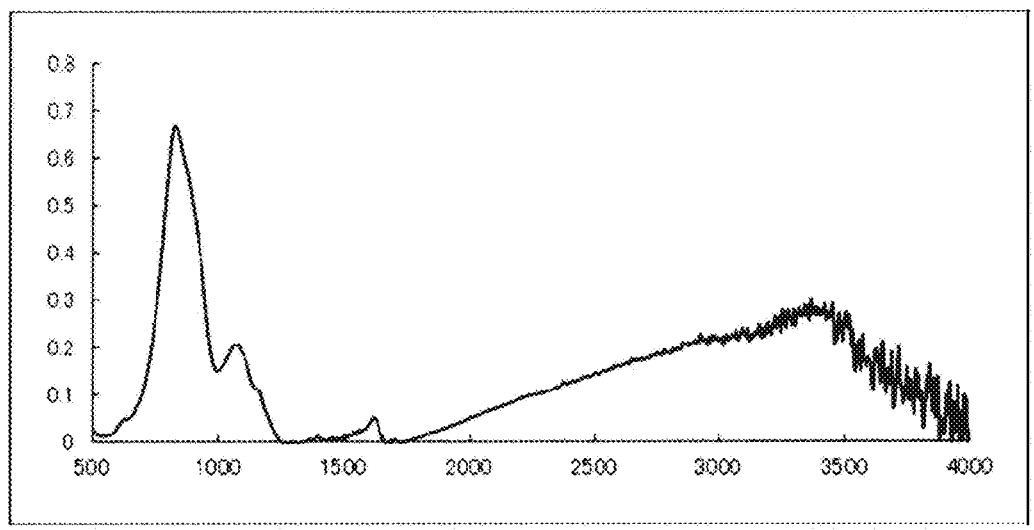
FIG. 27 is an infrared absorption spectrum of the nano silicon aggregated particles of Example 25, and, in the infrared absorption spectrum, the horizontal axis represents wave number ($cm^{-1}$) and the vertical axis represents intensity.

With respect to the nano silicon aggregated particles of Examples 24 to 26, X-ray diffraction measurement was performed by using a powder X-ray diffractometer. With respect to the nano silicon aggregated particles of Examples 25 and 26, infrared absorption spectrum measurement was performed by using an infrared spectrophotometer. An X-ray diffraction chart of the nano silicon aggregated particles of Example 25 is shown in FIG. 26. An infrared absorption spectrum of the nano silicon aggregated particles of Example 25 is shown in FIG. 27.

In the X-ray diffraction chart in FIG. 26, a peak representing silicon crystal was confirmed. The nano silicon aggregated particles of Example 25 was confirmed to contain silicon crystal. Peaks supporting the existence of silicon were also confirmed in the X-ray diffract ion charts of the nano silicon aggregated particles of Examples 24 and 26. Furthermore, a peak derived from Si—H bond was not observed around 2000 $cm^{-1}$ in the infrared absorption spectrum of FIG. 27. The same was true for the infrared absorption spectrum of the nano silicon aggregated particles of Example 26. Thus, with the present production method, desired nano silicon aggregated particles were confirmed to be obtained as a result of H detaching from the layered polysilane.

<Oxygen Amount Analysis>

Amount of oxygen (mass %) was measured using oxygen/nitrogen analyzer EMGA (HORIBA, Ltd.) in the layered polysilane and the nano silicon aggregated particles of Example 25, the layered polysilane and the nano silicon aggregated particles of Example 26, and the layered polysilane and the nano silicon aggregated particles of Comparative Example 5. The results are shown in Table 7.

TABLE 7

|  | Layered Polysilane | Nano Silicon Aggregated Particles |
| --- | --- | --- |
| Example 25 | 6.7 mass % | 7.3 mass % |
| Example 26 | 5.3 mass % | 7.5 mass % |
| Comparative Example 5 | 14.8 mass % | 15.2 mass % |

Based on the results in Table 7, the layered polysilanes and the nano silicon aggregated particles obtained from the present production method were confirmed to have less amount of oxygen than the layered polysilane and the nano silicon aggregated particles obtain from a conventional production method.

<Battery Characteristic Test>

With respect to the lithium ion secondary batteries of Examples 25 and 26 and the lithium ion secondary battery of Comparative Example 5, discharging was performed at a current value of 0.2 mA until the voltage with respect to lithium reached 0.01 V, and then charging to 1.0 V was performed at a current value of 0.2 mA. From here, the discharge capacity and the charge capacity were measured to calculate an initial efficiency. The initial efficiency was calculated as (charge capacity/discharge capacity)×100. The results are shown in Table 8.

TABLE 8

| | Discharge Capacity (mAh/g) | Charge Capacity (mAh/g) | Initial Efficiency |
|---|---|---|---|
| Example 25 | 1662 | 1321 | 79.5% |
| Example 26 | 1537 | 1218 | 79.2% |
| Comparative Example 5 | 1702 | 1278 | 75.1% |

The lithium ion secondary batteries of Examples 25 and 26 were superior in initial efficiency than the lithium ion secondary battery of Comparative Example 5. As described above, the amount of oxygen in the nano silicon aggregated particles of Examples 25 and 26 was smaller than the amount of oxygen in the nano silicon aggregated particles of the Comparative Example 5. The oxygen contained in the negative electrode active material is estimated to irreversibly bind to lithium. Thus, the results in Table 8 are considered to be reflecting a decrease in the amount of lithium irreversible supplemented to the negative electrode active material in the lithium ion secondary battery of Example 25.

Example 27

A mixed solution of 7 mL of an HF aqueous solution having a concentration of 46 mass % and 56 mL of an HCl aqueous solution having a concentration of 36 mass % was set to a temperature of 0° C. in an ice bath. Then, 3.3 g of $CaSi_2$ was added to the mixed solution in an argon gas current and the mixed solution was stirred. After completion of foaming from the reaction liquid was confirmed, the reaction liquid was warmed to room temperature, further stirred for 2 hours at room temperature, had 20 mL of distilled water added thereto, and further stirred for 10 minutes. At this moment, suspension of a yellow powder was observed.

The obtained reaction liquid was filtered, and the residue was rinsed with 10 mL of distilled water, rinsed with 10 mL of ethanol, and then vacuum dried to obtain 2.5 g of a layered polysilane.

Then, 1 g of the layered polysilane was weighed out, and was kept under heat for 1 hour at 500° C. in an argon gas atmosphere in which the amount of $O_2$ was not more than 1 vol % to obtain nano silicon aggregated particles.

The above described nano silicon aggregated particles were ground by using a jet mill NJ-30 (Aishin Nano Technologies Co., Ltd.) to obtain ground nano silicon aggregated particles of Example 27. The grinding condition was as described below.
 Grind nozzle pressure: 1.3 MPa
 Grinding pressure: 2.0 MPa
 Input rate: 3 g/min.

The ground nano silicon aggregated particles of Example 27 were placed in a rotary kiln type reactor, and thermal CVD was conducted thereon under a flow of a propane-argon mixed gas (propane 20%, argon 80%) with a condition of 880° C. and a retention time of 60 minutes. The furnace core tube of the reactor was arranged horizontally and the rotational speed was set to 1 rpm. A baffle plate was arranged on the inner circumference wall of the furnace core tube, and was configured such that a content deposited on the baffle plate falls off the baffle plate from a predetermined height associated with rotation, and the content was stirred because of the configuration. After 60 minutes had elapsed, the reactor was cooled to 25° C. under a flow of argon to obtain a Si/C complex of Example 27.

A lithium ion secondary battery of Example 27 was produced with a method similar to that in Example 9, except for using the Si/C complex of Example 27.

Example 28

Ground nano silicon aggregated particles and a lithium ion secondary battery of Example 28 were produced with a method similar to that in Example 27, except for setting the grinding condition with the jet mill as described in the following.
 Grind nozzle pressure: 0.4 MPa
 Grinding pressure: 1.3 MPa
 Input rate: 2 g/min.

Example 29

A lithium ion secondary battery of Example 29 was produced with a method similar to that in Example 27, except for not grinding the nano silicon aggregated particles by using a jet mill.

Example 30

A lithium ion secondary battery of Example 30 was produced with a method similar to that in Example 27, except for obtaining a Si/C complex of Example 30 by, after conducting the thermal CVD, stirring the content in the rotary kiln type reactor in an argon atmosphere at a rate of 1 rpm for 24 hours.

Example 31

A ground Si/C complex and a lithium ion secondary battery of Example 31 were produced with a method similar to that in Example 28, except for not grinding the nano silicon aggregated particles with the jet mill but grinding the Si/C complex by using the jet mill.

<Particle Size Distribution Measurement>

Particle size distribution was measured using a laser diffraction type particle-size-distribution measuring device in the ground nano silicon aggregated particles of Examples 27 and 28, the nano silicon aggregated particles of Example 29, the Si/C complex of Example 30, and the ground Si/C complex of Example 31. The results are shown in Table 9.

TABLE 9

| | D10 (μm) | D50 (μm) | D90 (μm) |
|---|---|---|---|
| Example 27 | 0.383 | 1.062 | 2.494 |
| Example 28 | 3.34 | 5.99 | 11.44 |
| Example 29 | 7.708 | 20.22 | 46.43 |
| Example 30 | 0.187 | 1.776 | 12.61 |
| Example 31 | 3.792 | 6.229 | 10.49 |

<Battery Characteristic Test>

With respect to the lithium ion secondary batteries of Examples 27 to 31, discharging was performed at a current value of 0.2 mA until the voltage with respect to lithium reached 0.01 V, and then charging to 1.0 V was performed at a current value of 0.2 mA. From here, the discharge capacity and the charge capacity were measured to calculate an initial efficiency. The initial efficiency was calculated as (charge capacity/discharge capacity)×100.

Furthermore, by using each of the lithium ion secondary batteries, a cycle of: discharging at a temperature of 25° C. with a current of 0.2 mA until the voltage of the evaluation electrode with respect to the counter electrode reached 0.01 V; after 10 minutes, charging at a temperature of 25° C. with a current of 0.2 mA until the voltage of the evaluation electrode with respect to the counter electrode reached 1 V; and pausing for 10 minutes was repeated for 30 cycles. The value of 100×(charge capacity after respective cycles)/(charge capacity after 1 cycle) was calculated as a capacity retention rate.

The results from above are shown in Table 10.

TABLE 10

|  | Charge Capacity (mAh/g) | Initial Efficiency (%) | Capacity Retention Rate (%) |
| --- | --- | --- | --- |
| Example 27 | 1141 | 70.4 | 96 |
| Example 28 | 1135 | 74.1 | 92 |
| Example 29 | 1120 | 72.2 | 79 |
| Example 30 | 1043 | 68.2 | 85 |
| Example 31 | 1095 | 69.1 | 70 |

Based on the results in Table 10, the lithium ion secondary battery, including the Si/C complex obtained by using the ground nano silicon aggregated particles having a small particle size and a narrow particle size distribution, was shown to have an excellent capacity retention rate. The lower capacity retention rate of the lithium ion secondary battery of Example 31 when compared to the capacity retention rates of other secondary batteries is estimated to be caused as a result of silicon being exposed on the Si/C complex of Example 31 since grinding with the jet mill was performed thereon after being coated with carbon.

Example 32

A mixed solution of 7 mL of an HF aqueous solution having a concentration of 46 mass % and 56 mL of an HCl aqueous solution having a concentration of 36 mass % was set to a temperature of 0° C. in an ice bath. Then, 3.3 g of $CaSi_2$ was added to the mixed solution in an argon gas current and the mixed solution was stirred. After completion of foaming from the reaction liquid was confirmed, the reaction liquid was warmed to room temperature, further stirred for 2 hours at room temperature, had 20 mL of distilled water added thereto, and further stirred for 10 minutes. At this moment, suspension of a yellow powder was observed.

The obtained reaction liquid was filtered, and the residue was rinsed with 10 mL of distilled water, rinsed with 10 mL of ethanol, and then vacuum dried to obtain 2.5 g of a layered polysilane.

Then, 1 g of the layered polysilane was weighed out, and was kept under heat for 1 hour at 500° C. in an argon gas atmosphere in which the amount of $O_2$ was not more than 1 vol % to obtain nano silicon aggregated particles.

The nano silicon aggregated particles were placed in a rotary kiln type reactor, and thermal CVD was conducted thereon under a flow of a propane-argon mixed gas (propane 20%, argon 80%) with a condition of 880° C. and a retention time of 60 minutes. The furnace core tube of the reactor was arranged horizontally and the rotational speed was set to 1 rpm. A baffle plate was arranged on the inner circumference wall of the furnace core tube, and was configured such that a content deposited on the baffle plate falls off the baffle plate from a predetermined height associated with rotation, and the content was stirred because of the configuration. After 60 minutes had elapsed, the reactor was cooled to 25° C. under a flow of argon to obtain a Si/C complex of Example 32.

A 1-mass % SBR aqueous dispersion was prepared. As the SBR, TRD1002 available from JRS Corp., was used. When the Si/C complex of Example 32 was added to the 1-mass % SBR aqueous dispersion, the dispersed SBR particles were adsorbed in the Si/C complex and the aqueous dispersion became clear. The surface of the Si/C complex was considered to be coated with the SBR. The Si/C complex coated with the SBR was isolated through filtration, and dried under a reduced pressure condition at 120° C. for 8 hours to obtain a SBR-coated Si/C complex of Example 32. In the SBR-coated Si/C complex of Example 32, the mass ratio between the Si/C complex and the SBR was 99.9:0.1.

A slurry was prepared by mixing 85 parts by mass of the SBR-coated Si/C complex of Example 32 as the negative electrode active material, 5 parts by mass of acetylene black, 10 parts by mass of polyamide-imide, and NMP. The slurry was applied, by using a doctor blade, on the surface of an electrolytic copper foil that functions as the current collector and has a thickness of 20 μm, and then dried to form a negative electrode active material layer on the copper foil. Then, the current collector and the negative electrode active material layer were firmly adhered and joined by using a roll press machine such that the thickness of the negative electrode active material layer became 20 μm. This was used as the electrode of Example 32.

A lithium ion secondary battery (half-cell) was produced by using, as the evaluation electrode, the electrode of Example 32. A metallic lithium foil having a thickness of 500 μm was used as the counter electrode. The counter electrode and the evaluation electrode were respectively cut to have diameters of 13 mm and 11 mm, and a separator (glass filter manufactured by the Hoechst Celanese Corp., and Celgard 2400) was interposed between the two electrodes to form an electrode assembly battery. The electrode assembly battery was housed in a battery case (CR2032 coin cell manufactured by Hohsen Corp.). A nonaqueous electrolyte obtained by dissolving $LiPF_6$ at a concentration of 1 M in a mixed solvent in which ethylene carbonate and diethyl carbonate were mixed at 1:1 (volume ratio) was poured in the battery case. Then, the battery case was sealed to obtain a lithium ion secondary battery of Example 32.

Example 33

A SBR-coated Si/C complex and a lithium ion secondary battery of Example 33 were obtained with a method similar to that in Example 32, except for changing the proportion between the 1-mass % SBR aqueous dispersion and the Si/C complex. In the SBR-coated Si/C complex of Example 33, the mass ratio between the Si/C complex and the SBR was 99.7:0.3.

Example 34

A lithium ion secondary battery of Example 34 was obtained with a method similar to that in Example 32, except for not forming the SBR coat.

Example 35

A SBR-coated Si/C complex and a lithium ion secondary battery of Example 35 were obtained with a method similar to that in Example 32, except for changing the proportion between the 1-mass % SBR aqueous dispersion and the Si/C complex. In the SBR-coated Si/C complex of Example 35, the mass ratio between the Si/C complex and the SBR was 99:1.

<Battery Characteristic Test>

With respect to the lithium ion secondary batteries of Examples 32 to 35, discharging was performed at a current value of 0.2 mA until the voltage with respect to lithium reached 0.01 V, and then charging to 1.0 V was performed at a current value of 0.2 mA. From here, the discharge capacity and the charge capacity were measured to calculate an initial efficiency. The initial efficiency was calculated as (charge capacity/discharge capacity)×100.

Furthermore, by using each of the lithium ion secondary batteries, a cycle of: discharging at a temperature of 25° C. with a current of 0.2 mA until the voltage of the evaluation electrode with respect to the counter electrode reached 0.01 V; after 10 minutes, charging at a temperature of 25° C. with a current of 0.2 mA until the voltage of the evaluation electrode with respect to the counter electrode reached 1 V; and pausing for 10 minutes was repeated for 30 cycles. The value of 100×(charge capacity after respective cycles)/(charge capacity after 1 cycle) was calculated as a capacity retention rate.

The results from above are shown in Table 11.

TABLE 11

|  | Charge Capacity (mAh/g) | Initial Efficiency (%) | Capacity Retention Rate (%) |
|---|---|---|---|
| Example 32 | 1247 | 73.1 | 82 |
| Example 33 | 1240 | 70.6 | 72 |
| Example 34 | 1244 | 69.9 | 65 |
| Example 35 | 1055 | 56.2 | 15 |

Based on the results in Table 11, the lithium ion secondary battery, including the Si/C complex coated with a certain amount of SBR, was shown to have a preferable capacity retention rate. The small capacity retention rate of the lithium ion secondary battery of Example 35 is thought to be caused by having a high resistance as a result of presence of excessive SBR, and the negative electrode active material not being able to sufficiently contribute in the charging and discharging.

Example 36

A Si/C complex of Example 36 was obtained by heating a SBR-coated Si/C complex produced with a method similar to that in Example 35 in an argon gas atmosphere at 400° C. for 3 hours.

A lithium ion secondary battery of Example 36 was obtained with a method similar to that in Example 32, except for using the Si/C complex of Example 36 as the negative electrode active material.

Example 37

A Si/C complex and a lithium ion secondary battery of Example 37 were obtained with a method similar to that in Example 36, except for setting the heating temperature to 500° C.

<Battery Characteristic Test>

With respect to the lithium ion secondary batteries of Examples 36 and 37 and the lithium ion secondary batteries of Examples 34 and 35, discharging was performed at a current value of 0.2 mA until the voltage with respect to lithium reached 0.01 V, and then charging to 1.0 V was performed at a current value of 0.2 mA. From here, the discharge capacity and the charge capacity were measured to calculate an initial efficiency. The initial efficiency was calculated as (charge capacity/discharge capacity)×100.

Furthermore, by using each of the lithium ion secondary batteries, a cycle of: discharging at a temperature of 25° C. with a current of 0.2 mA until the voltage of the evaluation electrode with respect to the counter electrode reached 0.01 V; after 10 minutes, charging at a temperature of 25° C. with a current of 0.2 mA until the voltage of the evaluation electrode with respect to the counter electrode reached 1 V; and pausing for 10 minutes was repeated for 30 cycles. The value of 100×(charge capacity after respective cycles)/(charge capacity after 1 cycle) was calculated as a capacity retention rate.

The results from above are shown in Table 12.

TABLE 12

|  | Charge Capacity (mAh/g) | Initial Efficiency (%) | Capacity Retention Rate (%) |
|---|---|---|---|
| Example 36 | 1247 | 71.2 | 78 |
| Example 37 | 1241 | 70.1 | 67 |
| Example 34 | 1244 | 69.9 | 65 |
| Example 35 | 1055 | 56.2 | 15 |

Based on the results in Table 12, a lithium ion secondary battery, including a Si/C complex obtained by heating a SBR-coated Si/C complex, was shown to have a preferable capacity retention rate. Based on the results from Examples 36 and 37, setting the heating temperature of the SBR-coated Si/C complex too high is suggested to increase crystallinity of the carbon layer and suppress improvement of the performance of the secondary battery. Heating the SBR-coated Si/C complex with a proper temperature has provided the carbon layer with a preferable flexibility, and, as a result, the flexible carbon layer is estimated to have mitigated the expansion and contraction of the negative electrode active material.

Example 38

A mixed solution of 7 mL of an HF aqueous solution having a concentration of 46 mass % and 56 mL of an HCl aqueous solution having a concentration of 36 mass % was set to a temperature of 0° C. in an ice bath. Then, 3.3 g of $CaSi_2$ was added to the mixed solution in an argon gas current and the mixed solution was stirred. After completion of foaming from the reaction liquid was confirmed, the reaction liquid was warmed to room temperature, further stirred for 2 hours at room temperature, had 20 mL of distilled water added thereto, and further stirred for 10 minutes. At this moment, suspension of a yellow powder was observed.

The obtained reaction liquid was filtered, and the residue was rinsed with 10 mL of distilled water, rinsed with 10 mL of ethanol, and then vacuum dried to obtain 2.5 g of a layered polysilane.

Then, 1 g of the layered polysilane was weighed out, and was kept under heat for 1 hour at 500° C. in an argon gas atmosphere in which the amount of $O_2$ was not more than 1 vol % to obtain nano silicon aggregated particles.

The nano silicon aggregated particles were placed in a rotary kiln type reactor, and thermal CVD was conducted thereon under a flow of a propane-argon mixed gas (propane 20%, argon 80%) with a condition of 880° C. and a retention time of 60 minutes. The furnace core tube of the reactor was arranged horizontally and the rotational speed was set to 1 rpm. A baffle plate was arranged on the inner circumference wall of the furnace core tube, and was configured such that a content deposited on the baffle plate falls off the baffle plate from a predetermined height associated with rotation, and the content was stirred because of the configuration. After 60 minutes had elapsed, the reactor was cooled to 25° C. under a flow of argon to obtain a Si/C complex of Example 38.

A slurry was prepared by mixing 85 parts by mass of the Si/C complex of Example 38 as the negative electrode active material, 4 parts by mass of acetylene black as the conductive additive, 1 part by mass of a carbon nanotube as the conductive additive, 10 parts by mass of polyamide-imide, and NMP. The slurry was applied, by using a doctor blade, on the surface of an electrolytic copper foil that functions as the current collector and has a thickness of 20 μm, and then dried to form a negative electrode active material layer on the copper foil. Then, the current collector and the negative electrode active material layer were firmly adhered and joined by using a roll press machine such that the thickness of the negative electrode active material layer became 20 μm. This was used as the electrode of Example 38. As the carbon nanotube, a product available from Meijo Nano Carbon Co., Ltd., was used.

A lithium ion secondary battery (half-cell) was produced by using, as the evaluation electrode, the electrode of Example 38. A metallic lithium foil having a thickness of 500 μm was used as the counter electrode. The counter electrode and the evaluation electrode were respectively cut to have diameters of 13 mm and 11 mm, and a separator (glass filter manufactured by the Hoechst Celanese Corp., and Celgard 2400) was interposed between the two electrodes to form an electrode assembly battery. The electrode assembly battery was housed in a battery case (CR2032 coin cell manufactured by Hohsen Corp.). A nonaqueous electrolyte obtained by dissolving $LiPF_6$ at a concentration of 1 M in a mixed solvent in which ethylene carbonate and diethyl carbonate were mixed at 1:1 (volume ratio) was poured in the battery case, and then the battery case was sealed to obtain a lithium ion secondary battery of Example 38.

Example 39

A lithium ion secondary battery of Example 39 was obtained with a method similar to that in Example 38, except for using 3 parts by mass of acetylene black as a conductive additive, and 2 parts by mass of the carbon nanotube as a conductive additive.

Example 40

A lithium ion secondary battery of Example 40 was obtained with a method similar to that in Example 38, except for using 5 parts by mass of acetylene black as a conductive additive but not using the carbon nanotube as a conductive additive.

Example 41

A lithium ion secondary battery of Example 41 was obtained with a method similar to that in Example 38, except for using 1 part by mass of acetylene black as a conductive additive, and 4 parts by mass of the carbon nanotube as a conductive additive.

Example 42

A lithium ion secondary battery of Example 42 was obtained with a method similar to that in Example 38, except for not using acetylene black as a conductive additive but using 5 parts by mass of the carbon nanotube as a conductive additive.

<Battery Characteristic Test>

By using each of the lithium ion secondary batteries of Examples 38 to 42, a cycle of: discharging at a temperature of 25° C. with a current of 0.2 mA until the voltage of the evaluation electrode with respect to the counter electrode reached 0.01 V; after 10 minutes, charging at a temperature of 25° C. with a current of 0.2 mA until the voltage of the evaluation electrode with respect to the counter electrode reached 1 V; and pausing for 10 minutes was repeated for 30 cycles. The value of 100×(charge capacity after respective cycles)/(charge capacity after 1 cycle) was calculated as a capacity retention rate.

The results from above are shown in Table 13. In Table 13, AB represents acetylene black, and CNT represents carbon nanotube.

TABLE 13

| | AB/CNT | Capacity Retention Rate (%) |
|---|---|---|
| Example 38 | 4/1 | 89 |
| Example 39 | 3/2 | 88 |
| Example 40 | 5/0 | 83 |
| Example 41 | 1/4 | 81 |
| Example 42 | 0/5 | 77 |

Based on the results in Table 13, the lithium ion secondary batteries of Examples 38 and 39 were shown to be particularly superior in capacity retention rate.

Example 43

A mixed solution of 7 mL of an HF aqueous solution having a concentration of 46 mass % and 56 mL of an HCl aqueous solution having a concentration of 36 mass % was set to a temperature of 0° C. in an ice bath. Then, 3.3 g of $CaSi_2$ was added to the mixed solution in an argon gas current and the mixed solution was stirred. After completion of foaming from the reaction liquid was confirmed, the reaction liquid was warmed to room temperature, further stirred for 2 hours at room temperature, had 20 mL of distilled water added thereto, and further stirred for 10 minutes. At this moment, suspension of a yellow powder was observed.

The obtained reaction liquid was filtered, and the residue was rinsed with 10 mL of distilled water, rinsed with 10 mL of ethanol, and then vacuum dried to obtain 2.5 g of a layered polysilane.

Then, 1 g of the layered polysilane was weighed out, and was kept under heat for 2 hours at 900° C. in an argon gas atmosphere in which the amount of $O_2$ was not more than 1 vol % to obtain nano silicon aggregated particles of Example 43.

A slurry was prepared by mixing 45 parts by mass of the nano silicon aggregated particles of Example 43, 40 parts by mass of a natural graphite, 5 parts by mass of acetylene black, 10 parts by mass of polyamide-imide, and NMP. The slurry was applied, by using a doctor blade, on the surface of an electrolytic copper foil that functions as the current collector and has a thickness of 20 μm, and then dried to form a negative electrode active material layer on the copper foil. Then, the current collector and the negative electrode active material layer were firmly adhered and joined by using a roll press machine such that the thickness of the negative electrode active material layer became 20 μm. This was used as the electrode of Example 43. As the carbon nanotube, a product available from Meijo Nano Carbon Co., Ltd., was used.

A lithium ion secondary battery (half-cell) was produced by using, as the evaluation electrode, the electrode of Example 43. A metallic lithium foil having a thickness of 500 μm was used as the counter electrode. The counter electrode and the evaluation electrode were respectively cut to have diameters of 13 mm and 11 mm, and a separator (glass filter manufactured by the Hoechst Celanese Corp., and Celgard 2400) was interposed between the two electrodes to form an electrode assembly battery. The electrode assembly battery was housed in a battery case (CR2032 coin cell manufactured by Hohsen Corp.). A nonaqueous electrolyte obtained by dissolving $LiPF_6$ at a concentration of 1 M in a mixed solvent in which ethylene carbonate and diethyl carbonate were mixed at 1:1 (volume ratio) was poured in the battery case. Then, the battery case was sealed to obtain a lithium ion secondary battery of Example 43.

Example 44

Nano silicon aggregated particles and a lithium ion secondary battery of Example 44 were obtained with a method similar to that in Example 43, except for setting the heating temperature of the layered polysilane to 1000° C.

Example 45

Nano silicon aggregated particles and a lithium ion secondary battery of Example 45 were obtained with a method similar to that in Example 43, except for setting the heating temperature of the layered polysilane to 1100° C.

<Evaluation of Nano Silicon Aggregated Particles>

With respect to the nano silicon aggregated particles of Examples 43 to 45, X-ray diffraction measurement was performed by using a powder X-ray diffractometer. The half widths of peaks in the obtained X-ray diffraction charts revealed that Si crystal is contained in a larger amount for nano silicon aggregated particles obtained from a layered polysilane heated with a higher temperature.

Composition analysis was performed on the nano silicon aggregated particles of Examples 44 and 45 by using a fluorescent light X-ray analyzer and oxygen/nitrogen analyzer EMGA (HORIBA, Ltd.). The results are shown in Table 14. The numerical values in Table 14 represent mass %.

TABLE 14

|  | Si | Cl | Ca | Fe | O |
| --- | --- | --- | --- | --- | --- |
| Example 44 | 75.6 | 4.2 | 0.8 | 6.2 | 12.8 |
| Example 45 | 76.5 | 1.7 | 1.0 | 7.1 | 13.6 |

<Battery Characteristic Test>

With respect to the lithium ion secondary batteries of Examples 43 to 45, discharging was performed at a current value of 0.2 mA until the voltage with respect to lithium reached 0.01 V, and then charging to 1.0 V was performed at a current value of 0.2 mA. From here, the discharge capacity and the charge capacity were measured to calculate an initial efficiency. The initial efficiency was calculated as (charge capacity/discharge capacity)×100. The results are shown in Table 15.

TABLE 15

|  | Initial Efficiency |
| --- | --- |
| Example 43 | 70.5% |
| Example 44 | 71.3% |
| Example 45 | 73.9% |

Based on Table 15, a lithium ion secondary battery using nano silicon aggregated particles obtained from a layered polysilane heated with a high temperature was revealed to be superior in initial efficiency.

Example 46

A lithium ion secondary battery (half-cell) of Example 46 was produced similarly to that of Example 6, except for using, as the negative electrode active material, 70 parts by mass of the Si/C complex II powder of Example 6 and 15 parts by mass of a hard carbon powder. As the hard carbon powder, CARBOTRON P available from Kureha Battery Materials Japan Co., Ltd., was used.

Example 47

A lithium ion secondary battery (half-cell) of Example 47 was produced similarly to that of Example 46, except for using, as the negative electrode active material, 45 parts by mass of the Si/C complex II powder of Example 6 and 40 parts by mass of the hard carbon powder.

<Battery Characteristic Test>

With respect to the lithium ion secondary batteries of Examples 46 and 47, discharging was performed at a temperature of 25° C. with a current of 0.2 mA until the voltage of the evaluation electrode with respect to the counter electrode reached 0.01 V, and then charging was performed at a temperature of 25° C. with a current of 0.2 mA until the voltage of the evaluation electrode with respect to the counter electrode reached 1 V. From here, (charge capacity/discharge capacity)×100 was calculated as initial efficiency (%).

Furthermore, by using each of the lithium ion secondary batteries, a cycle test of repeating a cycle of: discharging at a temperature of 25° C. with a current of 0.2 mA until the voltage of the evaluation electrode with respect to the counter electrode reached 0.01 V; after 10 minutes, charging at a temperature of 25° C. with a current of 0.2 mA until the voltage of the evaluation electrode with respect to the counter electrode reached 1 V; and pausing for 10 minutes was performed. After 30 cycles and 50 cycles, the values of 100×(charge capacity after respective cycles)/(charge capacity after 1 cycle) were calculated as capacity retention rates.

The results from above are shown in Table 16.

TABLE 16

|  | Initial Charge Capacity (mAh/g) | Initial Efficiency (%) | Capacity Retention Rate (%) after 30 cycles | Capacity Retention Rate (%) after 50 cycles |
| --- | --- | --- | --- | --- |
| Example 46 | 1045 | 75 | 94 | 75 |
| Example 47 | 695 | 77 | 98 | 79 |

When the results in Tables 2 and 16 are combined, the negative electrode for nonaqueous secondary batteries and the nonaqueous secondary battery of the present invention are considered to show preferable battery characteristics regardless of the type of the graphite in the second active material.

Example 48

A mixed solution of 7 mL of an HF aqueous solution having a concentration of 46 mass % and 56 mL of an HCl aqueous solution having a concentration of 36 mass % was set to a temperature of 0° C. in an ice bath. Then, 3.3 g of $CaSi_2$ was added to the mixed solution in an argon gas current and the mixed solution was stirred. After completion of foaming from the reaction liquid was confirmed, the reaction liquid was warmed to room temperature, further stirred for 2 hours at room temperature, had 20 mL of distilled water added thereto, and further stirred for 10 minutes. At this moment, suspension of a yellow powder was observed.

The obtained reaction liquid was filtered, and the residue was rinsed with 10 mL of distilled water, rinsed with 10 mL of ethanol, and then vacuum dried to obtain 2.5 g of a layered polysilane.

Then, 1 g of the layered polysilane was weighed out, and was kept under heat for 1 hour at 500° C. in an argon gas atmosphere in which the amount of $O_2$ was not more than 1 vol % to obtain nano silicon aggregated particles.

The nano silicon aggregated particles were ground by using a mortar, and were passed through a sieve having an opening of 20 μm. A mixture was obtained by mixing 50 parts by mass of the nano silicon aggregated particles that have passed through the sieve, 38.7 parts by mass of a resol-type phenolic resin (solid content: 58 mass %), 6.4 parts by mass of acetylene black, 15 parts by mass of isopropyl alcohol, and 30 parts by mass of NMP. The mixture was used as a spray liquid.

The spray liquid was placed in a spray dryer MDL-015MGC (Fujisaki Electric Corp.) having a four-stream nozzle, and the spray liquid was spray-dried in a nitrogen atmosphere to obtain a dry powder of Example 48.

The dry powder of Example 48 was carbonized through heating for 2 hours at 900° C. in an argon atmosphere to obtained a Si/C complex of Example 48.

A lithium ion secondary battery (half-cell) of Example 48 was produced similarly to that of Example 9, except for using the Si/C complex powder of Example 48 as the negative electrode active material.

<Evaluation of Si/C Complex of Example 48>

The following test was performed with respect to the Si/C complex of Example 48.

Figure 28:
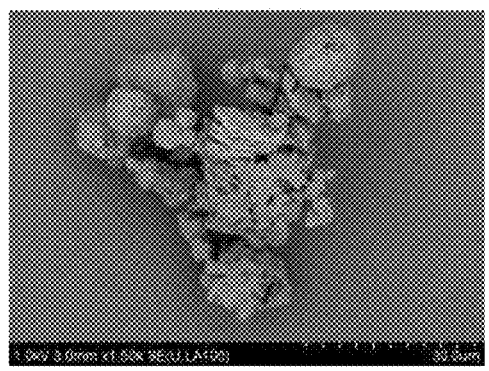
FIG. 28 is an SEM image of a Si/C complex of Example 48.
Figure 29:
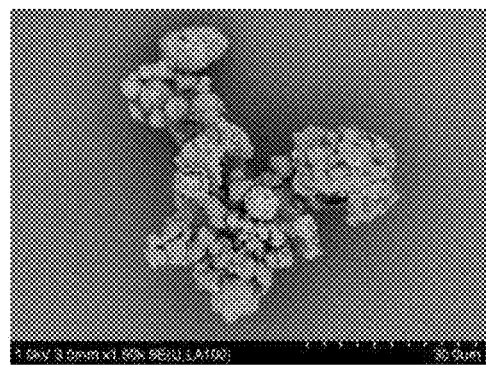
FIG. 29 is an SEM image of the Si/C complex of Example 48.
Figure 30:
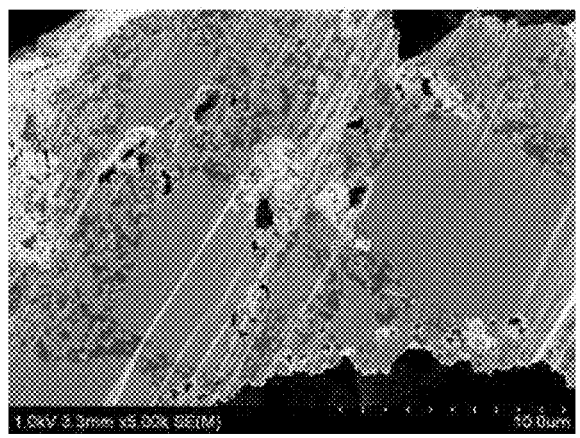
FIG. 30 is an SEM image of a cross section of the Si/C complex of Example 48.
Figure 31:
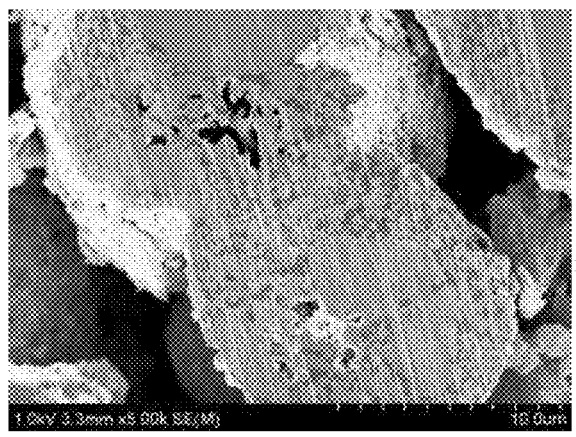
FIG. 31 is an SEM image of a cross section of the Si/C complex of Example 48.

The Si/C complex of Example 48 was observed under a scanning electron microscope (SEM). The obtained SEM images are shown in FIGS. 28 and 29. The full length of the scale located at the bottom right of FIGS. 28 and 29 represents 30 μm. Furthermore, cross sections of the Si/C complex of Example 48 were observed by using the SEM. The obtained SEM images are shown in FIGS. 30 and 31. The full length of the scale located at the bottom right of FIGS. 30 and 31 represents 10 μm. In FIGS. 28 to 31, exposure of silicon was not observed, and the state in which the nano silicon aggregated particles were coated with carbon was observed.

An analysis of carbon content was performed on the Si/C complex of Example 48 by using carbon/sulfur analyzer EMIA (HORIBA, Ltd.). The carbon content of the Si/C complex of Example 48 was 20 mass %.

Particle size distribution was measured in the Si/C complex of Example 48 by using a laser diffraction type particle-size-distribution measuring device. D50 of the Si/C complex of Example 48 was 40 μm.

The Si/C complex powder of Example 48 was molded into a circular-column shaped compact in which the diameter of the bottom surface thereof was 10 mm, and a resistance value in the height direction thereof and the height of the circular-column shaped compact were measured. A resistibility, which is a reciprocal of electric conductivity, was calculated by multiplying the measured resistance value by an area of the circular base having a diameter of 10 mm, and dividing that with the height of the compact. The resistibility of the Si/C complex powder of Example 48 was 0.43 Ω·cm, which is a significantly low value.

<Battery Characteristic Test>

With respect to the lithium ion secondary battery of Example 48, discharging was performed at a temperature of 25° C. with a current of 0.2 mA until the voltage of the evaluation electrode with respect to the counter electrode reached 0.01 V, and then charging was performed at a temperature of 25° C. with a current of 0.2 mA until the voltage of the evaluation electrode with respect to the counter electrode reached 1 V. From here, (charge capacity/discharge capacity)×100 was calculated as initial efficiency (%). The initial capacity of the lithium ion secondary battery of Example 48 was 80%.

Example 49

A Si/C complex and a lithium ion secondary battery of Example 49 were produced as described in the following.

A mixed solution of 7 mL of an HF aqueous solution having a concentration of 46 mass % and 56 mL of an HCl aqueous solution having a concentration of 36 mass % was set to a temperature of 0° C. in an ice bath. Then, 3.3 g of $CaSi_2$ was added to the mixed solution and the mixed solution was stirred in an argon gas current. After completion of foaming from the reaction liquid was confirmed, the reaction liquid was warmed to room temperature, further stirred for 2 hours at room temperature, had 20 mL of distilled water added thereto, and further stirred for 10 minutes. At this moment, suspension of a yellow powder was observed.

The obtained reaction liquid was filtered, and the residue was rinsed with 10 mL of distilled water, rinsed with 10 mL of ethanol, and then vacuum dried to obtain 2.5 g of a layered polysilane. When the layered polysilane was analyzed by using a Raman spectrophotometer, a Raman spectrum in which peaks existed at 341±10 $cm^{-1}$, 360±10 $cm^{-1}$, 498±10 $cm^{-1}$, 638±10 $cm^{-1}$, and 734±10 $cm^{-1}$ was obtained.

Then, 1 g of the layered polysilane was weighed out, and was kept under heat for 1 hour at 500° C. in an argon gas atmosphere in which the amount of $O_2$ was not more than 1 vol % to obtain nano silicon aggregated particles. With respect to the nano silicon aggregated particles, X-ray diffraction measurement (XRD measurement) using CuKα radiation was conducted. In the obtained XRD chart, a halo that is considered to be derived from Si was observed. The size of the Si crystallites, calculated from the Scherrer's equation by using the half width of a diffraction peak of Si (111) plane obtained from the XRD chart regarding Si, was approximately 7 nm.

The nano silicon aggregated particles were placed in a rotary kiln type reactor, and thermal CVD was conducted thereon under a flow of a propane gas with a condition of 850° C. and a retention time of 30 minutes to obtain a Si/C complex. The furnace core tube of the reactor was arranged horizontally and the rotational speed of the furnace core tube was set to 1 rpm. A baffle plate is arranged on the inner circumference wall of the furnace core tube, and the reactor is configured such that a content deposited on the baffle plate falls of the baffle plate from a predetermined height associated with rotation of the furnace core tube, and the content is stirred because of the configuration.

Observations of cross sections of the Si/C complex by using a scanning electron microscope have shown the carbon layer being formed on the surface of the silicon material.

Rinsing Step

First, 1 g of the Si/C complex was added to 10 g of pure water used as a rinsing solvent, and the mixture was stirred at room temperature for 5 minutes at 400 rpm by using a mechanical stirrer (RW20 digital, AS ONE Corp.) to obtain a suspension. Then, with respect to the suspension, ultrasonication (ultrasonic cleaning machine USK-3R, AS ONE Corp.) was performed for 60 minutes at an oscillation frequency of 40 kHz. The obtained suspension was filtered, and the obtained powder was dried under reduced pressure for 12 hours at 80° C. to obtain a Si/C complex of Example 49. As the pure water, pure water produced from pure water production device AUTOSTILL WS200 (Yamato Scientific Co., Ltd.) was used.

Lithium Ion Secondary Battery

A slurry was prepared by mixing 70 parts by mass of the Si/C complex of Example 49 as a negative electrode active material, 15 parts by mass of a natural graphite as a negative electrode active material, 5 parts by mass of acetylene black as the conductive additive, and 33 parts by mass of a binder solution. As the binder solution, a solution in which a polyamide imide resin was dissolved in N-methyl-2-pyrrolidone by 30 mass % was used. The slurry was applied, by using a doctor blade, on the surface of an electrolytic copper foil that functions as the current collector and has a thickness of approximately 20 μm, and then dried to form a negative electrode active material layer on the copper foil. Then, the current collector and the negative electrode active material layer were firmly adhered and joined by using a roll press machine. The obtained joined object was vacuum dried at 100° C. for 2 hours to form a negative electrode in which the thickness of the negative electrode active material layer was 16 μm.

A lithium ion secondary battery (half-cell) was produced by using, as the evaluation electrode, the negative electrode produced through the above described procedure. A metallic lithium foil (thickness: 500 μm) was used as the counter electrode.

The counter electrode and the evaluation electrode were respectively cut to have diameters of 13 mm and 11 mm, and a separator (glass filter manufactured by the Hoechst Celanese Corp., and "Celgard 2400" manufactured by Celgard LLC.) was interposed between the two electrodes to form an electrode assembly. The electrode assembly was housed in a battery case (member for CR2032 type coin batteries, manufactured by Hohsen Corp.). A nonaqueous electrolytic solution obtained by dissolving $LiPF_6$ at a concentration of 1 M in a mixed solvent in which ethylene carbonate and diethyl carbonate were mixed at 1:1 (volume ratio) was poured in the battery case, and then the battery case was sealed to obtain a lithium ion secondary battery of Example 49.

Example 50

A Si/C complex and a lithium ion secondary battery of Example 50 were obtained with a method similar to that in Example 49, except for setting the rinsing condition at the rinsing step to stirring at 400 rpm for 60 minutes at room temperature.

Example 51

A Si/C complex and a lithium ion secondary battery of Example 51 were obtained with a method similar to that in Example 49, except for setting the rinsing condition at the rinsing step to stirring at 400 rpm for 60 minutes at 80° C.

Example 52

A Si/C complex and a lithium ion secondary battery of Example 52 were obtained with a method similar to that in Example 49, except for using N-methyl-2-pyrrolidone as the rinsing solvent at the rinsing step.

Example 53

A Si/C complex and a lithium ion secondary battery of Example 53 were obtained with a method similar to that in Example 49, except for not performing the rinsing step.

Example 54

A Si/C complex and a lithium ion secondary battery of Example 54 were obtained with a method similar to that in Example 49, except for using dimethyl carbonate (hereinafter, sometimes abbreviated as DMC) as the rinsing solvent at the rinsing step.

Example 55

A Si/C complex and a lithium ion secondary battery of Example 55 were obtained with a method similar to that in Example 49, except for using diethyl carbonate (hereinafter, sometimes abbreviated as DEC) as the rinsing solvent at the rinsing step.

<Evaluation of Si/C Complex>

The following test was performed with respect to the Si/C complexes of Example 49 to 53.

First, 1 g of each of the Si/C complexes was stirred in 10 g of water for 1 hour to obtain a suspension. The suspension was filtered, and ionic concentrations of fluorine and chlorine in the obtained filtrate were measured with ion chromatography. The results are shown in Table 17. As the water, water produced for pure water production device AUTOSTILL WS200 (Yamato Scientific Co., Ltd.) was used.

TABLE 17

| | Rinsing Solvent | Rinsing Condition | Total Concentration of Fluorine and Chlorine Ions |
|---|---|---|---|
| Example 49 | Water | Room Temperature, stirring for 5 min., ultrasonication for 60 min. | 20 ppm |

TABLE 17-continued

|  | Rinsing Solvent | Rinsing Condition | Total Concentration of Fluorine and Chlorine Ions |
|---|---|---|---|
| Example 50 | Water | Room Temperature, stirring for 60 min. | 40 ppm |
| Example 51 | Water | 80° C., stirring for 60 min. | 25 ppm |
| Example 52 | NMP | Room Temperature, stirring for 5 min., ultrasonication for 60 min. | 48 ppm |
| Example 53 | — | — | 350 ppm |

The concentration of acid-derived anions in the Si/C complex was confirmed to significantly decrease with the rinsing step.

<Battery Characteristic Test>

With respect to the lithium ion secondary batteries of Examples 49 to 55, discharging was performed at a temperature of 25° C. with a current of 0.2 mA, and then charging was performed at a temperature of 25° C. with a current of 0.2 mA. From here, (charge capacity/discharge capacity)×100 was calculated as initial efficiency (%).

Furthermore, by using each of the lithium ion secondary batteries, a cycle of: discharging at a temperature of 25° C. with a current of 0.2 mA until the voltage of the evaluation electrode with respect to the counter electrode reached 0.01 V; after 10 minutes, charging at a temperature of 25° C. with a current of 0.2 mA until the voltage of the evaluation electrode with respect to the counter electrode reached 1 V; and pausing for 10 minutes was repeated for 30 cycles. A value of 100×(charge capacity after 30 cycles)/(charge capacity after 1 cycle) was calculated as a capacity retention rate. Occluding Li to the evaluation electrode is referred to as discharging, and releasing Li from the evaluation electrode is referred to as charging. The results are shown in Table 18.

TABLE 18

|  | Rinsing Solvent | Rinsing Condition | Initial Efficiency | Capacity Retention Rate |
|---|---|---|---|---|
| Example 49 | Water | Room Temperature, stirring for 5 min., ultrasonication for 60 min. | 75% | 90% |
| Example 50 | Water | Room Temperature, stirring for 60 min. | 75% | 87% |
| Example 51 | Water | 80° C., stirring for 60 min. | 75% | 90% |
| Example 52 | NMP | Room Temperature, stirring for 5 min., ultrasonication for 60 min. | 75% | 89% |
| Example 53 | — | — | 73% | 83% |
| Example 54 | DMC | Room Temperature, stirring for 5 min., ultrasonication for 60 min. | 72% | 45% |
| Example 55 | DEC | Room Temperature, stirring for 5 min., ultrasonication for 60 min. | 68% | 75% |

The lithium ion secondary batteries of Examples 49 to 52 were superior in both initial efficiency and capacity retention rate than the lithium ion secondary batteries of Examples 53 to 55.

The ability to obtain preferable Si/C complexes as a result of removal of undesired impurities by the rinsing step was confirmed.

Example 56

A Si/C/cationic polymer complex and a lithium ion secondary battery of Example 56 were produced as described in the following.

First, 23.8 parts by mass of a 1-mass % HF-containing concentrated hydrochloric acid solution was set to a temperature of 0° C. in an ice bath. Next, 5 parts by mass of $CaSi_2$ were added to the solution and the solution was stirred in for 1 hour in an argon gas current. Water was added to the reaction liquid, and the reaction liquid was further stirred for 5 minutes and filtered to obtain a yellow residue. The residue was rinsed with distilled water and ethanol, and dried under reduced pressure to obtain 3.7 parts by mass of a layered polysilane. The layered polysilane was kept under heat for 1 hour at 500° C. in an argon gas atmosphere to obtain nano silicon aggregated particles from which hydrogen was extracted.

The nano silicon aggregated particles were placed in a rotary kiln type reactor, and thermal CVD was conducted thereon under a flow of a 10%-propane-containing argon gas with a condition of 750° C. and a retention time of 60 minutes to obtain a Si/C complex. The furnace core tube of the reactor was arranged horizontally, and the rotational speed of the furnace core tube was set to 1 rpm. A baffle plate is arranged on the inner circumference wall of the furnace core tube, and the reactor is configured such that a content deposited on the baffle plate falls of the baffle plate from a predetermined height associated with rotation of the furnace core tube, and the content is stirred because of the configuration. The obtained Si/C complex was suspended in 10-fold weight water, and ultrasonication was performed (38 kHz, 50° C.) thereon for 1 hour. The obtained suspension was filtered and the obtained powder was dried under reduced pressure for 8 hours at 120° C. for removing water attached thereto to obtain a Si/C complex of Example 56.

A 1-mass % polyethyleneimine aqueous solution was prepared by using a polyethyleneimine having a number average molecular weight of 10,000.

The Si/C complex of Example 56 was added to the 1-mass % polyethyleneimine aqueous solution to obtain a suspension. Ultrasonication was performed on the suspension for 1 hour with a condition of 38 kHz and 50° C. After the ultrasonication, the suspension was dried under reduced pressure for 8 hours at 120° C. for removing water therefrom to obtain a Si/C/cationic polymer complex of Example 56. The Si/C/cationic polymer complex of Example 56 contains the polyethyleneimine by 1 mass %.

A slurry was prepared by mixing 70 parts by mass of the Si/C/cationic polymer complex of Example 56 as a negative electrode active material, 15 parts by mass of a natural graphite as a negative electrode active material, 5 parts by mass of acetylene black as the conductive additive, 10 parts by mass of polyamide-imide as the binder, and N-methyl-2-pyrrolidone as the solvent. The slurry was applied, by using a doctor blade, on the surface of an electrolytic copper foil that functions as the current collector and has a thickness of approximately 20 μm, and then dried to form a negative electrode active material layer on the copper foil. Then, the current collector and the negative electrode active material layer were firmly adhered and joined by using a roll press machine. The obtained joined object was dried under reduced pressure at 200° C. for 2 hours to form a negative electrode whose density of the negative electrode active material layer was 1.0 g/cm³.

A lithium ion secondary battery (half-cell) was produced by using, as the evaluation electrode, the negative electrode produced through the above described procedure. A metallic lithium foil having a thickness of 500 μm was used as the counter electrode.

The counter electrode and the evaluation electrode were respectively cut to have diameters of 14 mm and 11 mm, and a separator (glass filter manufactured by the Hoechst Celanese Corp., and "Celgard 2400" manufactured by Celgard LLC.) was interposed between the two electrodes to form an electrode assembly. The electrode assembly was housed in a battery case (member for CR2032 type coin batteries, manufactured by Hohsen Corp.). A nonaqueous electrolytic solution obtained by dissolving $LiPF_6$ at a concentration of 1 M in a mixed solvent in which ethylene carbonate and diethyl carbonate were mixed at 1:1 (volume ratio) was poured in the battery case, and then the battery case was sealed to obtain a lithium ion secondary battery of Example 56.

Example 57

A lithium ion secondary battery of Example 57 was obtained with a method similar to that in Example 56, except for using, as the negative electrode active material, the Si/C complex of Example 56 instead of the Si/C/cationic polymer complex of Example 56.

<Zeta-Potential Measurement>

Figure 32:
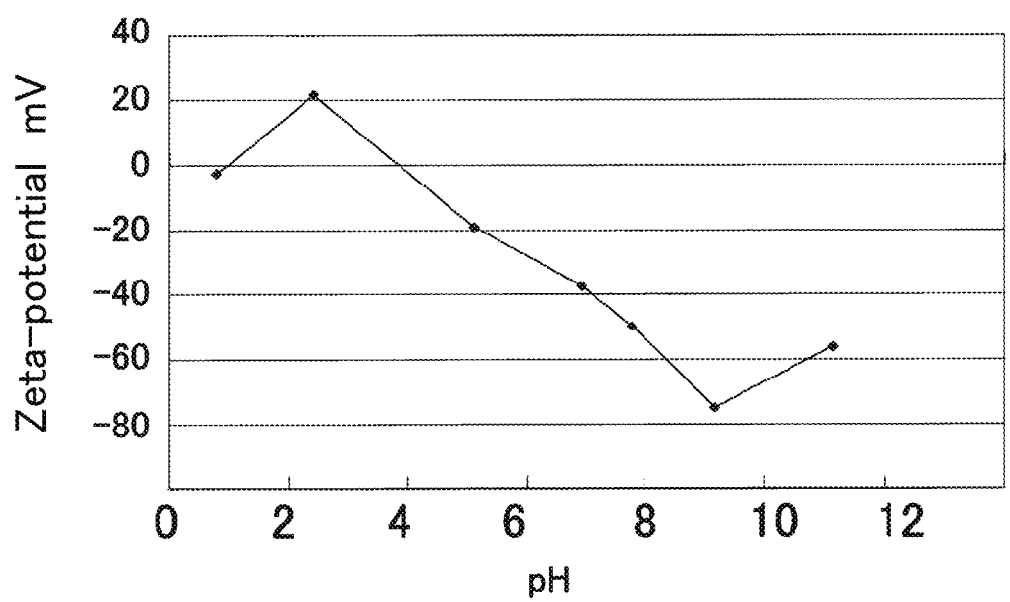
FIG. 32 is a graph of zeta-potential at various pH levels with a Si/C complex of Example 56.

Zeta-potential of the Si/C complex of Example 56 was measured in water at various pH. The results are shown in FIG. 32. The Si/C complex of Example 56 showed a negative zeta-potential in an aqueous solution having a pH equal to or higher than 4.

<Battery Characteristic Test>

With respect to the lithium ion secondary batteries of Examples 56 and 57, discharging was performed at a temperature of 25° C. with a current of 0.2 mA until the voltage of the evaluation electrode with respect to the counter electrode reached 0.01 V, and then charging was performed at a temperature of 25° C. with a current of 0.2 mA until the voltage of the evaluation electrode with respect to the counter electrode reached 1 V. From here, (charge capacity/discharge capacity)×100 was calculated as initial efficiency (%).

Furthermore, by using each of the lithium ion secondary batteries, a cycle of: discharging at a temperature of 25° C. with a current of 0.2 mA until the voltage of the evaluation electrode with respect to the counter electrode reached 0.01 V; after 10 minutes, charging at a temperature of 25° C. with a current of 0.2 mA until the voltage of the evaluation electrode with respect to the counter electrode reached 1 V; and pausing for 10 minutes was repeated for 30 cycles. A value of 100×(charge capacity after 30 cycles)/(charge capacity after 1 cycle) was calculated as a capacity retention rate.

The results from above are shown in Table 19.

TABLE 19

| | Initial Discharge Capacity | Initial Charge Capacity | Initial Efficiency | Capacity Retention Rate |
|---|---|---|---|---|
| Example 56 | 1702 mAh/g | 1319 mAh/g | 77.5% | 81.5% |
| Example 57 | 1649 mAh/g | 1290 mAh/g | 78.3% | 73.5% |

The lithium ion secondary battery of Example 56 has shown a capacity retention rate that is significantly superior to that of the lithium ion secondary battery of Example 57. The cationic polymer layer of the Si/C/cationic polymer complex is suggested to suppress expansion and contraction inside the Si/C complex, suppress occurrence of new cracked parts, and have prevented direct contact between internal silicon and the electrolytic solution.

INDUSTRIAL APPLICABILITY

The electrical storage device of the present invention can be utilized as secondary batteries, electric double layer capacitors, lithium ion capacitors, and the like. The nonaqueous secondary battery of the present invention can be utilized as lithium ion secondary batteries. In addition, the nonaqueous secondary battery of the present invention is useful for driving motors of electric vehicles and hybrid vehicles, and for personal computers, portable communication devices, home appliance, office instrument, industrial instrument, and the like. The nonaqueous secondary battery of the present invention can be suitably used particularly for driving motors of electric vehicles and hybrid vehicles requiring large capacity and large output.

The invention claimed is:

1. A negative electrode active material comprising a complex including:
   nano silicon aggregated particles each having a structure in which multiple layers of a plate-like silicon body, having a structure in which nano-sized silicon particles are arranged as layers, are overlaid in a thickness direction thereof; and
   a carbon layer having a thickness within a range of 1 nm to 100 nm and at least formed on a surface of the plate-like silicon body, and satisfying following relational formula (1) regarding average thickness (R) and standard deviation (σ) of the thickness:

$$R/3\sigma > 1. \qquad \text{Relational formula (1):}$$

2. A negative electrode for nonaqueous secondary batteries, the negative electrode comprising a current collector and a negative electrode active material layer bound to the current collector, wherein
   the negative electrode active material layer includes a first active material that is the negative electrode active material according to claim 1, and a second active material containing a graphite.

3. The negative electrode for nonaqueous secondary batteries according to claim 2, wherein at least one portion of the aggregated particles is covered with the carbon layer, and the carbon layer has a thickness within a range of 1 nm to 100 nm and satisfies following relational formula (1) regarding average thickness (R) and standard deviation (σ) of the thickness:

$$R/3\sigma > 1. \qquad \text{Relational formula (1):}$$

4. The negative electrode for nonaqueous secondary batteries according to claim 2, wherein
   a nano silicon of the nano silicon aggregated particles is produced by heating a layered polysilane represented by a composition formula $(SiH)_n$ and having, as a basic structure, a structure in which multiple six-membered rings formed from silicon atoms are connected.

5. The negative electrode for nonaqueous secondary batteries according to claim 2, wherein
   the graphite is contained by 10 to 90 mass % with respect to a total amount of the first active material and the second active material.

6. The negative electrode for nonaqueous secondary batteries according to claim 2, wherein
   the graphite is contained by 10 to 40 mass % with respect to a total amount of the first active material and the second active material.

7. The negative electrode for nonaqueous secondary batteries according to claim 2, wherein
the graphite is contained by 40 to 90 mass % with respect to a total amount of the first active material and the second active material.

8. The negative electrode for nonaqueous secondary batteries according to claim 2, wherein
the complex contains carbon by 1 to 40 mass %.

9. The negative electrode for nonaqueous secondary batteries according to claim 2, wherein
the complex contains a matrix including carbon, and the aggregated particles dispersed in the matrix.

10. The negative electrode for nonaqueous secondary batteries according to claim 2, wherein
the complex contains carbon by 1 to 30 mass %.

11. The negative electrode for nonaqueous secondary batteries according to claim 2, wherein
the plate-like silicon body has a thickness of 20 nm to 50 nm and a long axis direction length of 0.1 µm to 50 µm.

12. The negative electrode for nonaqueous secondary batteries according to claim 2, wherein
the plate-like silicon body has a structure in which flat nano silicon particles are arranged in layers.

13. The negative electrode for nonaqueous secondary batteries according to claim 12, wherein
the flat nano silicon particles each have a long axis direction length of 5 nm to 20 nm and a short axis direction length of 2 nm to 5 nm.

14. The negative electrode for nonaqueous secondary batteries according to claim 12, wherein
a ratio (long axis/short axis) between lengths of a long axis and a short axis of the flat nano silicon particles is 2.5 to 10.

15. The negative electrode for nonaqueous secondary batteries according to claim 2, wherein
the carbon layer is interposed between layers of the silicon particles arranged in layers, or between layers of flat nano silicon particles arranged in layers.

16. A nonaqueous secondary battery comprising the negative electrode according to claim 2.

17. The nonaqueous secondary battery according to claim 16, wherein the nonaqueous secondary battery is a lithium ion secondary battery.

18. A method for producing a negative electrode active material, the method, with which the complex according to claim 1 is formed, comprising the following steps to be performed in the following order:
an aggregated particle formation step of obtaining nano silicon aggregated particles in which multiple layers of a plate-like silicon body, having a structure in which nano-sized silicon particles are arranged as layers, are overlaid in a thickness direction thereof, by heating a layered polysilane represented by a composition formula $(SiH)_n$ and having, as a basic structure, a structure in which multiple six-membered rings formed from silicon atoms are connected; and
a carbonization step of forming a carbon layer at least on a surface of the plate-like silicon body by bringing the nano silicon aggregated particles in contact with an organic gas in a non-oxidizing atmosphere and applying heat thereto to carbonize the organic gas.

19. An electrical storage device comprising a negative electrode including the negative electrode active material according to claim 1.

20. The method for producing the negative electrode active material according to claim 18, wherein
the organic gas is propane.

21. A complex comprising:
nano silicon aggregated particles each having a structure in which multiple layers of a plate-like silicon body, having a structure in which nano-sized silicon particles are arranged as layers, are overlaid in a thickness direction thereof;
a carbon layer covering the silicon aggregated particles; and
a cationic polymer layer including a cationic polymer covering the carbon layer.

22. A method for producing a complex formed of nano silicon aggregated particles and a carbon layer, the method comprising
mixing $CaSi_2$ and a halogen-containing polymer to obtain a mixture thereof, and heating the mixture at a temperature not lower than a carbonization temperature of the halogen-containing polymer.

* * * * *